United States Patent
Abe

(10) Patent No.: US 9,013,902 B2
(45) Date of Patent: Apr. 21, 2015

(54) MULTI-TERMINAL POWER CONVERSION DEVICE, MULTI-TERMINAL POWER TRANSFER DEVICE, AND POWER NETWORK SYSTEM

(75) Inventor: Rikiya Abe, Kanagawa (JP)

(73) Assignee: The University of Tokyo, Tokyo (JP)

( * ) Notice: Subject to any disclaimer, the term of this patent is extended or adjusted under 35 U.S.C. 154(b) by 443 days.

(21) Appl. No.: 13/395,407

(22) PCT Filed: Sep. 10, 2010

(86) PCT No.: PCT/JP2010/005563
§ 371 (c)(1),
(2), (4) Date: Mar. 9, 2012

(87) PCT Pub. No.: WO2011/030558
PCT Pub. Date: Mar. 17, 2011

(65) Prior Publication Data
US 2012/0173035 A1    Jul. 5, 2012

(30) Foreign Application Priority Data

Sep. 10, 2009  (JP) ................................ 2009-208744
Jun. 27, 2010  (JP) ................................ 2010-145715

(51) Int. Cl.
G06F 19/00    (2011.01)
H02M 5/45    (2006.01)
(Continued)

(52) U.S. Cl.
CPC ............... *H02M 5/4505* (2013.01); *H02J 3/00* (2013.01); *H02M 2001/008* (2013.01)

(58) Field of Classification Search
CPC .. H02J 3/00; H02M 2001/008; H02M 5/4505
USPC ............. 700/297; 307/31; 363/18, 35, 65, 69
See application file for complete search history.

(56) References Cited

U.S. PATENT DOCUMENTS 5,666,275 A * 9/1997 Inokuchi et al. ................. 363/35
5,740,023 A * 4/1998 Brooke et al. ................... 363/65
(Continued)

FOREIGN PATENT DOCUMENTS

EP    1919054 A2    5/2008
EP    2075891 A1    7/2009
(Continued)

OTHER PUBLICATIONS

Joos, G.; Ooi, B.-T; McGillis, D.; Galiana, F.D.; Marceau, R., "The potential of distributed generation to provide ancillary services," Power Engineering Society Summer Meeting, 2000. IEEE , vol. 3, no., pp. 1762,1767 vol. 3, 2000.*

(Continued)

*Primary Examiner* — Michael D Masinick
(74) *Attorney, Agent, or Firm* — Venable LLP; Michael A. Sartori; Todd R. Farnsworth

(57) ABSTRACT

The present invention provides a multi-terminal power conversion device, a multi-terminal power transfer device, and a power network system which allows an existing power grid to be divided into a plurality of power grids that can be interconnected together and operated stably via existing or new transmission lines. An inter-power grid asynchronous interconnection network system includes a multi-terminal power conversion device characterized by connecting together a plurality of asynchronous power grids including a bulk power grid and controlling power so that the sum of inflow power and outflow power is zero. An intra-power grid synchronous network system includes a power apparatus control terminal device with means for controlling power for a power apparatus installed in an autonomous power grid. A plurality of inter-power grid asynchronous interconnection network systems are connected to an intra-power grid synchronous network system to integrate the power control with communication control.

19 Claims, 41 Drawing Sheets

(51) Int. Cl.
*H02J 3/00* (2006.01)
*H02M 1/00* (2006.01)

(56) References Cited

U.S. PATENT DOCUMENTS

| | | | |
|---|---|---|---|
| 6,437,462 | B1 | 8/2002 | Maple et al. |
| 7,596,002 | B2* | 9/2009 | Teichmann ............... 363/18 |
| 8,519,832 | B2* | 8/2013 | Loporto et al. ............ 340/12.32 |
| 2001/0022736 | A1* | 9/2001 | Suzuki ..................... 363/69 |
| 2002/0130639 | A1* | 9/2002 | Ogusa et al. ............... 323/207 |
| 2009/0304101 | A1* | 12/2009 | LoPorto et al. ............ 375/260 |
| 2012/0146423 | A1* | 6/2012 | Bodewes et al. ........... 307/84 |

FOREIGN PATENT DOCUMENTS

| | | |
|---|---|---|
| JP | 11-098694 A | 4/1999 |
| JP | 11-146560 A | 5/1999 |
| JP | 2003-152756 A | 5/2003 |
| JP | 2003-324850 A | 11/2003 |
| JP | 2004-073136 A | 3/2004 |
| JP | 2004-120845 A | 4/2004 |
| JP | 2005-223986 A | 8/2005 |
| JP | 2006-129585 A | 5/2006 |
| JP | 2007-089250 A | 4/2007 |
| JP | 2007-166746 A | 6/2007 |
| JP | 2007-189840 A | 7/2007 |
| JP | 2008-061355 A | 3/2008 |
| JP | 2008-104269 A | 5/2008 |
| JP | 2008-182859 A | 8/2008 |

OTHER PUBLICATIONS

Mori, S.; Matsuno, K.; Hasegawa, T.; Ohnishi, S.; Takeda, M.; Seto, Makoto; Murakami, S.; Ishiguro, F., "Development of a large static VAr generator using self-commutated inverters for improving power system stability," Power Systems, IEEE Transactions on , vol. 8, No. 1, pp. 371,377, Feb. 1993.*

Karlsson, P.; Svensson, J., "DC bus voltage control for a distributed power system," Power Electronics, IEEE Transactions on , vol. 18, No. 6, pp. 1405,1412, Nov. 2003 doi: 10.1109/TPEL.2003.818872.*

Extended European Search Report issued in European Patent Application No. 10815158.0 dated Mar. 4, 2015.

* cited by examiner

| NETWORK | SUBNET MASK | GATEWAY |
|---|---|---|
| 192.168.2.0 | 255.255.255.0 | 192.168.0.7 |
| 192.168.3.0 | 255.255.255.0 | 192.168.0.9 |
| 192.168.4.0 | 255.255.255.0 | 192.168.0.11 |
| 192.168.5.0 | 255.255.255.0 | 192.168.1.6 |
| 192.168.6.0 | 255.255.255.0 | 192.168.1.6 |

1502

| NETWORK | SUBNET MASK | GATEWAY |
|---|---|---|
| 192.168.1.0 | 255.255.255.0 | 192.168.0.2 |
| 192.168.3.0 | 255.255.255.0 | 192.168.0.10 |
| 192.168.4.0 | 255.255.255.0 | 192.168.0.12 |
| 192.168.5.0 | 255.255.255.0 | 192.168.0.2 |
| 192.168.6.0 | 255.255.255.0 | 192.168.0.2 |

1503

| NETWORK | SUBNET MASK | GATEWAY |
|---|---|---|
| 192.168.1.0 | 255.255.255.0 | 192.168.0.3 |
| 192.168.2.0 | 255.255.255.0 | 192.168.0.5 |
| 192.168.4.0 | 255.255.255.0 | 192.168.0.13 |
| 192.168.5.0 | 255.255.255.0 | 192.168.0.3 |
| 192.168.6.0 | 255.255.255.0 | 192.168.0.3 |

1504

| NETWORK | SUBNET MASK | GATEWAY |
|---|---|---|
| 192.168.1.0 | 255.255.255.0 | 192.168.0.4 |
| 192.168.2.0 | 255.255.255.0 | 192.168.0.6 |
| 192.168.3.0 | 255.255.255.0 | 192.168.0.8 |
| 192.168.5.0 | 255.255.255.0 | 192.168.0.4 |
| 192.168.6.0 | 255.255.255.0 | 192.168.0.4 |

1505

| NETWORK | SUBNET MASK | GATEWAY |
|---|---|---|
| 192.168.1.0 | 255.255.255.0 | 192.168.1.1 |
| 192.168.2.0 | 255.255.255.0 | 192.168.1.1 |
| 192.168.3.0 | 255.255.255.0 | 192.168.1.1 |
| 192.168.4.0 | 255.255.255.0 | 192.168.1.1 |
| 192.168.6.0 | 255.255.255.0 | 192.168.6.1 |

1506

| NETWORK | SUBNET MASK | GATEWAY |
|---|---|---|
| 192.168.1.0 | 255.255.255.0 | 192.168.1.1 |
| 192.168.2.0 | 255.255.255.0 | 192.168.1.1 |
| 192.168.3.0 | 255.255.255.0 | 192.168.1.1 |
| 192.168.4.0 | 255.255.255.0 | 192.168.1.1 |
| 192.168.5.0 | 255.255.255.0 | 192.168.5.1 |

| YEAR, MONTH, DAY | START | END | DESTINATION | INPUT | OUTPUT | LOSS | REMAINING POWER |
|---|---|---|---|---|---|---|---|
| 2010.6.25 | 10:50 | | Grid A | 200kWh | | 10kWh | 190kWh |
| 2010.6.26 | 15:40 | | Grid C | | 120kWh | 7kWh | 63kWh |
| 2010.6.27 | 18:30 | | Grid B | 420kWh | | 20kWh | 463kWh |

FIG.31

MULTI-TERMINAL POWER CONVERSION DEVICE, MULTI-TERMINAL POWER TRANSFER DEVICE, AND POWER NETWORK SYSTEM

TECHNICAL FIELD

The present invention relates to a multi-terminal power conversion device, a multi-terminal power transfer device, and a power network system, and in particular, to a multi-terminal power conversion device, a multi-terminal power transfer device, and a power network system which allow a plurality of power grids to be asynchronously connected together via a multi-terminal power conversion device and a multi-terminal power transfer device both installed at each of the power grids, thus enabling specified power to be interchanged among specified power grids for a specified time.

BACKGROUND ART

Electric power is mostly supplied by power grids of a power company through a transmission network of a bulk power grid. The frequency of a power grid results from the balance between demand (load) and supply (generated output). Thus, the power company matches the supply and demand on a moment-by-moment basis by controlling load fluctuation of at most several tens of seconds by a governor-free power generator, load fluctuation of at most 20 minutes by a power plant with a frequency control (AFC) function, and a load fluctuation of the order of several hours by scheduled increases and decreases in the output of a steam turbine power plant. A power generator in the grid includes a group of synchronous power generators and has a control characteristic called drooping. The control adjusts the output so as to increase the rotation of the power generators with decreased grid frequency, while reducing the rotation of those with increased grid frequency. Thus, owing to the drooping characteristic, all the power generators cooperate with one another in maintaining constant frequency. Furthermore, these synchronous power generators are rotating machines with a large inertia force and thus have the ability to stabilize the frequency in the area without being affected by slight fluctuations in grid frequency. This is expressed by the phrase "synchronizing power of the power generators".

In Japan, the power supply is separated into two grids, a 50-Hz grid for the eastern region and a 60-Hz grid for the western region, therefore demand control for frequency stabilization is performed independently in the respective regions. This control allows the frequency to be synchronized to a single value in all locations within each of the two regions.

On the other hand, in recent years, renewable energy power sources such as wind power generation, solar power generation, and biofuel power generation have been introduced at an accelerated rate as a means for dealing with the problem of global warming and as a result of the rapid rise in fossil fuel costs.

The Japanese government has established the goal of introducing 28,000,000 kW of solar power generation by 2020 and 53,000,000 kW of solar power generation by 2040, however on the other hand, as reported in "Report of Workshop on Low Carbon Power Supply Systems" in July, 2009 the current power grid, if not improved, could support only about 13,000,000 kW of solar power generation.

This limitation is because renewable energy power sources such as solar power generation and wind power generation cannot provide synchronizing power.

These power sources provide power through inverters which detect the frequency of the grid and feed current synchronously by following other power sources on the grid. The power sources thus have the tendency of impairing the frequency stability of the system by magnifying normal power fluctuations. Thus, the introduction of large amounts of renewable power that fluctuates severely impairs the synchronization capability of the existing grid. This may lead to a catastrophe such as cascading massive power failure.

To solve this problem and introduce a large amount of renewable power, it is necessary to design a new power grid not supported by conventional concepts and to present a procedure for migrating the current grid to the new system without critical difficulties. However, the conventional art includes no document or report regarding such a system or procedure.

To deal with problems occurring when a large amount of unstable power is connected to a synchronous grid, several conventional techniques as described below have been proposed. The techniques are roughly classified into the following three methods.

A first conventional method is to enhance bulk power grids. That is, fluctuations in renewable energy power generation is remediated by enhancing high-voltage interconnection lines, installing back-to-back (BTB) loop controllers, increasing the capacity of frequency converter stations, increasing the capacity of DC interconnection lines between Hokkaido and Honshu, Japan, and increasing the number of gas turbine power generation facilities and variable speed hydroelectric power generation facilities as backup power sources. This method relates to Patent Literature 1 and 2 listed below.

A second conventional method is suppression of output from distributed power sources and reducing load (demand). For output suppression, every effort has been made to require power companies of solar power generation or wind power generation to provide a circuit that suppresses the output in response to a signal from the power company. This method relates to Patent Literature 3 and 4 listed below.

A third conventional method is to interchange power among a plurality of power grids or between a bulk system and power grids. This method uses a power interchange device to connect together a plurality of power grids into which a large amount of unstable power such as renewable energy is introduced so that power can be interchanged among the power grids. This method relates to Patent Literature 5, 6, 7, and 8 listed below.

Furthermore, a combination of power and communication is described in Patent Literature 9 listed below.

CITATION LIST

Patent Literature

PTL 1: Japanese Patent Laid-Open No. 11-146560
PTL 2: Japanese Patent Laid-Open No. 11-98694
PTL 3: Japanese Patent Laid-Open No. 2008-182859
PTL 4: Japanese Patent Laid-Open No. 2007-189840
PTL 5: Japanese Patent Laid-Open No. 2003-324850
PTL 6: Japanese Patent Laid-Open No. 2007-89250
PTL 7: International Publication No. 2004-073136
PTL 8: Japanese Patent No. 3934518
PTL 9: Japanese Patent Laid-Open No. 2003-152756

SUMMARY OF INVENTION

Technical Problem

However, since the conventional techniques correspond to power systems for introducing a large amount of renewable energy power without synchronization capability, the conventional techniques may pose the following problems.

The first conventional technique is intended to enhance the bulk power grid. For example, Patent Literature 1 allows power grids to operate more stably by using an operation of turning on and off a switch that connects together a plurality of regional grids to be controlled, according to the grid status at the time of execution of control, to freely change a target grid stability. However, the regional grids originate from the same synchronous grid, and thus Patent Literature 1 is only a proposal for changing the manner of power flow depending on changes in electrical conditions on the grid. This method cannot solve the problem of an increase in proportion of renewable energy power which does not have synchronizing capability.

Furthermore, Patent Literature 2 proposes a power interchange instruction device for a power interconnection grid in which a plurality of power grids are interconnected together by BTB power converters. The specification proposes that based on the interconnection of the plurality of power grids, supply and demand be measured for each power grid and the resultant demand imbalance information be collected by a center so that power can be distributed according to a predetermined ratio.

A method for power interchange between two power grids such as the method for controlling the DC interconnection between Hokkaido and Honshu, Japan as described in an embodiment in the specification is implementable. However, in a power system involving a rapid increase in the numbers of target power grids, relevant consumers, and relevant solar power generation facilities where such increase leads to a rapid change in the power grid configuration, maintenance of a central control system that constantly determines the supply and demand for each of the plurality of power grids is very difficult to achieve.

The second conventional technique involves the suppression of the output and demand. For example, Patent Literature 3 proposes a wind power generation system that suppresses the fluctuation in output power from a wind power generation device which exceeds the maximum output and charging capacity of a storage device. Furthermore, Patent Literature 4 proposes continuous monitoring of the status of the grid, combining shutdown of a power generator with suppression of generator output as needed so as to enable adequate control. Every effort has been made in the U.S. to develop techniques for moderating the demand as expressed by the terms "smart grids" and "smart meters". These methods are techniques for suppressing power generation or demand and are not techniques for achieving a controlled grid after the introduction of a large quantity of renewable energy power.

The third conventional technique proposes a method for power interchange between a plurality of power grids or between a bulk power grid and power grids.

For example, Patent Literature 5 proposes a "power supply and demand adjusting system controlling power interchange by interchanging power via a transmission network and transmitting and receiving various types of information via a communication network." However, this method basically frequently isolates the power grids from one another within a conventional synchronous grid and is not a technique for achieving a controlled grid after the introduction of a large quantity of renewable energy power.

Patent Literature 6 proposes that a loop controller be used to isolate the power grids from one another and to optimize connections. This proposal also corresponds to a method of frequently isolating transmission networks connected to a synchronous grid from one another.

According to these methods, all power consumers fundamentally depend on the bulk power grid. The methods thus fail to solve the problem that an increased amount of renewable energy power weakens the synchronizing capability.

Patent Literature 7 proposes a "power system including a plurality of power suppliers and consumers interconnected together and each including a power apparatus and a power supply and demand control apparatus, wherein the suppliers and the consumers mutually interchange power." However, the system is an abstract concept, and in terms of an electric circuit, the system according to Patent Literature 7 has the following defects.

First, Patent Literature 7 discloses that interconnection lines connecting a plurality of consumers together are "branching power supply and demand lines, cascaded power supply and demand lines, radial power supply and demand lines, net-like power supply and demand lines, or power supply and demand lines formed by combining the above-described power supply and demand lines together". However, these connections involve a disadvantageously complicated power flow and a large short-circuit capacity, leading to an increase in circuit breaker capacity and a complicated protection system. Patent Literature 7 also proposes the use of DC interconnection lines. However, this significantly increases the short-circuit capacity of the DC interconnection lines, making design of the interconnection lines very difficult, including installation of a DC circuit breakers and separation of the lines.

Moreover, according to this proposal, a plurality of consumers and supplies are connected to one line via power control apparatuses. However, to be interchanged between a consumer and a supplier, power passes through two power control apparatuses, resulting in a redundant circuit and heavy current losses.

To allow power to be sufficiently interchanged among a plurality of consumers and suppliers on one interconnection line, the following control is performed. Any one of the consumers and suppliers serves as a voltage source to maintain the voltage of the interconnection lines. Suppliers supply power by supplying a current related to the voltage, and consumers receive power by receiving the current related to the voltage. If this current control between supply and demand is subjected to time delay, then in such a small-scale grid, the voltage source fluctuates significantly, disturbing all the consumers and suppliers connected to the interconnection line. The supply and demand in this grid are managed via communications, and thus reliability depends on the communications. Such an electric circuit configuration is not practical.

Patent Literature 8 proposes the addition of a energy storage device to a DC multi-terminal power transmission which is intended for a plurality of isolated islands. However, few proposals for DC multi-terminal power transmission have been realized. This is because high-speed communication lines are essential for managing the sum of power among a plurality of terminals to zero, precluding the control from being actually achieved. The locations where such a system is actually in operation are limited to Italy with the SACOI project (200 kV, 200 MW, and three terminals) and America with the Quebec-New-England project (450 V, 2,000 MW, and three terminals). The two projects have not been followed by any other instances. The Quebec-New-England project was first designed for five terminals, but reduced to three terminals because of a controllability problem and related issues, with only one of the three terminals being used for bidirectional power interchange.

Patent Literature 8 argues that the incorporation of the energy storage device enables stable operation with a plurality of DC terminals. However, this system suffers the following fundamental problems. First, DC transmission lines have extended line distances, thus increasing the probability of an accident on DC cables or at the connections. Unless a large number of DC circuit breakers are arranged at branch points, electric paths cannot be isolated from one another when an accident occurs in the DC segment, resulting in a power failure in all the grids. Next, controlling, to net zero, the sum of power among all the terminals including the energy storage devices needs to be managed via communication lines. Thus, control reliability depends on communication reliability. These problems may occur regardless of whether or not power is stored. However, the problems are more complicated when power is stored, and thus power transmission with at least four terminals is not practical.

As described above, none of the conventional documents describes an intuitive example of a power system for enabling a large amount of renewable energy power to be introduced. However, with reference to the conventional documents, it is easy to understand the effectiveness of a method which includes dividing the current bulk power grid into a large number of smaller power grids each including a renewable energy power source, a dispersed power source, and a demand, introducing a energy storage device into each power grid to allow the power grid to independently balance the demand with the supply (such a power grid is referred to as an autonomous power grid), and then connecting the power grids together through network interconnection lines via interconnection devices such as BTBs or loop controllers (hereinafter referred to as BTB interconnection devices).

However, a power network based on BTB interconnection devices poses the following problems. First, in regard to power interchange control devices, the number of required BTB interconnection devices is of the order of the square of the number of power grids to be interconnected together. Moreover, cooperative control needs to be managed among the BTB interconnection devices. This leads to difficult problems such as an increase in the number of converters and the need for cooperative control among devices installed at different times and which are available from different manufacturers.

Moreover, if a plurality of power grids are interconnected together to allow power to be interchanged, power conversion is carried out twice in power grids through which power only transits. This disadvantageously increases conversion losses.

Another disadvantage is that when a power bus fails, all power interchange routes extending through the corresponding power grid are shut down so as not to affect the rest of the power grids.

Moreover, in a communication system, when power is interchanged among a plurality of power grids, the complexity of the communication system increases proportionally to the number of routes in the network, leading to the need for a high initial investment and high maintenance costs. An enormous number of communication routes and apparatuses are needed to maintain reliability, and retrofitting, adding, and managing these communication routes and apparatuses is difficult. Moreover, when a new design for interchanging power from any power apparatus to any other power apparatus is developed, the conventional communication method faces challenges such as the difficulty of managing the facilities, high initial investment, and increased maintenance costs.

Next, in regard to the control system, when power interchange is carried out as described above, the conventional method requires a central instruction device, a means for collecting information at the central instruction device, a communication circuit for the information, and a means for transmitting instructions. Moreover, in view of the importance of reliability of the power grids, measures such as redundancy are required. In a new power system configured such that a plurality of distributed power grids are constantly reorganized and proliferated, the above-described conventional method requires an enormous facility investment and frequent maintenance work. Hence, network administrators are likely to shoulder heavy burdens.

Moreover, if power is to be interchanged among a plurality of power grids, the following operations are required: information about the magnitudes or amounts of interchangeable effective and reactive power, the time when the power should be interchanged, and the price at which the power will be acquired from any power grid, target routes must be selected and a combination of a plurality of routes must be determined, with restrictions on the power routes to be taken into account, and the interconnection devices must be notified of the selected routes and the selected combination so as to carry out the corresponding power interchange.

With regard to the concept of a combination of power network and a communication network, Patent Literature 9 illustrates an example in which a power line is combined with a communication circuit in a home or a building. However, this is the concept for Internet connections using electric outlets and fails to include the concept for the control of power interchange control.

The above description stipulates that in order to allow a large amount of renewable energy to be introduced, an efficient interconnection device needs to be developed which balances, within each power grid, renewable energy and other power sources and loads as well as supply and demand for power apparatuses such as energy storage devices to allow the power grid to operate autonomously and which enables a power grid suffering excess or shortage of power to be asynchronously connected to any of the other power grids including a bulk power grid so as to interchange power between the power grids. The above description also shows the need to construct an integrated power system by overcoming challenges such as the development of an efficient, flexible control system for controlling the above-described power apparatuses and the whole power system, a communication system serving as a communication base for the control system, and an optimized power interchange algorithm.

The present invention has been developed in view of these problems. An object of the present invention is to provide a multi-terminal power conversion device, a multi-terminal power transfer device, and a power network system which allow an existing power grid to be divided into a plurality of autonomous power grids that can be interconnected together and stably operated via existing or new transmission lines.

Solution to Problem

To accomplish the above-described object, the present invention provides a multi-terminal power conversion device comprising at least three power conversion units each comprising a self-commutated power converter that converts power in a bidirectional manner and a voltage, current, and power measuring instrument that measures voltage, current, and power passing through the self-commutated power converter, a common bus that connects the first ends of the power conversion units together in parallel, and a control unit that controls a plurality of the power conversion units so that the power conversion units cooperatively set, to zero, a sum of power flowing from the power conversion units into the common bus and the power fed from the common bus to the power conversion units, based on measured values from the voltage, current, power measuring instruments, so that power is asynchronously interchanged among external circuits to which the second ends of the power conversion units are connected.

Advantageous Effects of Invention

If a plurality of power grids are connected together by an asynchronous interconnection multi-terminal power conversion device as in the present invention, then first, a large number of interconnection networks are created which complement one another in supplying power required to allow each power grid to operate autonomously, thus significantly reducing the capacities of interconnection devices and network connections. Hence, the amount of interchangeable power increases consistently with the number of inter-power grid networks, thus allowing a proportional increase in the amount of renewable energy power introduced into the power grids. A bulk power grid can avoid dealing with the fluctuations in renewable energy power. This eliminates the need to provide an excess of interconnection capacity, and enables conventional high-quality power grids to be maintained.

Second, the power network system resulting from the present invention enables power to be interchanged among any particular power apparatuses or power grids. For the power interchange, a power interchange procedure is established based on transaction requirements. The addition of information with the interchangeable power enables more flexible power interchange and enables the recording of power transactions.

Third, each power grid can operate autonomously without an excessively large power generation facility or storage device, through interconnection with a network with other power grids or with a bulk power grid. Thus, renewable energy power that is advantageous for the local district can be freely loaded into the power grid. The results of Japan's New Energy and Industrial Technology Development Organization (NEDO) investigations show that even solar power generation alone could provide energy in the amount of which is nearly 1,000 times as large as that consumed by human beings annually and that if solar panels are laid in districts in Japan where solar power generation has not been utilized yet, the amount of generated power would be about eight times as large as that consumed. The present invention significantly contributes to introduction of such a large amount of renewable energy.

BRIEF DESCRIPTION OF DRAWINGS

FIG. 4 is a diagram illustrating the relationship between FIG. 4A and FIG. 4B;

FIG. 15 is a diagram showing a routing table;

FIG. 31 is a diagram showing an example of power transaction database;

DESCRIPTION OF EMBODIMENTS

First, the difference between power interchange in a conventional AC synchronous grid and power interchange based on power conversion that is the basic principle of the present invention will be described.

Figure 1:
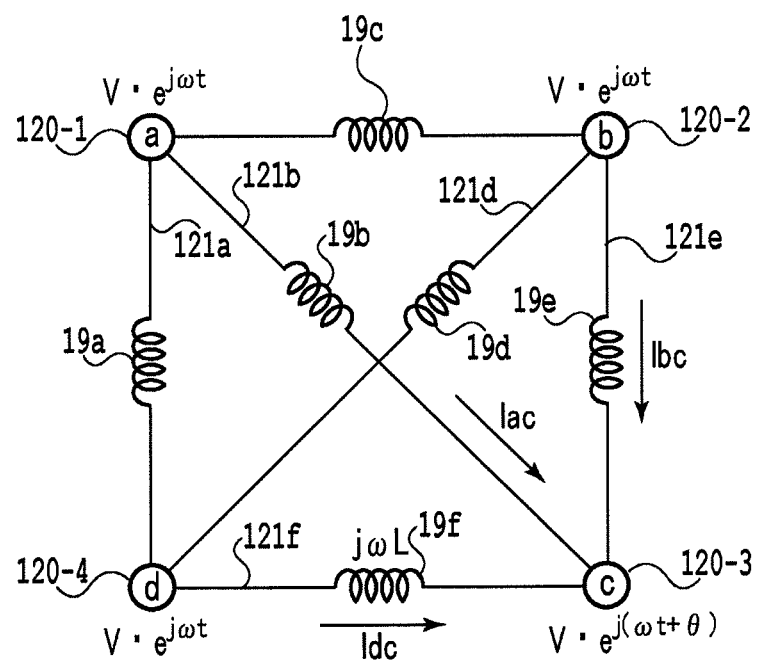
FIG. 1 is a diagram illustrating power transfer in a synchronous grid.
Figure 2A:
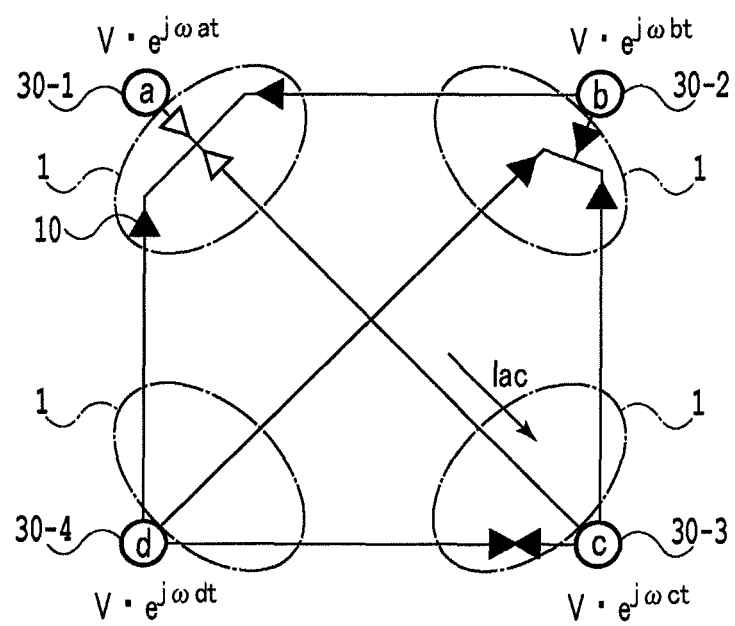
FIG. 2A is a diagram illustrating power transfer in an asynchronous grid using the present invention.

FIG. 1 shows a conventional AC synchronous grid in which four power grids (nodes 120-1 to 120-4) are connected together by six interconnecting electric lines (links 121-1 to 121-4). Each of the interconnecting electric lines has a reactor component 19 with a line of inductance L. FIG. 2A shows an AC asynchronous grid according to the present invention in which four nodes (nodes 30-1 to 30-4) are connected together by six links via A connection terminals and B connection terminals of multi-terminal power conversion devices 1. For simplification, AC filters, connection reactors and transformers are omitted from the figures.

In an initial condition of a circuit network in FIG. 1, the four nodes are synchronized at a voltage V, a phase of 0, and a frequency $\omega/2\pi$. In this condition, to allow power to be transmitted to a node (c), one of a method of reducing the voltage of the node (c) and a method of lagging the phase by $\theta$ is carried out. A reduction in voltage normally affects the power apparatuses within the power grid, and thus the method of lagging the phase is adopted. Lagging the phase of the node (c) by $\theta$ makes a phase difference $\theta$ between the node (c) and each of adjacent nodes (a), (b), and (d). This leads to the flow of currents Idc, Iac, and Ibc of the same magnitude. Since the nodes have the same voltage, the same current flows into each of the nodes. That is, node (c) receives power from the three nodes. This also applies to a case where the voltage V is changed with the phase unchanged. Namely, in an AC synchronous grid, the transfer of power to or from one node inevitably affects the adjacent nodes.

In an initial condition of a circuit network in FIG. 2A, the four nodes have an equal voltage V but different frequencies $\omega a/2\pi$, $\omega b/2\pi$, $\omega c/2\pi$, and $\omega d/2\pi$, and thus fail to be synchronized. All bidirectional power converters 10 are assumed to be initially inactive (as indicated by filled-in triangles). In this condition, to allow power to be transmitted to the node (c), the power converter 10 connected to the node (a) and the power converter 10 connected to the node (c) are operated (as indicated by blank triangles). Then, as shown in FIG. 2A, only the power converter 10 connecting the nodes (a) and (c) together operates, with all the other power converters 10 inactive. Thus, power is interchanged only between the links (a) and (c), while the other nodes (b) and (d) are unaffected.

Figure 2B:
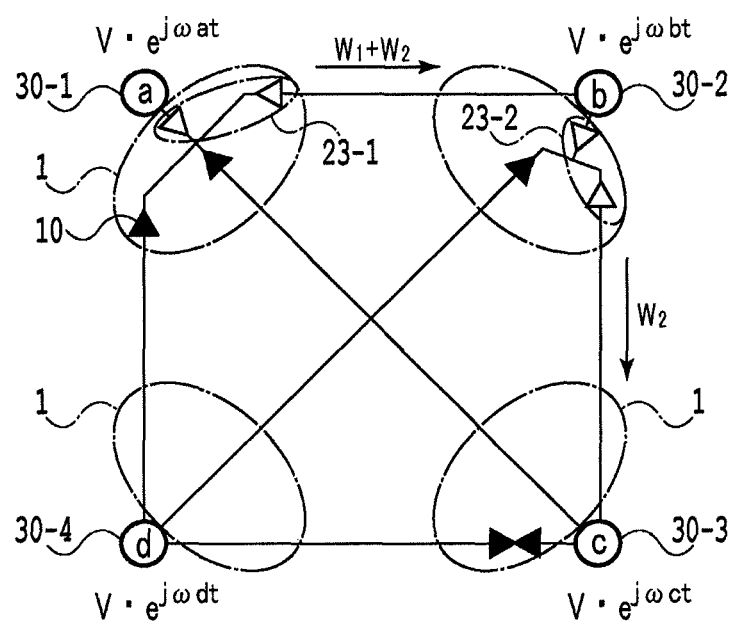
FIG. 2B is a diagram illustrating power transfer in the asynchronous grid using the present invention.

FIG. 2B shows bidirectional power converter pairs 23-1 and 23-2 are provided between the nodes (a) and (b) and between the nodes (b) and (c), respectively. When the bidirectional power converter pair 23 feeds power W1 and power W2 from the node (a) to the node (b) per unit time, and at the same timing, the bidirectional power converter pair 23-2 feeds power W2 from the node (b) to the node (c) per unit time, the power W1, that is, (the power W1+the power W2)–the power W2, is eventually fed to the node b. This power interchange is enabled by transmitting, as signals, destination information headers containing instructions to feed (W1+W2) and W2, respectively.

Figure 2C:
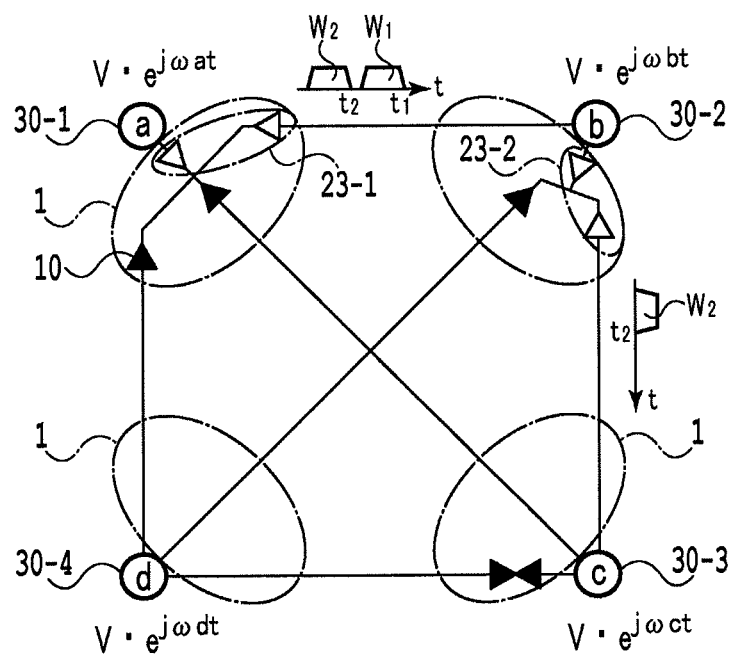
FIG. 2C is a diagram illustrating power transfer in the asynchronous grid using the present invention.

FIG. 2C illustrates time sharing power transmission in which different types of power are fed to the respective substations in a time sharing manner. First, a destination information header containing instructions to feed the power W1 per unit time arrives at the bidirectional power converter pair 23-1, which thus feeds the power W1 from node (a) to the node (b). At this time, the bidirectional power converter pair 23-2 is inactive, and no power is interchanged with node c. Then, a destination information header containing instructions to feed the power W2 to the node (c) per unit time arrives at both bidirectional power converter pairs 23-1 and 23-2, which are simultaneously operated at the magnitude W2. Thus, W2 is fed from node (a) to node (c). At this time, the power only passes through node (b). In this manner, different types of power can be interchanged for respective purposes in a time sharing manner.

This scheme is advantageous in that power can be fed to different destinations at the maximum output of the bidirectional power converter pair in a time sharing manner. This is similar to the concept of data packets in communications, and thus the power in this case may be referred to as a packet of power. The amount of power provided at the maximum output of the converters during a given time can be treated as one unit.

Figure 2D:
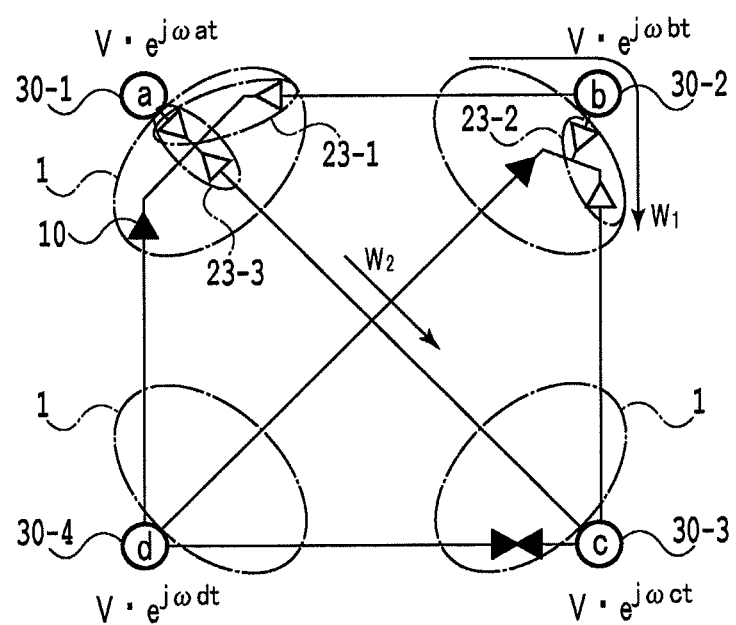
FIG. 2D is a diagram illustrating power transfer in the asynchronous grid using the present invention.

FIG. 2D illustrates multiple route power transmission in which a plurality of different power generation circuits are used to simultaneously feed different types of power to one substation. Bidirectional power converter pairs 23-1 to 23-3 are provided between the nodes (a) and (b), between the nodes (a) and (c), and between the nodes (b) and (c), respectively. In this example, information containing instructions to feed the power W1 is provided to the bidirectional power converter pairs 23-1 and 23-2. At the same time, information containing instructions to feed the power W2 is provided to the bidirectional power converter pair 23-3. As a result, the power W1 and the power W2 are fed to the node (c) via different routes.

Thus, in the present embodiment, the desired power can be interchanged among any number of nodes.

Figure 3A:
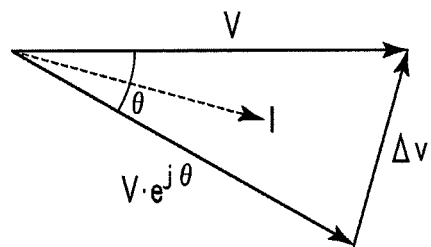
FIG. 3A is a diagram illustrating the principle of power exchange based on power conversions in the synchronous grid.
Figure 3B:
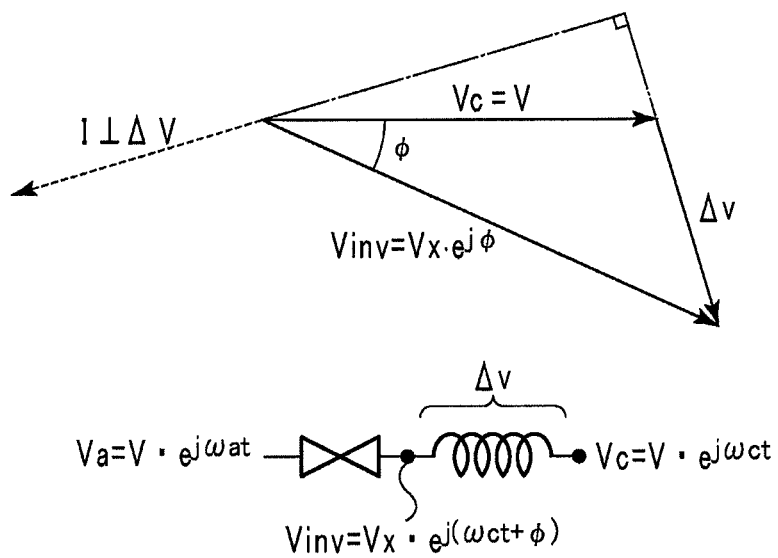
FIG. 3B is a diagram illustrating the principle of power interchange based on power conversions using the present invention in the asynchronous grid.

Here, the states of voltage and current vectors in FIG. 1 and FIG. 2A are shown in FIG. 3A and FIG. 3B. FIG. 3A shows an AC synchronous grid corresponding to FIG. 1. FIG. 3A is a vector diagram showing that nodes (a), (b), (c), and (d) are at the same voltage V and that the phase only of the node (c) is lagged by θ. At this time, a voltage difference ΔV occurs across a line reactor (L) on each of a link ac, a link bc, and link dc. A current I (=Iac=Ibc=Idc) of a magnitude ΔV/ωL flows so as to lag behind the phase of ΔV by 90 degrees. In FIG. 3A, the vectors have an equal voltage V. Thus, the voltage vectors form an isosceles triangle, and a current phase is θ/2. I=ΔV/jωL=(V−V·e$^{jθ}$)/jωL As complex power flowing into the node c, the current of the same magnitude I flows from three directions, that is, from nodes (a), (b), and (d), into node (c).

$$P + jQ = V \cdot 3 \cdot I^*$$
$$= V \cdot 3 \cdot V(1 - e^{-j\theta})/(-j\omega L)$$
$$= 3 \cdot (V^2/\omega L) \cdot (e^{-j\theta} - 1)$$
$$= 3 \cdot (V^2/\omega L) \cdot \sin\theta + j \cdot 3 \cdot (V^2/\omega L) \cdot (\cos\theta - 1)$$

($I^*$ is a conjugate complex number of $I$)

On the other hand, FIG. 3B shows the case of an AC asynchronous grid corresponding to FIG. 2A. Power from node (a) is rectified into DC power. The DC power is then inverted into AC power Vinv that is synchronous with the frequency ωc/2π of the node (c). When the complex voltage Vc of the node (c) is assumed to have a voltage V and a phase of 0, the complex voltage Vinv can have any value in accordance with a PWM signal provided to the power converter. The magnitude of Vinv is denoted by Vx, the phase difference between Vinv and Vc is denoted by φ, and Vinv is synchronized with Vc. Then, when the reactance of a transformer and a reactor between Vinv and Vc is assumed to have a magnitude L, a voltage difference ΔV occurs across the transformer or reactor. That is, when Vinv=Vx·e$^{(jωct+φ)}$, Vc=V·e$^{jωct}$, and ΔV=Vc−Vinv, the current I flowing through the reactor L is expressed by:

I=ΔV/jωL=(V−Vx·e$^{jφ}$)/jωL.

Furthermore, the power that can be transferred is expressed by:

$$P + jQ = V \cdot I^*$$
$$= V \cdot (V - Vx \cdot e^{j\phi})/(-j\omega L)$$
$$= V \cdot Vx\sin\phi/\omega L + j \cdot (V^2 - V \cdot Vx \cdot \cos\phi)/\omega L.$$

As described above, the magnitude Vx of the complex voltage Vinv and the phase difference φ between Vinv and Vc can be optionally set. Thus, the magnitudes and directions of transferred active power and reactive power can be optionally designated.

In conventional power grids, an increased number of what is called mesh links complicate power flow calculations because adjacent nodes affect each other. Furthermore, at the time of an accident, a large current may flow in from many locations, and the capacity of the circuit breaker may be exceeded, preventing accident circuit interruption. Thus, conventional power networks with synchronous grids use, instead of mesh links, comb-shaped or radial links through which power flows from upstream to downstream.

In contrast, in the asynchronous interconnection circuit network with multi-terminal power conversion devices 1 according to the present invention, power flow calculations are much easier than in the case of synchronous interconnection because solutions can be found through linear simultaneous equations.

Furthermore, general synchronous grids involve a given relationship between active power and reactive power generated by a power generator. The active power and reactive power cannot be independently generated. Thus, the voltage is adjusted by allowing the power generator to generate active power and to adjust the frequency, while using a capacitor facility provided in the grid to generate reactive power. By contrast, the multi-terminal power conversion device 1 can supply both active power and reactive power at any magnitude via one input/output terminal.

In the present invention, a power grid adapted to autonomously generate renewable energy power allows power to be interchanged among the power apparatuses within the local grid. If the balance between demand and supply is forecast to be disrupted in spite of internal interchange, power can be interchanged to and from another power grid through a plurality of asynchronous interconnection routes. Thus, both power grids complement each other so as to operate autonomously. Furthermore, a fluctuation in output associated with the renewable energy power is absorbed inside the power grid or through an asynchronous interconnection network with another power grid. Hence, the bulk power grid is unlikely to be affected by the fluctuation. As a result, the synchronizing power of the bulk power grid can be maintained to allow a plurality of power grid networks to cooperate with one another stably, enabling a large quantity of renewable energy power to be introduced into the power grid.

The present invention relates to a multi-terminal power conversion device, a multi-terminal power transfer device, and a power network system which enable any quantity of power to be interchanged among a plurality of asynchronous power grids and which allow the power grids to supply reactive power required for mutual voltage maintenance.

Embodiments of the present invention will be described below with reference to the drawings.

(Summary of the Power Network System)

Figure 4A:
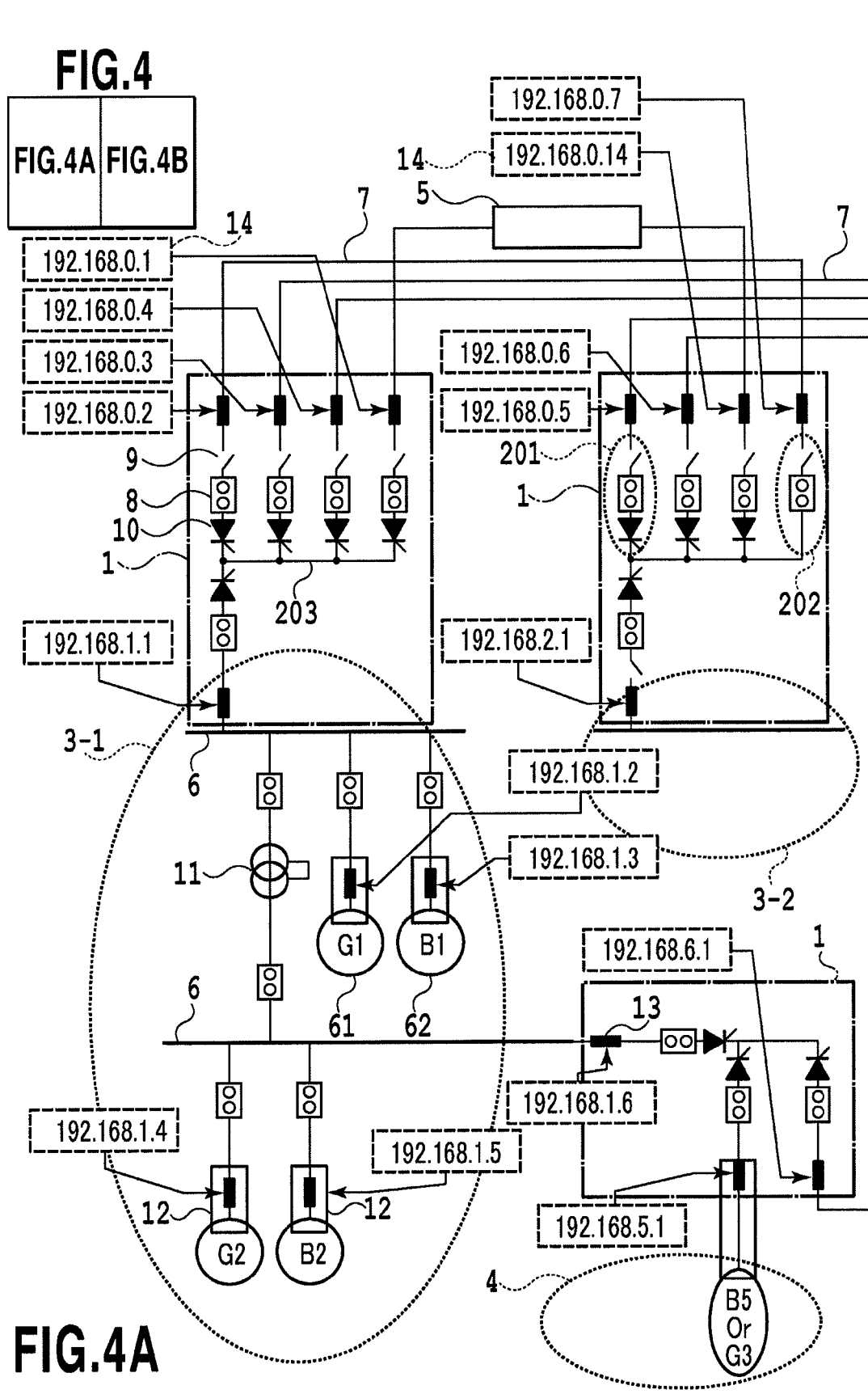
FIG. 4A is a diagram showing a general image of a power network system according to the present invention.
Figure 4B:
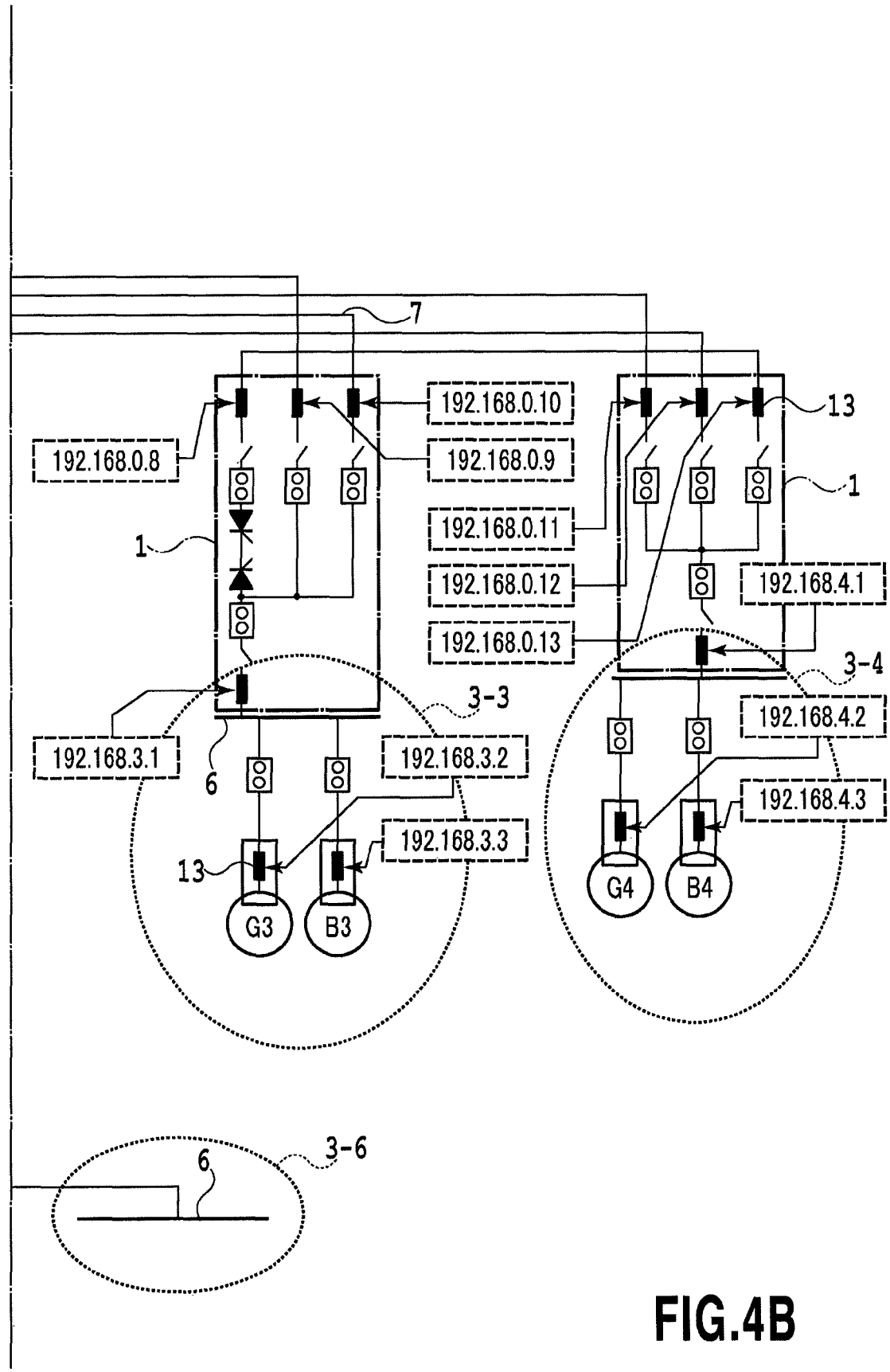
FIG. 4B is a diagram showing a general image of the power network system according to the present invention.

FIGS. 4A and 43 show an example of a general image of the power network system according to the present invention. FIGS. 4A and 4B show six power grids, autonomous power grids 3-1 to 3-4 and 3-6 and power apparatus system 4. Each of the power grids includes a power bus 6, and a generation device 61, an energy storage device 62, and a power apparatus such as a general consumer load (not shown in the drawings) all of which are arranged under and connected to the power bus 6. However, the power apparatus system 4 is shown as an example of a special power apparatus system 4 to which a single power apparatus is connected. The power grids are connected together via multi-terminal power conversion devices 1.

The multi-terminal power conversion device 1 includes a plurality of self-commutated power converters 10 connected together in parallel via a common bus 203 and to which circuit breaker 8, a disconnecting switch 9, and a power line carrier communication terminal 13 are connected. A power apparatus control terminal device 12 installed at each of the power grids 3-1, 3-3, and 3-4 and the power apparatus system 4 also includes a power line carrier communication terminal 13. The power line carrier communication devices 13 are assigned unique Internet Protocol (IP) addresses 14.

The power grids 3-1 to 3-4 and 3-6 and the power apparatus system 4 are connected together via interconnecting electric lines 7. In the illustrated configuration, the power bus 6 and the interconnecting electric line 7 also function as a power line carrier communication path. The power grid 3-1 includes two power buses 6 connected together via a transformer 11 with a power line carrier communication bypass. In the specification, the entire, system is referred to as an "inter-power grid asynchronous interconnection network system". In the illustrated network system, the power line carrier communication terminal 13 is used as a communication system between the multi-terminal power conversion devices 1. Nevertheless, the communication system may alternatively use an electric line or an optical fiber cable dedicated to communications, or radio.

The power grids 3-1 to 3-4 and 3-6 and the power apparatus system 4, as well as a bulk power grid 5, are all autonomous power grids that do not require synchronization with one another. The multi-terminal power conversion device 1 is installed on each of the power buses 6 for the power grids 3-1 to 3-4. The multi-terminal power conversion device 1 includes an A connection terminal 201 with the circuit breaker 8, the disconnecting switch 9, and the self-commutated power converter 10, and a B connection terminal 202 with the circuit breaker 8 and the disconnecting switch 9.

Power grids can be connected together via the bulk power grid 5, the A connection terminal 201, and the interconnecting electric line 7, as in the case of the power grids 3-1 and 3-2. In this case, although not shown in the drawings, connections on the bulk power grid side can be achieved by simply disconnecting the switch and circuit breaker or the B connection terminal 202. Power can be transferred by synchronizing the power converters 10 at the connection terminals 201 in the power grids 3-1 and 3-2 with a grid voltage. Of course, the multi-terminal power conversion device 1 may be located on the bulk power grid 5 and connected to each of the power grids via the A connection terminal 201. In this case, the connection target power grid may include, the B connection terminal 202 without a self-commutated power conversion function.

As described below, the multi-terminal power conversion device 1 is characterized in that at least one of the A connection terminals 201 rectifies the power of the connection target power grid into DC power and in that through the DC common bus 203, at least one of the group of the A connection terminals 201 inverts the power through synchronization with the voltage, phase, and frequency of the connection target and transmits the inverted power so as to set, to zero, the sum of power flowing into the DC common bus 203 and power fed out from the DC common bus 203.

The A connection terminal 201 in the multi-terminal power conversion device 1 installed at the power grid 3-1 is connected to the power grids 3-2 to 3-4 via the interconnecting electric line 7. In the connection target power grid, the connection is made to the B connection terminal.

The A connection terminal 201 in the multi-terminal power conversion device 1 installed at the power grid 3-2 is connected to the B connection terminal 202 in the multi-terminal power conversion device 1 installed at each of the power grids 3-3 and 3-4 via the interconnecting electric line 7.

The A connection terminal 201 in the multi-terminal power conversion device 1 installed at the power grid 3-3 is connected to the B connection terminal 202 in the multi-terminal power conversion device 1 installed at the power grid 3-4 via the interconnecting electric line 7. In this example, the multi-terminal power conversion device 1 installed at the power grid 3-3 includes a BTB converter with two A connection terminals 201 abutting each other back to back, and the B connection terminal 202.

The multi-terminal power conversion device 1 installed at the power grid 3-4 includes only the B connection terminals 202 and not the A connection terminal 201.

The multi-terminal power conversion device 1 installed on a power bus for a voltage class lower than that of the power grid 3-1 is connected directly to a power apparatus in a single-power-apparatus system 4. If the power apparatus is a voltage storage device, the self-commutated power converter 10 at the A connection terminal 201 generates an appropriate DC voltage to enable charging and discharging. If the power apparatus is a wind power generator or the like which uses an AC power generator, the wind power generator can be controllably interconnected with any power grid by allowing the A connection terminal 201 to generate autonomous AC power and rectify the AC power in accordance with the DC voltage on the DC common bus 203.

If the power apparatus is a solar power generation device or a fuel cell power generation device, power interchange can be achieved by allowing the A connection terminal 201 to carry out DC conversion. If the power apparatus is an internal combustion engine power generator, the internal combustion engine power generator can be controllably interconnected with any power grid by allowing the A connection terminal 201 to generate autonomous AC power. A renewable energy power generator can be developed which incorporates a new power generation control method based on a combination of the multi-terminal power conversion device 1.

At the connection terminal 201 connected to the power grid 3-6, the power receiving side is coupled directly to the power bus without a circuit breaker. This connection method is possible where the feeding capacity of the A connection terminal 201 is sufficient to deal with loads on the power grid 3-6 and the interrupting capacity of the A connection terminal 201 is sufficient to interrupt a fault current if an accident occurs in the power grid 3-6.

FIGS. 4A and 4B do not show any interconnecting electric line 7 through which the power grid 3-6 is asynchronously connected to the power grids 3-2 to 3-4 and the power apparatus system 4. However, the three multi-terminal power conversion devices 1 and the power grid 3-1 can be interconnected together to achieve power interchange.

Each of the power grids shown in FIGS. 4A and 4B is formed like a conventional synchronous grid. The autonomous power grid includes a power generation device 61, an energy storage device 62, and a load (not shown in the drawings) arranged under the power bus 6 via the circuit breaker 8. The power generation device 61, the energy storage device 62, and the load are collectively referred to as a power apparatus. The power apparatus additionally includes a power apparatus control terminal device 12 with a power control section that controls the input and output of power and communication means for transmitting external signals to the power control section. The power apparatus control terminal device 12 is a communication data terminal end (DTE) and serves as a power control interface. This enables communications with a communication system described below in accordance with a communications protocol, allowing the controllable adjustment of the outputs of, for example, a wind power generator and the energy storage device within the same power grid. According to the present invention, the network is referred to as an "intra-power grid synchronous network system".

FIGS. 4A and 4B show a typical example of a power network system that enables power interchange among different power grid power apparatus and simultaneous and asynchronous power interchange among a plurality of power grids; in the power network system, a plurality of inter-power grid asynchronous interconnection network systems with a plurality of asynchronous power grids connected together by the multi-terminal power conversion devices 1, the power grids including a bulk power grid and each having any voltage, phase, and frequency, are connected to an intra-power grid synchronous network system including a power apparatus installed at an autonomous power grid and the electrical apparatus control terminal device 12.

Power generated by a particular power apparatus in a power grid can be transmitted to a particular power apparatus in another power grid by connecting the above-described "inter-power grid asynchronous interconnection network systems" and "intra-power grid synchronous network system" together through the connection terminals of the multi-terminal power conversion devices 1 so as to controllably integrate the systems. Thus, when excessive power is generated by one power grid, the power can be absorbed by many surrounding power grids, or when a power grid suffers an output shortage, power from the energy storage devices or power generation devices in surrounding power grids can be fed into the target power grid via a plurality of networks.

As a result, in areas such as Japan, Europe, and the U.S. where bulk power grids have been established, power grids following substations are allowed to operate separately and asynchronously to enable the introduction of a large quantity of renewable energy power.

In many areas such as developing countries, small AC power grids are located in a number of villages, towns, and cities in a distributed manner.

A small power grid alone may suffer frequent frequency instability and frequent instantaneous voltage drops and power failures, and variable power such as solar cell power or wind power makes management of the grid difficult. However, these areas should transition away from fossil fuel as soon as possible, and start to adopt renewable energy.

The utilization of the present invention allows power apparatuses to be shared by connecting small power grids together via multi-terminal power conversion devices 1 to form an asynchronous interconnection network. Thus, problems such as frequent instability and frequent instantaneous voltage drops and power failures can be solved. Furthermore, renewable energy can be introduced to promote the transition from fossil fuel.

A first step for shifting to the power network system according to the present invention is to introduce a required power apparatus and a power apparatus control terminal device 12 into a power grid below a substation to form an autonomous power grid and to install the multi-terminal power conversion device 1 between the transformer substation bus and the conventional transmission line connecting transformer substations together to asynchronously interconnect the power grid with other power grids or bulk power grids. The next step is to gradually increase the number of interconnected power grids, while reducing power transferred from the bulk power grid, as the quantity of renewable energy power increases. In this manner, a reasonable shift to the power network system according to the present invention can be achieved.

(Multi-Terminal Power Conversion Device)

Figures 5A, 5B:
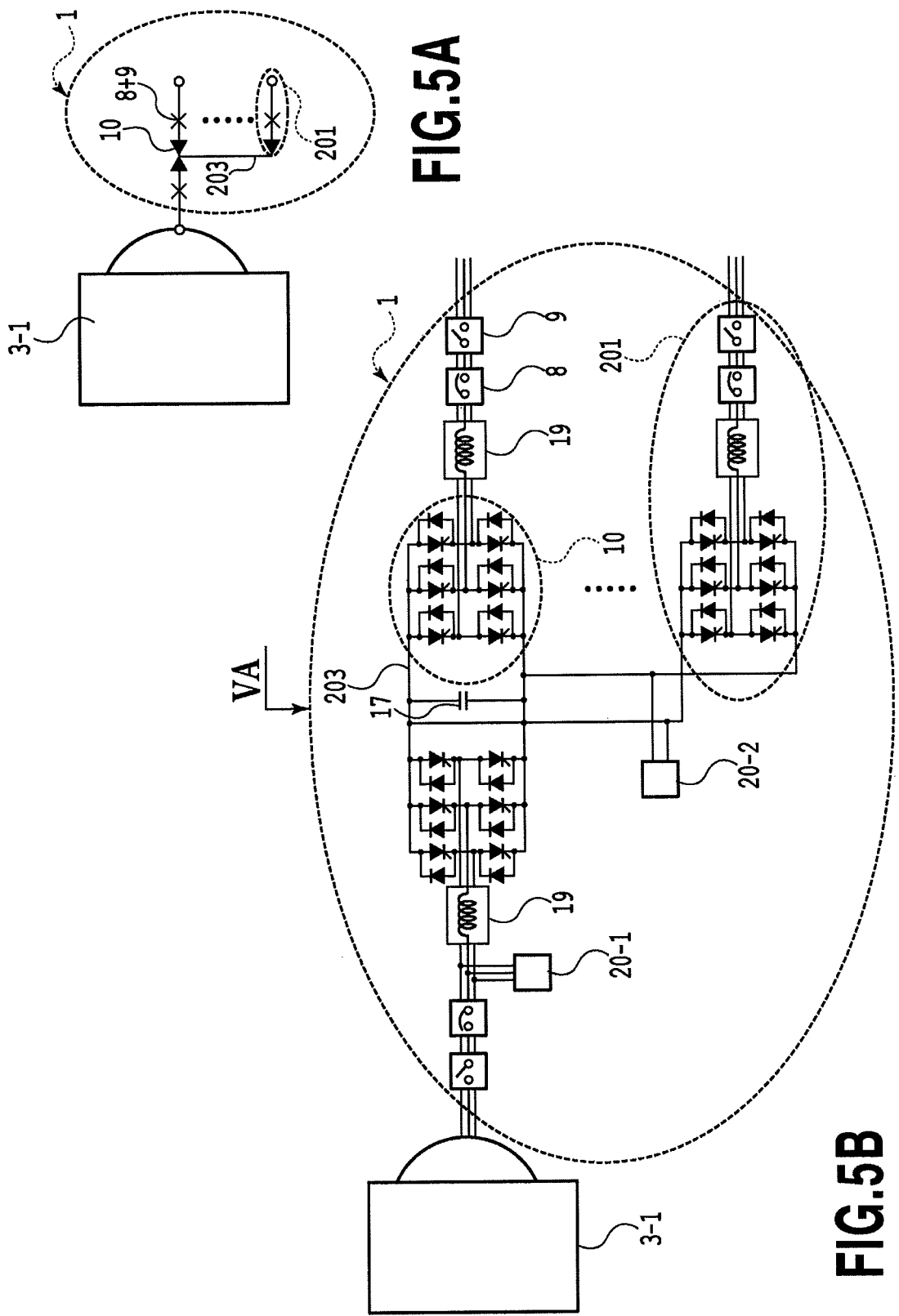
FIG. 5A is a simplified diagram of a multi-terminal power conversion device.
FIG. 5B is a diagram showing the multi-terminal power conversion device.

FIGS. 5A and 5B show the structure of the multi-terminal power conversion device 1. FIG. 5A shows the power converter 10, disconnecting switch 9, and circuit breaker 8 described above. FIG. 5A shows that the disconnecting switch and the circuit breaker are integrated together. However, the disconnecting switch and the circuit breaker may be separated from each other. VA denotes the multi-terminal power conversion device 1 expressed more accurately than in FIG. 5A. The power converter 10 in FIG. 5B is a full bridge bidirectional converter. FIG. 5B shows an example of configuration including not only the power converter 10, the disconnecting switch 9, and the circuit breaker 8 but also a capacitor 17, a reactor 19, an AC filter and a surge arrestor 20-1, and a DC filter and a DC smoothing reactor 20-2. Although not shown in the drawings, a transformer requiring voltage adjustment is installed as needed.

Figure 6:
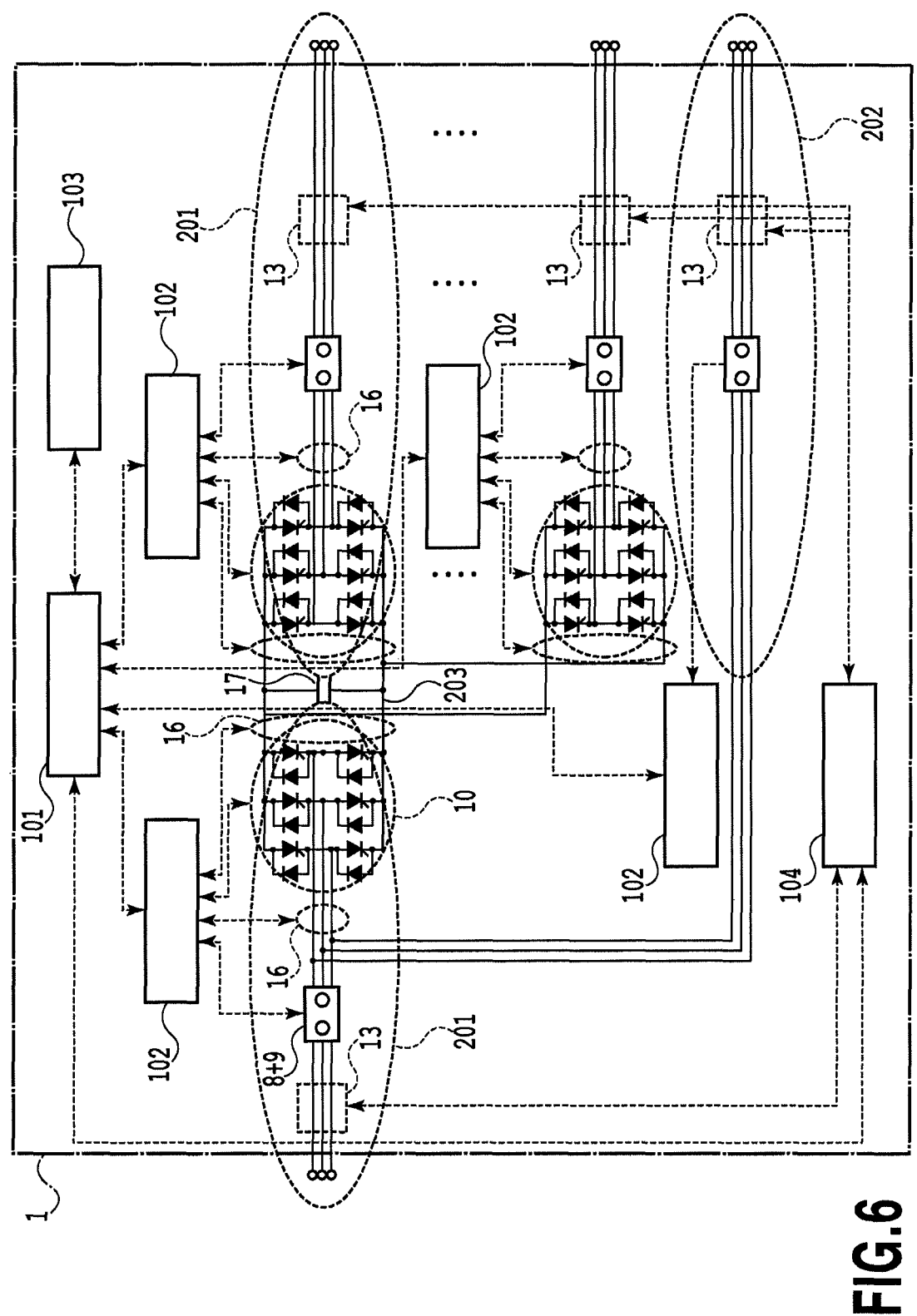
FIG. 6 is a diagram showing a detailed structure of the multi-terminal power conversion device.

FIG. 6 shows the structure of the multi-terminal power conversion device 1 configured to individually control power for a large number of asynchronously interconnected power grids. The multi-terminal power conversion device 1 plays a role in distributing power among different power grids. This enables the operation of interchanging power among particular power grids, which is conventionally impossible, with a reduced number of power converters 10. Thus, the degree of freedom of control and reliability can be improved, and the number of power conversions and thus power losses can be reduced.

The multi-terminal power conversion device 1 includes the A connection terminal 201 with the circuit breaker 8, the disconnecting switch 9, and the self-commutated power converter 10 and the B connection terminal 202 with the circuit breaker 8 and the disconnecting switch 9. FIG. 6 shows that the multi-terminal power conversion device 1 includes the power line carrier communication terminal 13. However, the power line carrier communication terminal 13 is not needed when an external data network is used. A voltage, current, and power measuring instrument 16 is classified as a type that calculates power based on voltage and current and a type that involves a dedicated power measuring instrument. The voltage, current, and power measuring instrument 16 is further classified into a type installed on the DC common bus 203 and a type installed on the AC side. Measured values from the voltage, current, and power measuring instrument 16 can be used for power transactions. Moreover, a dedicated power measuring instrument 16 can be separately provided for transactions. Some aspects are characterized in that the voltage, current, and power measuring instrument 16 is installed on the rectification side of the A connection terminal 201, and other aspects are characterized in that the voltage, current, and power measuring instrument 16 is installed on the inversion side of the A connection terminal 201. In the specification, a combination of the A connection terminal 201 and the voltage, current, and power measuring instrument 16 is referred to as a power conversion unit.

Records of power are saved to a recording device 103 and used for analysis and management of power transactions. That is, when a power interchange transaction takes place between two power grids, power conversion related information and transaction related information are recorded in association with each other so as to allow one power interchange instance to be explicitly distinguished from any other power interchange instance. Furthermore, basic data about payment of the electric power fee resulting from power interchange is accumulated in the recording device 103. The data is periodically backed up and duplicated for reliability and security. Data required for power transactions is individually specified but the installed recording device must comply with any laws governing power transactions.

The illustrated common bus 203 is of a DC type but may be of an AC type. Alternatively, a power conversion circuit such as a matrix converter or a triac may be used. A DC voltage stabilizing capacitor 17 is used when the common bus 203 is of the DC type.

In FIG. 6, the A connection terminal 201 includes the mechanical disconnecting switch 9 that can disconnect the circuit, the circuit breaker 8 with a required interrupting capacity, and the self-commutated bidirectional power converter 10, and the B connection terminal 202 includes only the mechanical disconnecting switch 9 that can disconnect the circuit and the circuit breaker 8 with a required interrupting capacity. The multi-terminal power conversion device 1 is classified into three types, one with both the A connection terminal 201 and the B connection terminal 202, one with only the A connection terminal 201, and one with only the B connection terminal 202. In the specification, the multi-terminal power conversion device 1 including only the B terminal 202 is sometimes referred to as a multi-terminal power transfer device so as to distinguish it from the multi-terminal power conversion device 1 including at least the A terminal 201.

One terminal of the A connection terminal 201 is connected to the common bus 203, and the other terminal of the A connection terminal 201 is connected to the power grid with the multi-terminal power conversion device installed therein or to another power grid via another multi-terminal power conversion device 1. The A connection terminal 201 rectifies the power of each power grid into DC power, and inverts the power through synchronization with the voltage, phase, and frequency of the connection target via the common bus 203 and transmits the inverted power.

The common bus 23 is controlled to set, to zero, the sum of power following into the A connection terminals 201 connected together in parallel and power fed out from the A connection terminals 201. An energy storage device or a secondary battery can be connected to the common bus 203. In this case, the charge and discharge control of the energy storage device or the secondary battery may be incorporated into the control of the common bus 203 for setting the sum of input power and output power to zero. The energy storage device or the secondary battery may be located at the connection target of the A connection terminal 201 so as to be charged and discharged under the converter controlled by the A connection terminal 201.

Figure 7:
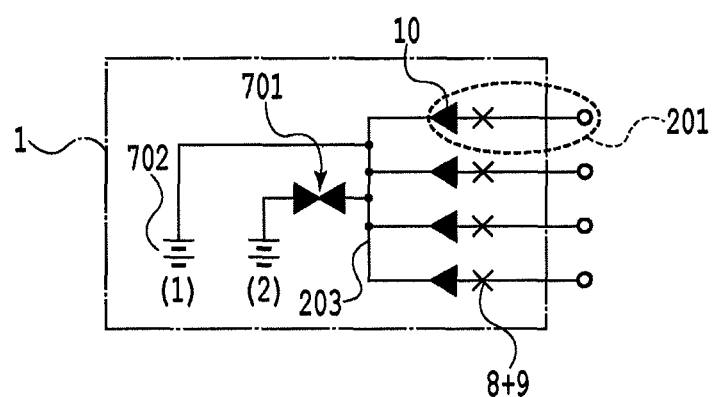
FIG. 7 is a diagram showing a configuration of a energy storage device connection circuit.

In FIG. 7, FIG. 7(1) shows that where the common bus 203 in the multi-terminal power conversion device 1 is of the DC type, an energy storage device 702 is coupled directly to the common bus 203, and FIG. 7(2) shows that the energy storage device 702 is connected to the common bus 203 via a DC/DC converter 701. This configuration allows required power to be supplied to the common bus 203 and also allows excess power to be absorbed.

The multi-terminal power conversion device 1 can use the following control method. If the energy storage device 702 is not provided, one of the input/output terminals of the multi-terminal power conversion device 1 maintains the DC voltage of the DC common bus 203 and the other terminals perform active power control so that the input/output terminal maintaining the DC voltage compensates for the excess or insufficiency of the sum.

If the energy storage device 702 is connected to the common bus 203, the energy storage device 702 maintains the DC voltage, thus allowing all the input/output terminals to perform active power control. Any excess or deficit of the sum is compensated for by the energy storage device 702.

In this case, unless the state of charge of the energy storage device 702 is accurately predicted, an overcharge or overdischarge may occur. Hence, measuring system for the state of charge is important.

If the energy storage device 702 is a secondary battery, the DC voltage fluctuates depending on the state of charge (SOC) in the battery. In this case, to allow the secondary battery to be connected to the DC common bus 203, the voltage of the DC bus needs to be maintained on the assumption that this state corresponds to the case illustrated in FIG. 7(2).

If the energy storage device 702 is a secondary battery, the DC voltage may not fluctuate significantly in spite of fluctuation in the state of charge (SOC) in the battery. In this case, to allow the secondary battery to be connected to the DC common bus 203, the secondary battery may be coupled directly to the DC bus on the assumption that this state corresponds to the case illustrated in FIG. 7(1).

The B connection terminal 202 is installed at another power grid connected via an interconnecting electric line and is paired with the A connection terminal 201 of another multi-terminal power conversion device 1. The A connection terminal 201 can be used instead of the B connection terminal 202. However, two commutated power converters 10 can be used between power grids connected together, and thus for a reduction in conversion loss, it is desirable that the B terminal 202 with no commutated power converter be connected to the interconnecting electric line connected to the A connection terminal 202 in another multi-terminal power conversion device 1.

Furthermore, the capacity of power transferred to and from the power grid can be increased by connecting a plurality of A connection terminals 201 of one multi-terminal power conversion device 1 to the power grid. Moreover, the capacity of power transferred to and from the power grid can be increased and the number of power grids that can be connected to the power grid can be increased, by connecting each of the A connection terminals 201 of a plurality of multi-terminal power conversion devices 1 to the power grid.

If the common bus 203 is of the DC type, the rectification sides of the self-commutated power converters 10 of the A connection terminal 201 are connected together in parallel via the common bus 203, and a capacitor is installed on the common bus 203 in order to maintain the voltage. A DC filter or a surge arrester may be additionally installed as needed. The inversion side of the self-commutated power converter 10 includes at least one of an AC reactor and an AC transformer, and as needed, an AC filter and a surge arrester, if the connection target is an AC power grid, and includes a smoothing capacitor, and as needed, a smoothing reactor, if the connection target is a DC power grid.

The multi-terminal power conversion device 1 is controlled by a power control system including a control device 102 that performs DC voltage, AC voltage, effective voltage, reactive voltage, current, phase synchronization and PWM gate control on each of the A connection terminals 201 and controls the circuit breaker 8 and disconnecting switch 9 for the A connection terminal 201 and the B connection terminal 202, and a common control device 101 that controls the terminal control device 102 to perform start and stop operations and setting of power transmitted through each input/output terminal as well as all-power cooperative control. Furthermore, the common control device 101 can communicate with any other multi-terminal power conversion device 1 via the communication control device 104 so that a power transaction can be executed between the multi-terminal power conversion devices. In the specification, the common control device 101 and the terminal control device 102 are collectively referred to as a control unit.

The terminals of the multi-terminal power conversion device 1 may have the same capacity or different capacities. Having the same capacity allows the same control constants and the like to be used for all the terminals and serves to eliminate all restrictions on power distribution, thus enabling efficient operations. For the transfer of power, equal power may be distributed among all the terminals, different types of power may be distributed to the respective terminals, or the power may be intermittently fed in a time sharing manner depending on the usage of the interconnecting electric line.

As an electronic transaction system, the recording device 103 may be provided in which values from the voltage, current, and power measuring instrument 16 for each A connection terminal 201 and power interchange profile data are recorded so as to be used for power transactions. The voltage, current, and power measuring instrument 16 can be automatically calibrated as needed by using software described below to operate the power converter 10. The amount of power may be measured by using a voltage and current measuring device otherwise intended for control or executing calculations using data from the voltage and current measuring device.

Then, a multi-terminal power conversion system configured to interchange power among a plurality of power grids in a distributed manner can be constructed by combining a unit including a combination of the power converters 10 to maintain the DC voltage with a unit that controls power and allowing a central processing unit installed in the system to integrally control all power inputs and outputs.

Thus, an inter-power grid asynchronous interconnection network can be constructed in which the interconnecting electric line includes the A connection terminal 201 of the multi-terminal power conversion device 1 at one end and the B connection terminal 202 at the other end. This interconnection network does not have a branch in the middle of interconnecting electric lines in each connecting of any two power grids. Compared to conventional BTB interconnection devices, the multi-terminal power conversion device 1 serves to reduce the number of power converters 10 required, allowing the number of conversions required for power interchange to be reduced by half.

Furthermore, the cooperative control among a plurality of BTB interconnection devices is complicated because of different installation dates and manufacturers. However, the multi-terminal power conversion device 1 according to the present invention, which is integrated, enables comprehensive control including not only the cooperative control between the A connection terminals 201 but also the operational control of the B connection terminal 202.

Thus, the connection terminals can be connected to a plurality of AC or DC power grids so that power can be interchanged among the power grids. Although BTB interconnection devices and loop controllers provide one-to-one power interchange, the present invention enables one to N or N to N power interchange.

The adoption of the self-commutated power converter 10 allows power and phase to be independently controlled in a grid interconnection mode. Thus, any active power can be fed in any direction, and any reactive power of any magnitude can be independently generated. This also enables the voltage to be controlled. Furthermore, the self-commutated feature allows power to be supplied in an autonomous mode if the power grid of the connection target is brought into a zero voltage state (blackout).

Additionally, the integrated structure allows the DC bus to be enclosed within a closed cubicle. This minimizes the probability of grounding and short circuiting.

Furthermore, additional integration of the B connection terminal 202 allows turn-on and -off of the circuit breaker to be controlled and the disconnection switch to be automated and also provides required power information. Thus the power network system can be integrally controlled.

(Synchronous Interconnection Network)

Figure 8:
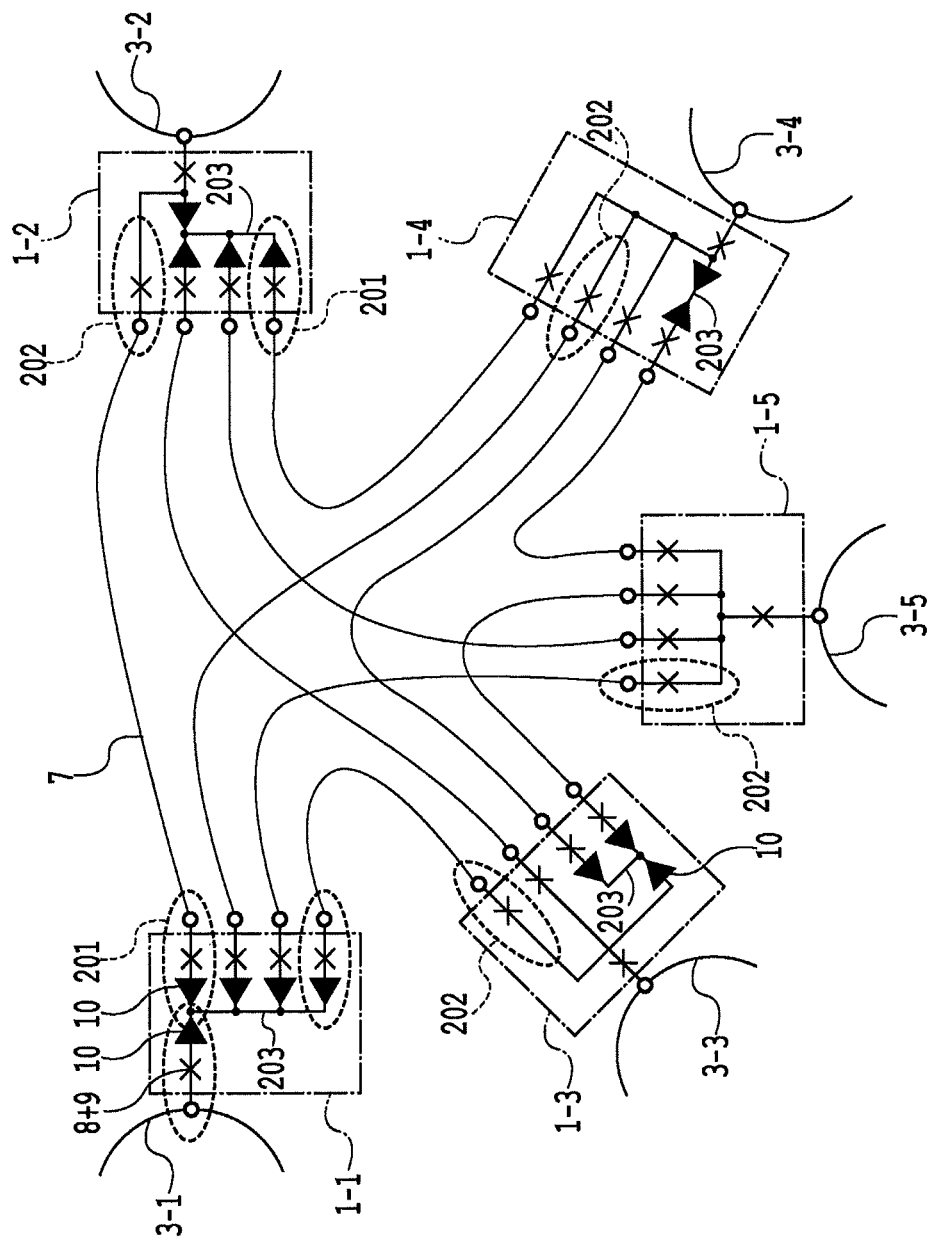
FIG. 8 is a diagram showing an example of connections in a power network according to the present invention.

FIG. 8 shows an example of connections in a power network where $\frac{1}{2} \cdot N \cdot (N-1)$ power interchange links are generated among N power grids. FIG. 8 shows a form of the multi-terminal asynchronous interconnection device 1 that interconnects asynchronous power grids 3-1 to 3-5. The A connection terminals 201 of a multi-terminal power conversion device 1-1 installed at the power grid 3-1 are connected, via the interconnecting electric lines 7, to the B connection terminals 202 of multi-terminal power conversion devices 1-2 to 1-5 at the respective power grids 3-2 to 3-5, to form a network with the power grid 3-1. The A connection terminals 201 of the multi-terminal power conversion device 1-2 installed at the power grid 3-2 are connected, via the interconnecting electric lines 7, to the B connection terminals 202 of the multi-terminal power conversion devices 1-3 to 1-5 at the respective power grids 3-3 to 3-5, to form a network with the power grid 3-2. The A connection terminals 201 of the multi-terminal power conversion device 1-3 installed at the power grid 3-3 are connected, via the interconnecting electric lines, to the B connection terminals 202 of the multi-terminal power conversion devices 1-4 and 1-5 at the respective power grids 3-4 and 3-5, to form a network with the power grid 3-3. The A connection terminal 201 of the multi-terminal power conversion device 1-4 installed at the power grid 3-4 are connected, via the interconnecting electric line, to the B connection terminal 202 of the multi-terminal power conversion device 1-5 at the respective power grid 3-5, to form a network with the power grid 3-4. In the network among the five power grids shown in FIGS. 8, 10 asynchronous power interchange links are generated.

In this manner, $\frac{1}{2} \cdot N \cdot (N-1)$ power interchange links are generated among N power grids. In conventional comb-shaped power grids, N+1 power interchange links are created for N power grids. However, according to the present scheme, the number of links is proportional to the square of N, and the flexibility of power interchange increases consistently with N. The present scheme is characterized in that the capacity of the interconnecting electric line and the capacity of the connection terminals of each of the multi-terminal power conversion device 1-1 to 1-5 can be reduced in proportion to the square of N.

Thus, for example, for N=10, theoretically 45 asynchronous power interchange links are generated. For N=20, 190 links are generated, and for N=30, as many as 435 links are generated. Since a plurality of multi-terminal power conversion devices can be provided for one power grid, the theoretical number of links can further be increased.

Figure 9A:
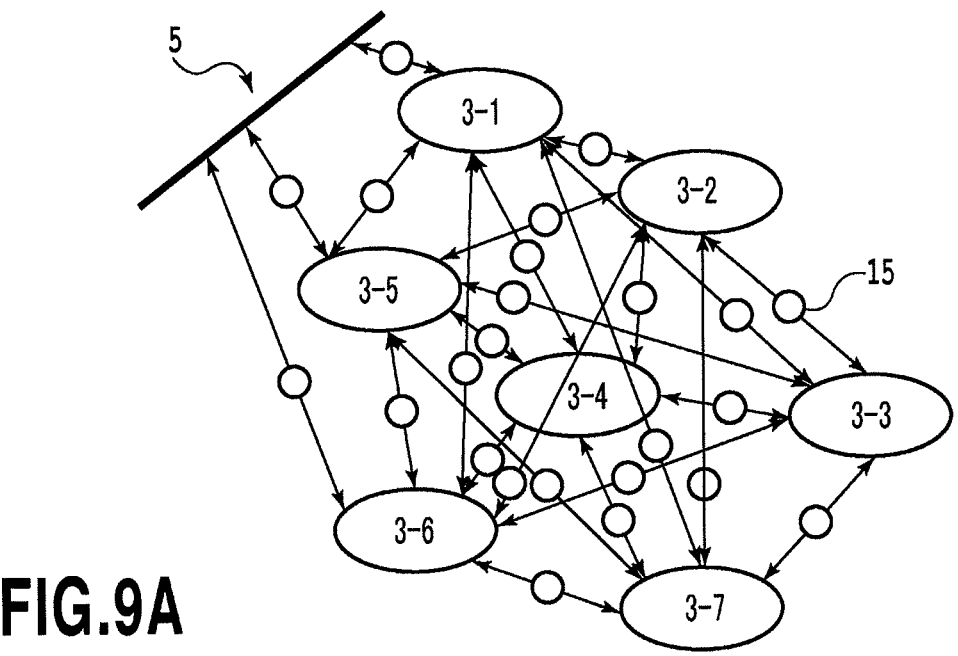
FIG. 9A is a diagram showing how many BTB interconnection devices are used in a power network including eight power grids.
Figure 9B:
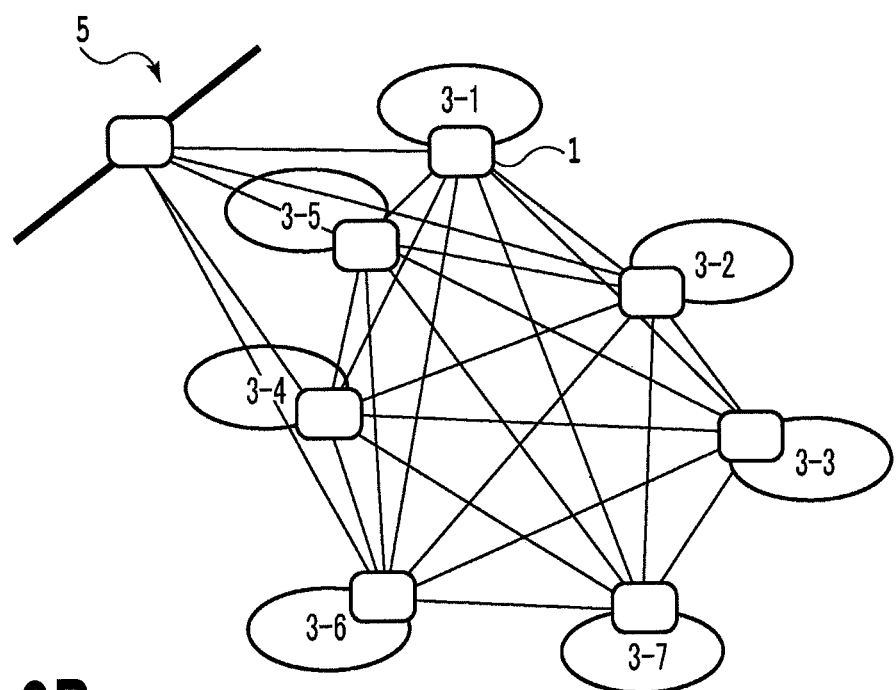
FIG. 9B is a diagram showing how many multi-terminal power conversion devices are used in the power network including eight power grids.

FIGS. 9A and 9B are images of the number of interconnection devices when the number of power grids connected together is increased. The conventional technique requires $\frac{1}{2} \cdot N \cdot (N-1)$ BTB interconnection devices as, shown in FIG. 9A, but the present invention requires N devices as shown in FIG. 9B. Thus, the power interchange using the multi-terminal power conversion device according to the present invention is characterized by requiring a reduced number of apparatuses, being easily controlled, and enabling a reduction in facility investment, compared to the power interchange using the BTB interconnection device or loop controller.

For example, for N=5, theoretically 10 asynchronous power interchange links are generated. Thus, the number of links increases, for example, 15 for N=6 and 21 for N=7, and for N=20, 190 links are generated. Since a plurality of multi-terminal power conversion devices can be provided for one power grid, the theoretical number of links can be increased further.

If given power is passed from one node to another node, connecting a plurality of links together further increases the number of optional routes. The optimum one of these routes may be selected, but when a plurality of routes are simultaneously used so that power is passed through the routes in a distributed manner, the amount of power flowing through each route can be reduced.

If a plurality of nodes request a plurality of power interchanges, power flows can be offset by combining the appropriate routes and timings together. Thus, a routing selection algorithm is important which minimizes the sum of power losses in the power converters 10 and on the interconnecting electric lines.

Figure 10A:
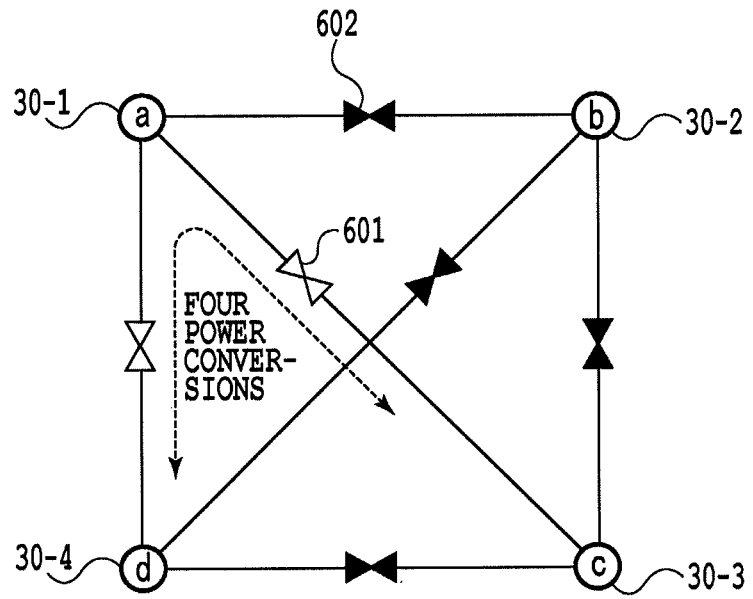
FIG. 10A is a diagram showing power interchange using BTB interconnection devices.
Figure 10B:
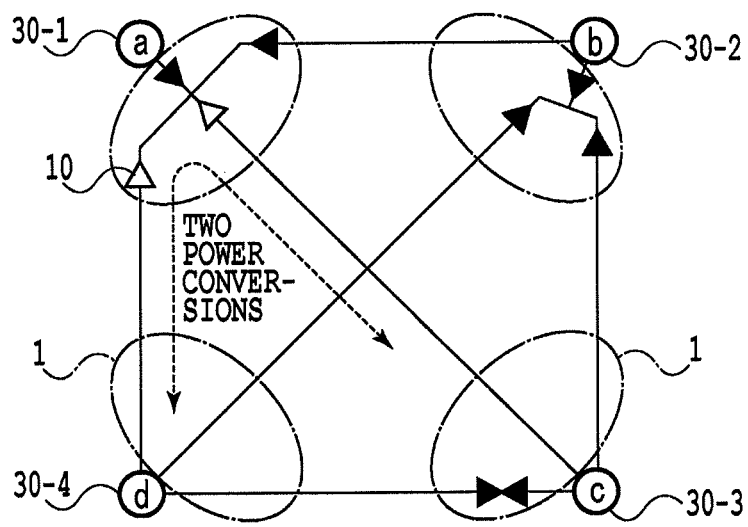
FIG. 10B is a diagram showing power interchange using multi-terminal power conversion devices.

FIG. 10A and FIG. 10B indicate that compared to the connection of a plurality of power grids using the conventional BTB interconnection device, the connection using the multi-terminal power conversion device according to the present invention enables a reduction in the number of power conversions required and in power losses.

FIGS. 10A and 10B illustrate a comparison of two cases in which four nodes (a), (b), (c), and (d) are assumed and in which when power is transferred from the node (d) to the node (c), the transfer is carried out via the node (a). FIG. 10A, which corresponds to the conventional art, illustrates a case where a BTB converter is installed at each link. In this case, an AC-DC conversion and a DC-AC conversion are carried out between the nodes (d) and (a) and also between the nodes (a) and (c). Thus, a total of four power conversions are carried out. Losses are also proportional to the number of conversions.

On the other hand, FIG. 10B, which corresponds to the present invention, illustrates a case where the multi-terminal power conversion device according to the present invention is installed. In this case, a power conversion is carried out between the nodes (d) and (a) and between the nodes (a) and (c). Thus, a total of two power conversions are carried out. Power losses are also reduced to half. Furthermore, the number of converters required, which is 12 according to the conventional art as shown in FIG. 10A, is 9 according to the present invention as shown in FIG. 10B. The number of devices is 6 in FIG. 10A but 4 in FIG. 10B.

Thus, the multi-terminal power conversion device according to the present invention is more advantageous than the BTB interconnection device in terms of power losses and the number of facilities required.

Furthermore, a plurality of multi-terminal power conversion devices 1 may be installed at one power grid or a plurality of interconnecting electric lines may be installed on one power interchange route. However, by utilizing Kirchhoff's law, it is important that an interconnecting electric line located between the A connection terminal 201 and B connection terminal 202 connecting any two power grids together includes no branch in the middle.

To allow a power network system to function appropriately, each interconnecting electric line desirably includes the A connection terminal 201 at one end and the B connection terminal 202 at the other end. However, the B connection terminal 202 may be replaced with a simple circuit breaker or the A connection terminal 201 without any problem.

FIG. 8 shows that five power grids are connected together via all combinatory routes. However, not all these routes are required and a set of power conversion elements need not be provided for each route.

The power converter 10 can be subjected to both a grid interconnection operation and an autonomous operation. Thus, in this power grid, when any power grid is wholly subjected to a power failure, the power converter 10 can be provided as a voltage source for restoration. Restoration from the accident can be facilitated by performing a restoration operation so that the power supply of the power grid is interconnected with the voltage source. In this case, the present power system provides a plurality of power supply routes and is thus advantageous for the restoration operation after an accident.

If any power grid is separated from another power grid for any reason, when power generation and consumption in this power grid are almost equal, a phenomenon called an isolated operation may occur in which the power grid continues operating in an isolated manner. If a time synchronizing electric waveform is detected continuously, even when an isolated operation occurs, the occurrence can be identified based on the failure to detect the electric waveform.

This phenomenon may cause the following accident. In a synchronous grid that passes power from upstream to downstream, in spite of an upstream power failure, voltage may be delivered from the downstream side, and an operator who is unaware of this may be injured or killed by electrical shock.

The power system proposed by the present invention includes a plurality of power supply routes and is thus unlikely to become isolated. The power system uses asynchronous interconnection to allow power to be interchanged among the power grids even when the power grids do not synchronize with one another. Consequently, a voltage is available both on the upstream side and on the downstream side. Operational safety may be ensured based on a check for presence of voltage.

(Synchronous Interconnection Network)

With reference to FIGS. 4A and 4B, an intra-power grid synchronous network system will be described in which a power apparatus with the power apparatus terminal control device 12 is installed.

In the power grids 3-1 to 3-4 and 3-6, the power bus is denoted by 6, and the circuit breaker 8 and the disconnecting switch 9 are connected to the bus to allow power to be supplied to power apparatuses such as the power generation device 61 and the energy storage device 62 via cables.

The power apparatus includes the power apparatus control terminal device 12, through which power control can be performed. The power apparatus control terminal device includes a built-in communication terminal that can communicate with external apparatuses. As described below, the devices are provided with individual IP addresses so that power interchange control and power information collection can be carried out via the communication terminal. FIGS. 4A and 4B show an example in which the power apparatus control terminal device 12 contains a power line carrier communication terminal 13. The power apparatus control terminal device 12 enables power interchange control to be performed between power apparatuses even within the same power grid.

In the power grid 3-1, the power bus 6 connected to a lower voltage class via a transformer is also shown. FIGS. 4A and 4B also show the transformer 11 with the power line carrier communication bypass, which enables power line carrier communication described below. The power bus 6 is normally classified into three types: an extra high voltage type, a high voltage type, and a low voltage type. Although not shown in the drawings, general consumers' loads are connected the power bus 6 according to these voltage classes. These loads, generation facilities, and energy storage facilities form the plurality of power grids 3-1 to 3-4 and 3-6.

For Japanese power grids, various power apparatuses are specified based on the following definition: the extra high voltage is higher than 7,000 V, the high voltage is higher than 600 V and at most 7,000 V, and the low voltage is lower than 600 V. The present invention adopts the mechanisms of the conventional transmission network so as to allow smooth migration to an autonomous power grid.

Furthermore, when each of the power apparatuses in a power grid includes the power apparatus control terminal device 12 capable of acquiring power information about the power apparatus and transmitting a power control signal to the power apparatus so that power regulation can be performed among the power apparatuses, the total amount of power generated and the total amount of power consumed within the power grid can be balanced to maintain the frequency and voltage. That is, the power grid can operate autonomously. An increased quantity of renewable energy power causes a more significant fluctuation, leading to the need to perform power regulation between the power apparatus and the energy storage device. This can be achieved by control using the power apparatus control terminal device 12.

(Communication System 1)

First, a configuration of a communication system according to the present invention will be described with reference to FIG. 11. Communication terminals 25-1 and 25-2 (data terminal ends: DTE) are installed at the A connection terminal 201 of the multi-terminal power conversion device 1-1 and the B connection terminal 202 of the multi-terminal power conversion device 1-2, respectively. The communication terminals 25-1 and 25-2 acquire and transmit information about power to the CPU, and transfer signals to and from external apparatuses using external data channels or power line carrier channels as data channels. The external data channels may be optical cables, LAN cables, metal cables, radio, or coaxial cables.

In the present invention, an information control system for power interchange among power grids is a communication system similar to LAN and WAN in the Internet, allowing a robust and reliable communications control form to be established. In the conventional synchronous power grid, power is synchronized at every instant, and thus the communications system required for power control needs to operate fast and reliably. However, power control which depends on communications is risky, and in actuality, individual power generation apparatuses perform control based on the frequency and voltage of the power grid.

The present invention is based in the power network in which energy storage devices allow the individual power grids to operate autonomously. Thus, rather, the reliability of the communications system is more important than the speed thereof.

Figure 11:
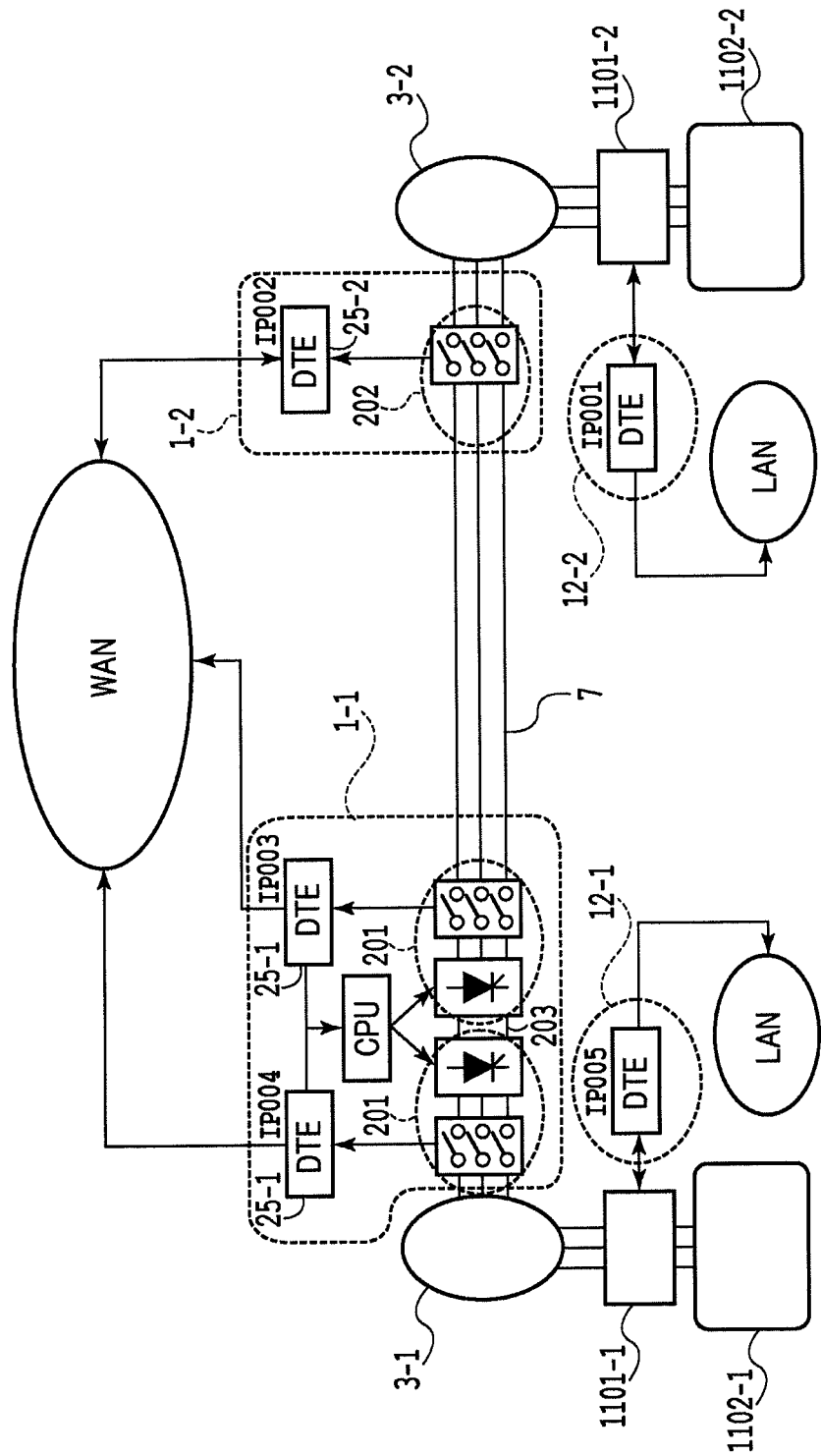
FIG. 11 is a diagram showing a configuration of a power network according to the present invention in which a WAN and LANs for communication circuits are formed using external data communication channels.

FIG. 11 illustrates a system in which a WAN and LAN are connected together to integrate communications; the WAN is constructed by providing a communication address to each of the main bodies and input/output terminals of the multi-terminal power conversion devices 1-1 and 1-2, and the LAN is constructed by also providing a communication address to each of power apparatus control terminal devices 12-1 and 12-2 additionally provided to control outputs from electric apparatuses 1102-1 and 1102-2 in power grids. Hence, a power system can be constructed in which power apparatuses in different power grids or a plurality of power grids can communicate with one another and in which control instructions for power interchange can be given to the input/output terminals of the multi-terminal power conversion device 1-1 and 1-2.

A power network system can be constructed as follows in which the input/output terminals of the multi-terminal power conversion devices 1-1 and 1-2 and the power apparatus control terminal devices 12-1 and 12-2 can communicate with one another using a TCP/IP communications protocol: a server is placed in the WAN, the server including an address table describing MAC addresses unique to the input/output terminals, IP addresses assigned to the input/output terminals, subnet masks, and default gateways, and a routing table describing gateways for routing between the multi-terminal power conversion devices 1-1 and 1-2, and a server is placed in the LAN, the server including an address table describing MAC addresses unique to the power apparatus control terminal devices 12-1 and 12-2, IP addresses assigned to the power apparatus control terminal devices 12-1 and 12-2, subnet masks, and default gateways, and a routing table describing gateways for routing between the power apparatus control terminal device 12-1 and 12-2. Alternatively, instead of placing the servers in the WAN and the LAN, the present embodiment may place the address table and the routing table inside the multi-terminal power conversion devices 1-1 and 1-2 to allow the multi-terminal power conversion devices 1-1 and 1-2 interchange information for continuous updating.

With the IP addresses, information can be interchanged by placing, in the WAN, the server including the routing table describing the gateways for routing between the multi-terminal power conversion devices 1-1 and 1-2. Alternatively, instead of placing the servers in the WAN and the LAN, the present embodiment may place the routing table inside the multi-terminal power conversion devices 1-1 and 1-2 to allow the multi-terminal power conversion devices 1-1 and 1-2 to interchange information for continuous updating.

Furthermore, the IP addresses enable the individual power apparatus control terminal devices 12-1 and 12-2 to be identified, allowing information for power interchange to be exchanged between the power apparatus control terminal devices 12-1 and 12-2. An address server installed in the power grid can manage information about the power apparatuses within the LAN. The power apparatus control terminal devices 12-1 and 12-2 can also manage the required addresses, but for connection targets the addresses of which are unknown, can inquire of the address server to get the addresses. The address server can be placed in each of the multi-terminal power conversion devices 1-1 and 1-2 installed in the power grid.

(Communication System 2)

A configuration of a communication system using the power line carrier communication according to the present invention will be described with reference to FIG. 12. The data terminal ends 25-1 and 25-2 (DTE) are installed in the power apparatus control terminal devices 12-1 and 12-2 additionally provided to control outputs from the A connection terminal 201 and B connection terminal 202 of the multi-terminal power conversion devices 1-1 and 1-2 and the power apparatuses 1102-1 and 1102-2 in the power grid. The data terminal ends 25-1 and 25-2 (DTE) acquire and transmit information about power to the CPU. The data terminal ends 25-1 and 25-2 (DTE) further transmit intra-power grid information, via the power line carrier communication terminal 13, to a power line carrier communication LAN including power cables, and transmit, also via the power line carrier communication terminal 13, inter-power grid information to a power line carrier communication WAN including the interconnecting electric lines 7.

In this example, the power line carrier communication is used to construct the WAN and LAN using the interconnecting electric lines 7 and power cables as transmission paths. Thus, the routes available for communications physically match routes along which power can be transferred. When any interconnecting electric line 7 or power cable is disconnected or any relevant facility is shut down, the communications circuit is also released or stopped, with no communication signals flowing through the circuit. Thus, the current condition of the power grid can be determined without the need for complicated checks for fault conditions. For 66-kV transmission lines, 192-kbps digital power line carriers have been put to practical use. The required amount of information in power interchange signals described below is only about several kilobits for all communications. Hence, the above-described bandwidth corresponds to sufficient speed.

For 6.6-kV, 440-V, and 220-V power distribution systems, only power line carrier devices with a relatively low rate of about 600 bps have been put to practical use so far. This is because of strict regulations and the regulations are expected to be eased in conjunction with development of techniques. This low carrier speed is sufficient for reservation for power interchange. In connection with a change in the power apparatuses 1102-1 and 1102-2, such as the start, stop, update, installation or expansion, or scrapping, the adoption of the power line carrier communication allows new IP addresses to be assigned when the power lines start to be used, thus reducing workload for network technicians.

As described below, when the power line carrier is used to make channels physically the same as the electric lines, a plurality of advantages can be obtained; the need to add new channels in association with the electric lines is eliminated, and the electric lines can be automatically checked for continuity.

Furthermore, if power is interchanged among power grids via at least two A connection terminal pairs of the different multi-terminal power conversion devices 1-1 and 1-2, more detailed time synchronization is required between the A connection terminal pairs. In this case, such time synchronization can be achieved using signals on the electric waveforms in addition to the above-described communications signals. The time synchronization using signals on electric waveforms will be described below in detail.

(Communication Control System 1)

Figure 13:
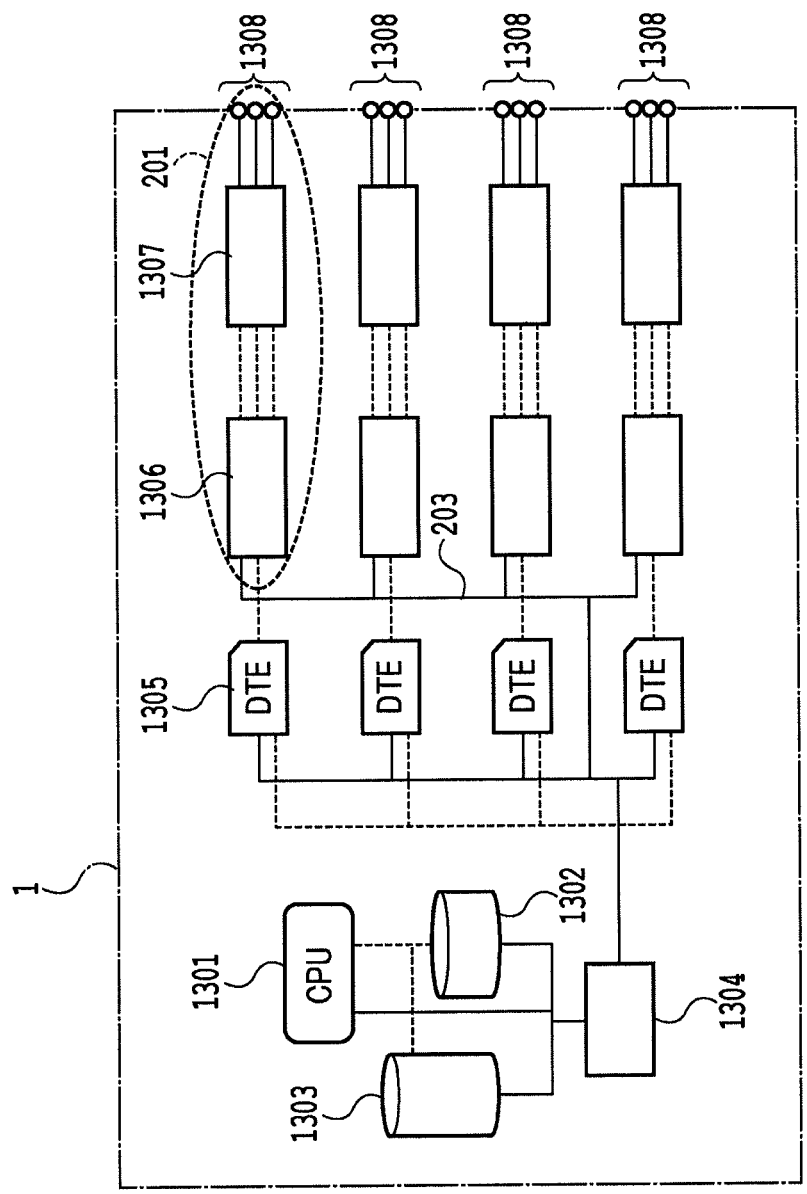
FIG. 13 is a diagram showing a configuration of a communication control system in the multi-terminal power conversion device.

FIG. 13 shows a communication system in the multi-terminal power conversion device 1.

In FIG. 13, power line carrier communication terminals 1306 each connected to a corresponding interconnecting electric line coupling device 1307 with a connection terminal 1308 serve as ports for external data communication. However, of course, the same mechanism may be used for communication terminals using optical cables or coaxial cables. Data obtained by the power line carrier communication terminal 1306 is transmitted to a data terminal end (DTE) 1305 and processed by a CPU 1301. Thus, each of the multi-terminal power conversion device 1 and its connection terminals 1308 can have a unique IP address, communicate with external apparatuses, and include basic devices such as a storage device that serves as an address server, a CPU 1301 that executes calculations for a routing algorithm, and memories 1302 and 1303. A power source 1304 supplies power to the basic devices.

One of the power line carrier communication terminals 1306 is connected to the communication within the power grid to assign an IP address to the power apparatus control terminal device 12 in the LAN. If a plurality of multi-terminal power conversion devices 1 are provided in the LAN, the multi-terminal power conversion devices 1 are prioritized so that one of the multi-terminal power conversion devices 1 serves as a master to assign IP addresses. The master multi-terminal power conversion device 1 holds the address table containing the MAC addresses and IP addresses of the power apparatus control terminal devices 12 in the memory 1303, and shares the address table with the slave multi-terminal power conversion devices 1. The power line carrier communications terminals 1306 connected to the other connection terminals 1308 in the multi-terminal power conversion device 1 communicate with the other multi-terminal power conversion devices 1 within the WAN to create a routing table and save the routing table in the memory 1303.

Furthermore, the power line carrier communications terminals 1306 allow interconnecting electric lines through which power flows to serve as channels. This in turn allows routes available for communications to physically match routes along which power can be fed. As a result, whether or not the route is available for power interchange can be determined depending on whether or not communications is enabled on the route. That is, when any electric line is disconnected or any relevant facility is shut down, the communications circuit is also released or stopped, with no communication signals flowing through the circuit. Thus, the latest condition of the power system can be determined without the need for a complicated check for continuity. Routes unavailable for communications are automatically excluded from the routing algorithm, thus avoiding unwanted check procedures.

(Communication Control System 2)

Figure 14:
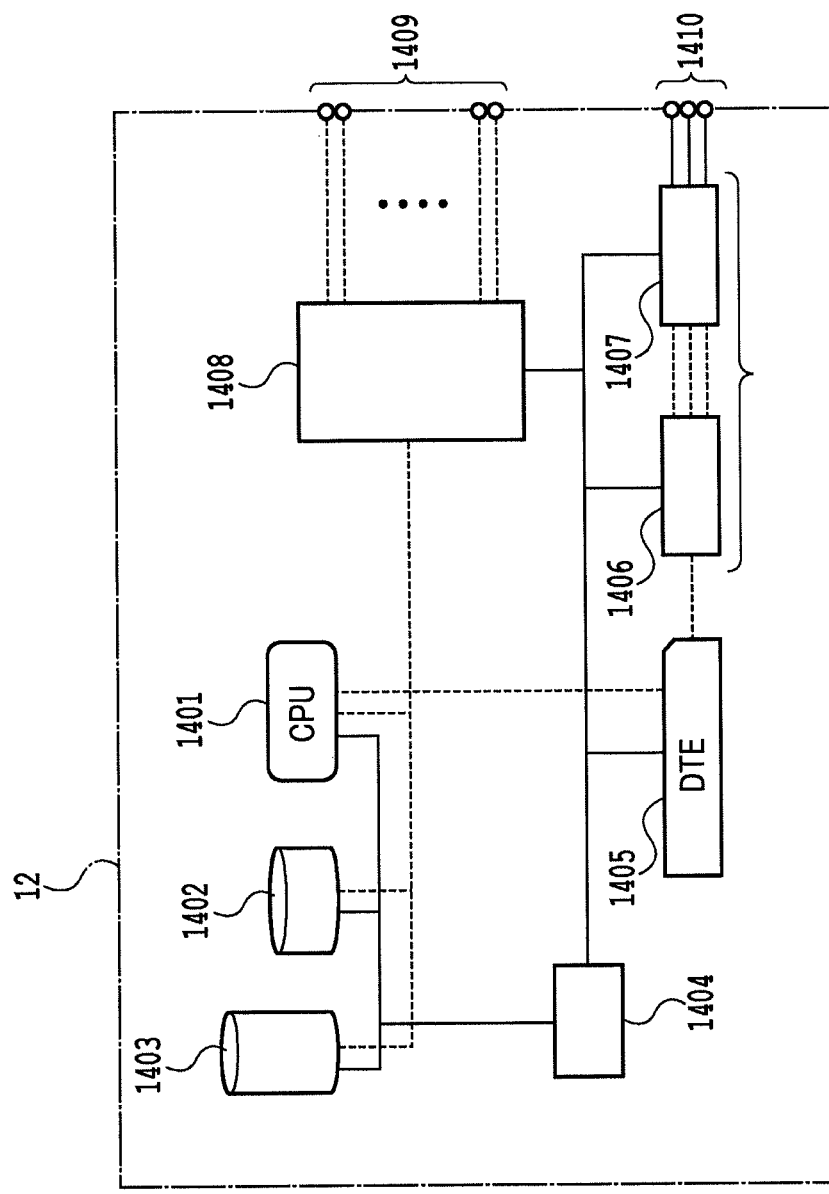
FIG. 14 is a diagram showing a configuration of a communication control system in a power apparatus control terminal device.

FIG. 14 shows a communication system in the power apparatus control terminal device 12.

The power apparatus control terminal device 12 includes a CPU 1401 that executes calculations for request and acceptance for power interchange, a memory 1402, a storage device 1403 in which the address table and the routing table are stored, a power source 1404, and a power apparatus control device 1408 with input/output terminals 1409 for power apparatuses. The power apparatus control terminal device 12 in the power grid has information on its own MAC address and IP address and the IP addresses of the default gateways corresponding to communication ports for exit from the LAN. The IP addresses of the default gateways normally correspond to the A connection terminals 201 connected to the power grid for the multi-terminal power conversion device 1.

In FIG. 14, a power line carrier communications terminal 1406 connected to an interconnecting electric line coupling device 1407 and a power apparatus control device 1408 with connection terminals for connection to distribution lines 1410 serve as a port for external communication. However, of course, the same mechanism may be used for communications terminals using optical cables or coaxial cables. Data obtained by the power line carrier communications terminal 1406 is transmitted to a data terminal end (DTE) 1405 and processed by a CPU 1301.

Furthermore, the power line carrier communication terminal 1406 includes an address table for communications with any other power apparatus within the LAN for constant updating. Thus, when a power grid within the LAN communicates with any other power apparatus within the LAN, the first power grid can determine which address to which the power grid should issue a signal.

Such a communications system provided in the power apparatus control terminal device 12 enables the following operations. The quantity of power generated by a power generator with a relatively significant fluctuation, such as a solar power generator or a wind power generator is measured, and the resultant information is output through an external communications circuit. An instruction to increase or reduce the output is given to a power generator such as a diesel power generator or a gas engine power generator the output of which can be relatively easily adjusted, to control the power generator. Information on the state of charge in the energy storage device is output. The state of charge and discharge is controlled. Information on power apparatuses that consume power is output to external apparatuses.

Depending on the algorithm for the power apparatus, power interchange can be reserved through forecast of information on power interchange. Furthermore, reservation of power interchange for a given time in the future based on the current information is an effective means for allowing the power grid to operate autonomously. Various algorithms may be used for the power grids according to the characteristics of the power grid, but in general, the following predictive control is preferable. The SOC of the energy storage device is kept at about 50%, and if an increase in the output of solar power or wind power is predicted, the SOC is set to less than 50% in order to absorb the power. If a decrease in output is predicted, the SOC is set to more than 50% in order to output power from energy storage.

FIGS. 4A and 4B show an example of the communications system based on power line carrier communications. The power line carrier communications terminals 13 are installed in the respective power apparatus control terminal devices 12, and the IP addresses 14 of the power line carrier communications terminals 13 are shown in FIGS. 4A and 4B. The power line carrier communications terminals 13 are also installed at the respective connection terminals of each multi-terminal power conversion device 1, and the IP addresses of the power line carrier communications terminals 13 are shown in FIGS. 4A and 4B.

For address management, the addresses may be manually or automatically provided to each multi-terminal power conversion device 1. For manual management, a change in the multi-terminal power conversion device 1 leads to the need for an address change operation. For automatic management, when a new multi-terminal power conversion device 1 is installed or powered on, the device issues its own MAC address and requests a new IP address to be assigned to the device. With automatic management, the address change operation and the like are all automatically performed, thus reducing workload for the system administrator.

If power line carrier communications is used for channels, the WAN and the LAN are constructed using interconnecting electric lines or power cables as transmission lines for communications signals. Thus, routes available for communications to physically match routes along which power can be fed. When any electric line is disconnected or any relevant facility is shut down, the communications circuit is also released or stopped, with no communication signals flowing through the circuit. Thus, the latest condition of the power system can be determined without the need for a complicated check for continuity. As described above, for 66-kV transmission lines, 192-kbps digital power line carriers have been put to practical use. The required amount of information in power interchange signals described below is only about several kilobits for all communications. Hence, the above-described bandwidth corresponds to sufficient speed. Additionally, the power grid contains a transformer, a circuit breaker, a disconnecting switch, a capacitor reactor, and the like which are unsuitable for the power line carrier communications, and communication signals may attenuate significantly depending on the impedances of other connected apparatuses. This is likely to result in the need to provide a partial bypass or an amplifier.

Like routers in the Internet, the multi-terminal power conversion device 1 can constantly acquire the addresses of the adjacent multi-terminal power conversion devices 1 and the input/output terminals thereof by exchanging information with the multi-terminal power conversion devices 1. The multi-terminal power conversion devices 1 can feed required power to a remote power grid in a bucket brigade manner while carrying out power conversions. The multi-terminal power conversion device 1 can constantly acquire routing information required for the power supply.

Compared to the conventional power interchange mechanism in which all information is collected at a common center like a central load dispatching center which issues all instructions, the present power interchange mechanism may be referred to as distributed control and is based on a concept greatly different from that of the conventional power interchange.

Furthermore, a multi-terminal power conversion system according to the present invention is arranged adjacent to a part of the premises of the substation. For information required to control the multi-terminal power conversion system, semiconductor elements for power are gate-controlled, and power conversion related information and transaction related information are recorded in the data storage device in association with each other in digital form.

(Routing Table)

FIG. 15 shows examples of routing tables created using the IP addresses assigned in the example of the power network system in FIG. 4. Routing tables 1501 to 1504 and 1506 are held by the multi-terminal power conversion devices 1 installed in the power grids 3-1 to 3-4 and 3-6. A routing table 1505 is held by the multi-terminal power conversion device 1 connected to the power apparatus system 4.

The first table 1501 shows gateways for connecting the multi-terminal power conversion device 1 installed at the power grid 3-1 to the other power grids. Here, when the subnet mask is 255.255.255.0, Network 192.168.2.0 means that the first 24 bits belong to the same group. This means the power grid 3-2. The routing table thus indicates that, on a route to the power grid 3-2, Gateway 192.168.0.7 is first passed, that is, the B connection terminal 202 of the multi-terminal power conversion device 1 installed in the power grid 3-2 and connected to the power grid 3-1.

Similarly, for a shift from the power grid 3-1 to the power grid 3-3, Network 192.168.3.0 in the routing table may be referenced, and the corresponding gateway is denoted by 192.168.0.9. Likewise, for a shift from the power grid 3-1 to the power grid 3-4, Network 192.168.4.0 in the routing table may be referenced, and the corresponding gateway is denoted by 192.168.0.11. In another example, when the power apparatus system 4 is connected to any one of the power grids 3-1 to 3-4, the gateway is denoted by 192.168.1.1, that is, the A connection terminal 201 of the multi-terminal power conversion device 1 connected to the power bus of the power grid 3-1.

As described above, all the multi-terminal power conversion devices 1 hold a routing table for destinations and can exchange the contents of the routing table with one another to share the latest routing maps for the WAN and the LAN. Thus, in the power network system according to the present invention, the multi-terminal power conversion devices 1 and the power apparatus control terminal devices can communicate with one another using the TCP/IP communication protocol. This enables physical addresses, error control, order control, flow control, and collision avoidance to be standardized.

The power network system according to the present embodiment enables construction of a mechanism using the TCP/IP communication protocol so that a first power grid requests, through the WAN or LAN, any other power grid to interchange power with the first power grid as needed, with top priority given to the autonomous operation of the first power grid. Either static or dynamic IP addresses may be provided. Static IP addresses are unique to physical apparatuses, and dynamic IP addresses are provided in response to requests from physical apparatuses, allowing construction of a flexible system in which the addresses change in response to changes in the system.

(Method for Power Transmission 1-1)

Figure 16:
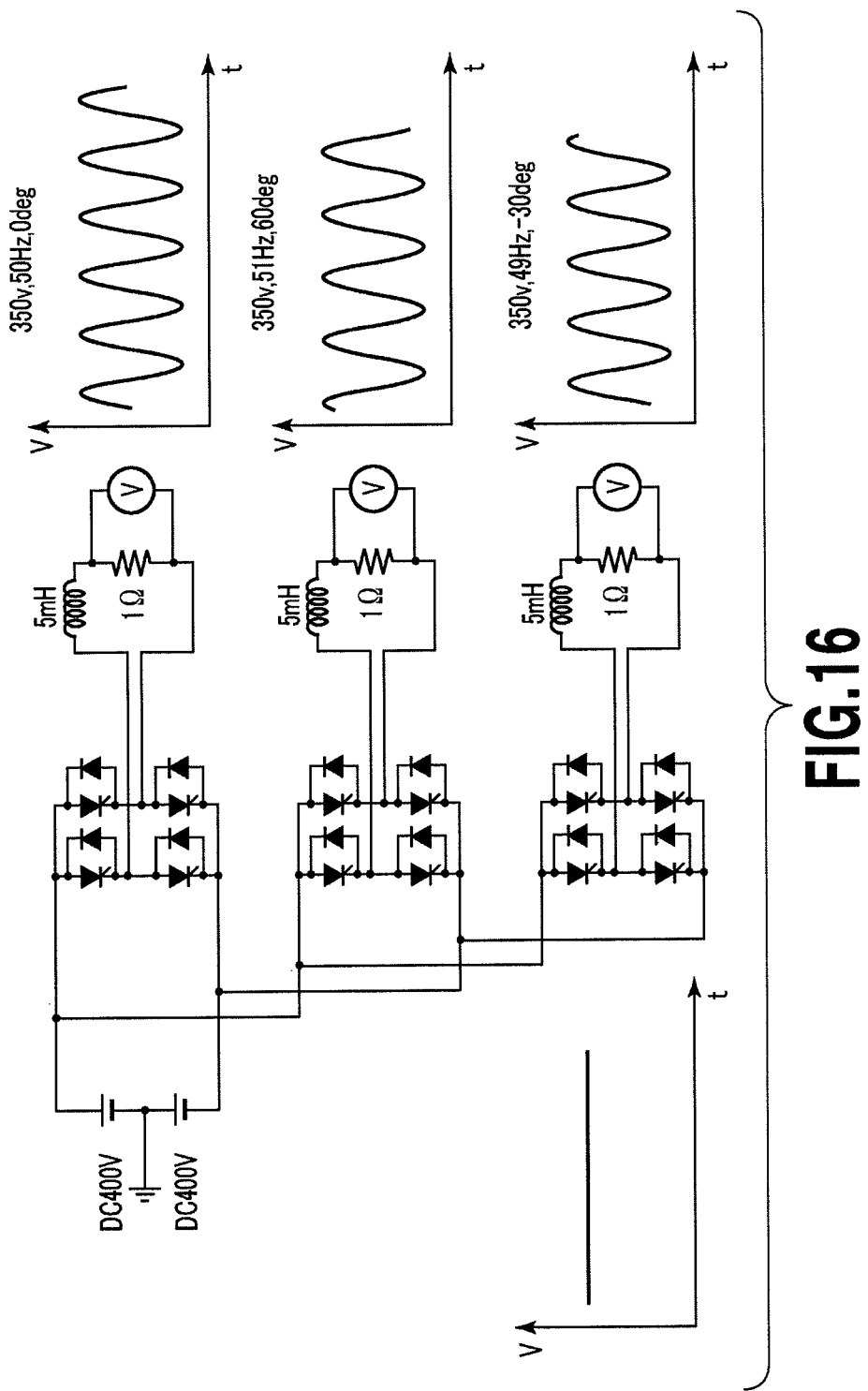
FIG. 16 is a diagram showing the results of simulation of a multi-terminal power conversion device.

FIG. 16 shows the results of simulation of multi-terminal power conversion using MatLab-Simulink-SimPowerSystems. For simplification, the rectifier side was omitted and a DC power source was shown on the rectifier side. The inverter side included a parallel circuit with three single-phase PWM inverters.

Batteries each of DC±400V were used for the DC bus side. The two batteries were grounded at the intermediate portion between the batteries. Each inverter leg included a 1-Ω resistor and a 5-mH reactor connected in series at the intermediate position of the leg. A voltage generated at the resistor portion was observed. The PWM inverter had an internal resistance of 1 mΩ and a snubber resistance of 0.01 mΩ.

Three single-phase PWM inverters were arranged in parallel and provided with control signals for a phase of 0 degree at a frequency 50 Hz, for a phase of 60 degrees at a frequency 51 Hz, and for a phase of −30 degrees at a frequency 49 Hz, respectively. As a result, the PWM inverters operated normally, and at an amplitude of AC350V, provided AC outputs of a phase of 0 degree at a frequency 50 Hz, a phase of 60 degrees at a frequency 51 Hz, and a phase of −30 degrees at a frequency 49 Hz, respectively.

Although not shown in the drawings, three single-phase PWM inverters were arranged in parallel and provided with control signals for a phase of 0 degree at a frequency 50 Hz, for a phase of 50 degrees at a frequency 30 Hz, and for a frequency 0 Hz (that is, DC), respectively. As a result, the PWM inverters operated normally. Thus, the results of the simulation indicate that any frequency, any phase, and even DC power can be freely created.

(Method for Power Transmission 1-2)

Figure 37A:
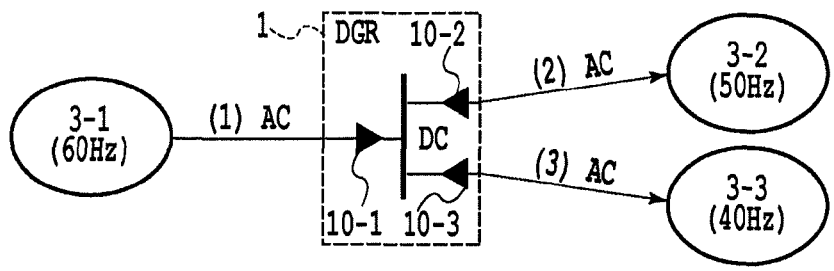
FIG. 37A is a diagram showing a three-terminal power conversion device connected to power grids of different frequencies.
Figure 37B:
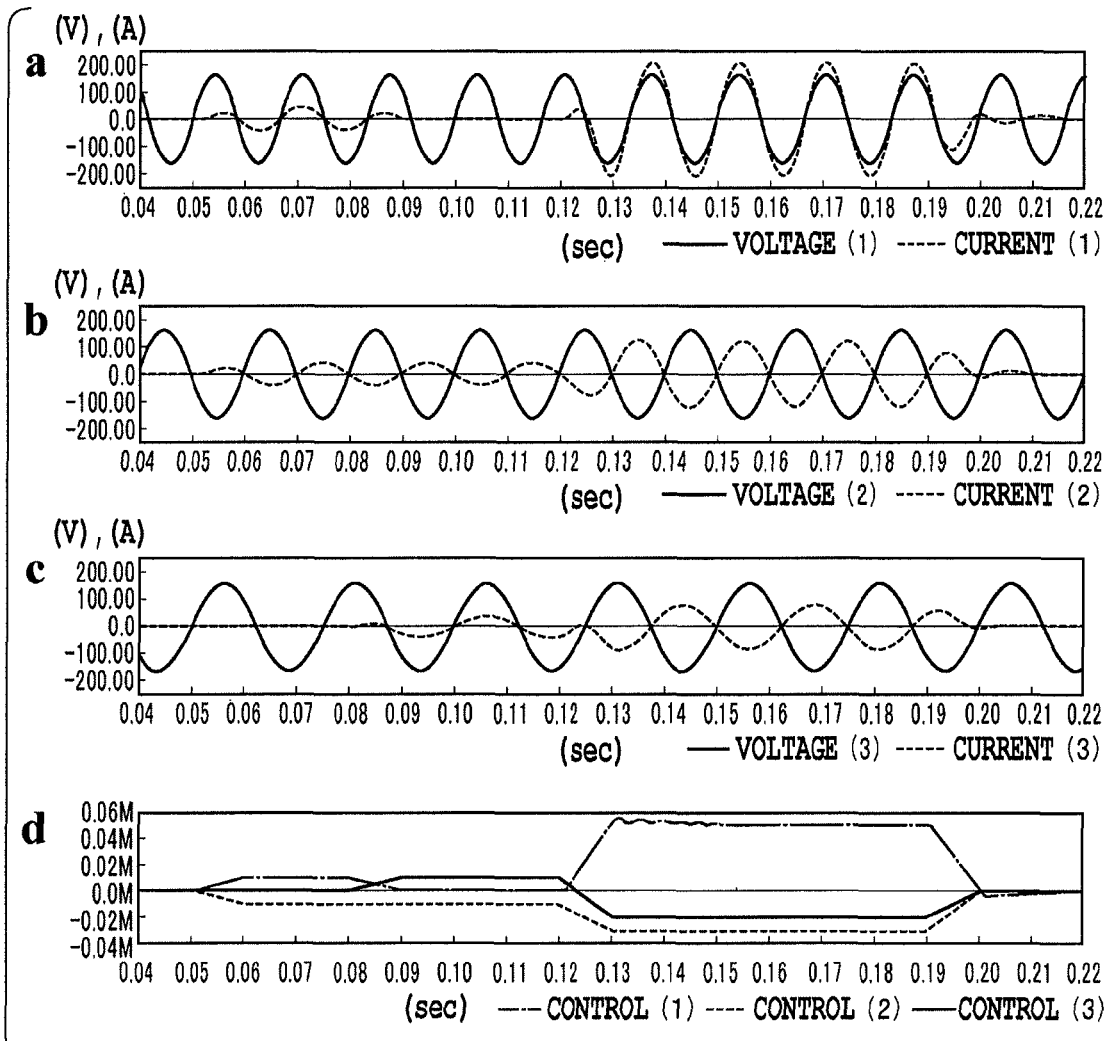
FIG. 37B is a diagram showing the results of simulation for the configuration shown in FIG. 37A wherein the direction of power interchange is continuously and seamlessly changed.

FIG. 37A shows that a multi-terminal power conversion device 1 with three terminals was connected to power grids with different frequencies. FIG. 37B shows the results of simulation in which, in the state shown in FIG. 37A, the direction of power interchange was continuously and seamlessly changed. The simulation was carried out using power simulation software PSIM.

In this example, the power converter 10-1 of the multi-terminal power conversion device 1 was connected to the power grid 3-1 with a frequency of 60 Hz. The power converter 10-2 of the multi-terminal power conversion device 1 was connected to the power grid 3-2 with a frequency of 50 Hz. The power converter 10-3 of the multi-terminal power conversion device 1 was connected to the power grid 3-3 with a frequency of 40 Hz.

As shown in FIG. 37B, between a time of 0.05 seconds to a time of 0.06 seconds, control signals for the power converters 10-1 and 10-2 were increased in the opposite direction, and the current values of the power converters 10-1 and 10-2 started to increase. Between a time of 0.06 seconds to a time of 0.08 seconds, currents from the power converters 10-1 and 10-2 exhibited the same value. This means that the power grid 3-1 (60 Hz) fed power to the power grid 3-2 (50 Hz).

Between a time of 0.08 seconds to a time of 0.09 seconds, the control signal for the power converter 10-1 returned to zero, whereas the control signal for the power converter 10-3 increased to the same value as that for the power converter 10-2 in the opposite direction. This means that instead of the power grid 3-1, the power grid 3-3 (40 Hz) started to feed power to the power grid 3-2 (50 Hz). Between a time of 0.09 seconds to a time of 0.12 seconds, this state was maintained.

Between a time of 0.12 seconds to a time of 0.13 seconds, the control signal for the power converter 10-1 increased, whereas the control signals for the power converters 10-2 and 10-3 increased in the opposite direction, with the sum of the values for the power converters 10-2 and 10-3 controlled to be equal to that for the power converter 10-1. Between a time of 0.13 seconds to a time of 0.19 seconds, this state was maintained.

This means that the power grid 3-1 fed power to both the power grids 3-2 and 3-3.

Thereafter, between a time of 0.19 seconds to a time of 0.20 seconds, all the control signals decreased to zero, and a current of zero passed through each of the power converters.

As indicated by the results of the simulation, the multi-terminal power conversion device 1 according to the present invention enables the direction of power interchange to be continuously changed not only among synchronous power grids but also among at least three asynchronous power grids. This means that power interchange can be achieved based on the control signals.

The present invention allows the above-described complicated procedure for power interchange to be stored in a computer for automatic power interchange. Furthermore, the procedure for power interchange allows programs to be shared and processed in a distributed manner so that all the multi-terminal power conversion devices 1 can carry out the programs.

(Method for Power Transmission 2)

Figure 17A:
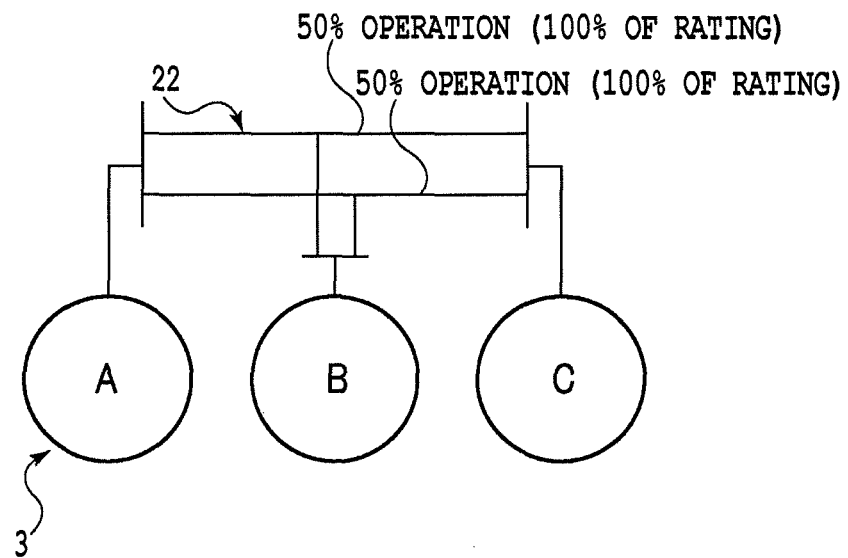
FIG. 17A is a diagram illustrating a conventional method for operating transmission lines.
Figure 17B:
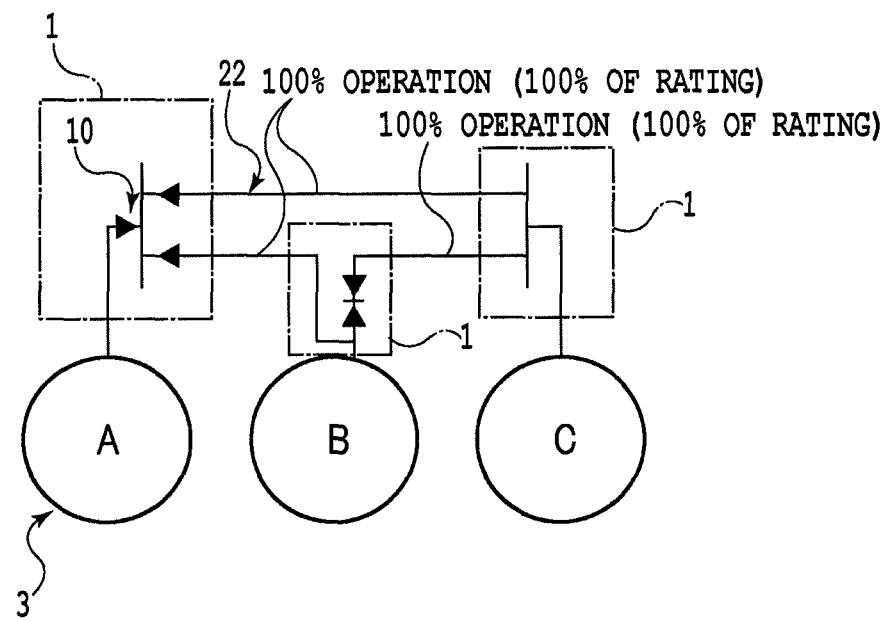
FIG. 17B is a diagram illustrating a method for independently operating existing transmission lines according to the present invention.

FIGS. 17A and 17B show an example in which the connection terminals of the multi-terminal power conversion device 1 are independently connected to an even number of transmission lines 22 operated in parallel so as to carry out independent power interchange for each route.

In general, for transmission lines in a normal synchronous grid for extra high voltages higher than 6,000 V, power is transmitted through a set of two lines so as to be 100% transmitted even if one of the lines is isolated. The two transmission lines are installed on the respective opposite sides of transmission line towers and extended to the same destination. Thus, in the two-line operation, each of the transmission lines is operated 50%, and the maximum capacity factor is 50%. Furthermore, in the synchronous grid, power flow is unambiguously determined by the distribution of impedance among the transmission lines. This is referred to as passive power flow herein. The rated capacity of transmission lines is designed based on the maximum passive power flow assumed based on a power flow distribution from a long-term standpoint. Hence, a power flow meeting the rating rarely occurs, and the average capacity factor per year is much lower than 50%.

On the other hand, the multi-terminal power conversion device 1 can actively provide a power flow of a required magnitude in a required direction. That is, the power grid according to the present invention provides active power flows. Thus, when each of the two transmission lines is independently connected to one of the connection terminals of the multi-terminal power conversion device 1 according to the present invention, if one of the transmission lines is isolated, the present invention allows power to be transmitted via another route instead of switching to the capacity factor of 50% as in the conventional art.

FIG. 17A illustrates an example in which power is transmitted to three power grids A, B, and C. In this example, for simplification, the power grid A transmits 100% of the power to the power grid C, and the two transmission lines are operated in parallel at a capacity factor of 50%.

FIG. 17B illustrates an example of the power system according to the present invention in which each of the transmission lines is independently operated. On one of the two transmission routes which is shown in the upper part of FIG. 17B, power can be transmitted from the power grid A to the power grid C at a capacity factor of 100%. On one of the two transmission routes which is shown in the lower part of FIG. 17B, power can be transmitted from the power grid A to the power grid B at a capacity factor of 100% and also from the power grid B to the power grid C at a capacity factor of 100%. Each of the power converters 10 has a rated value corresponding to the transmission capacity thereof.

If the power grid A transmits 100% of the power on each of the transmission routes and the upper route is isolated, the power grid C runs short of power. However, the power grid B increases its output to back up the transmission via the route to the power grid C so as to achieve a capacity factor of 100%.

Similarly, if the lower route is isolated, the power grid B runs short of power. However, the power grid C increases its output to back up the transmission via the route to the power grid B so as to achieve a capacity factor of 100%.

In either case, the backup power grid shoulders a heavy burden, but secondary batteries and distributed generation allow the current techniques to maintain stability in the short-term. This method is more feasible than the alternative approach of adding transmission lines.

Therefore, the connection terminals of the multi-terminal power conversion device 1 enables power of the magnitude required by the target to be independently and actively fed into any of the transmission lines. This allows the capacity factor to be increased up to 100%.

Furthermore, power can be input to two transmission lines at each connection point. Thus, each power grid can receive 100% of the power through each of the two different routes, a total of 200% of the power as compared to the conventional grid.

Moreover, the power converter 10 allows power to be actively fed, enabling the annualized average capacity factor of the two-line power transmission facility to be increased up to 200%.

Figure 18:
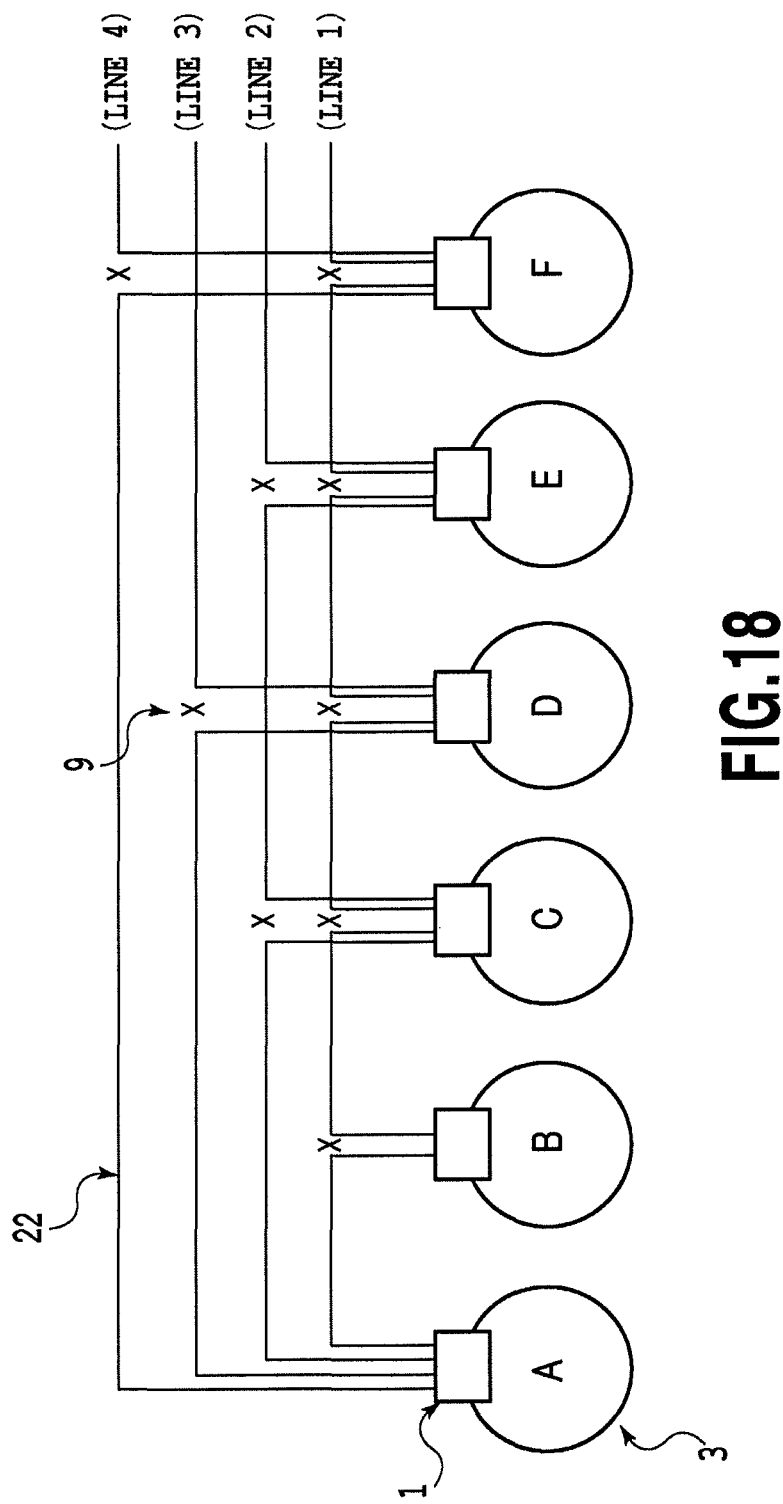
FIG. 18 is a diagram illustrating a method for independently operating existing transmission lines.

FIG. 18 illustrates a case of four transmission lines. In this case, six electric wires are laid, on each side of a transmission line. Often, two sets each of two transmission lines have different destinations. FIG. 18 shows parts of the transmission lines of power grids which pass through common routes.

FIG. 18 illustrates an example in which four transmission routes from a power grid A pass through power grids B, C, D, E, and F. In this example, the power grids are openly operated by disconnecting a portion in which a transmission line fed from a transmission line tower into each power grid is connected directly to the power grid or installing the circuit breaker 9 in this portion. The opposite ends of the transmission line are fed into the respective multi-terminal power conversion devices 1. In the multi-terminal power conversion devices 1, each of the connection terminals is asynchronously and independently operated.

As is apparent from FIG. 18, for a transmission line 1, power interchange routes are formed between the power grids A and B, between the power grids B and C, between the power grids C and D, between the power grids D and E, between the power grids E and F, and between the power grid F and the power grid corresponding to the connection target of the transmission line 1.

As is apparent from FIG. 18, for a transmission line 2, power interchange routes are formed between the power grids A and C, between the power grids C and E, and between the power grid E and the power grid corresponding to the connection target of the transmission line 2.

As is apparent from FIG. 18, for a transmission line 3, power interchange routes are formed between the power grids A and D and between the power grid D and the power grid corresponding to the connection target of the transmission line 3.

As is apparent from FIG. 18, for a transmission line 4, power interchange routes are formed between the power grid A and F and between the power grid F and the power grid corresponding to the connection target of the transmission line 4.

The formation of the power interchange route is not limited to the above-described example and needs to be examined on a case-by-case basis.

The power interchange routes thus formed are based on asynchronous interconnections and thus allow active power and reactive power of any magnitude to be transmitted and received. When the power grid has a marginal capacity, each route can be operated up to the rated capacity of the transmission lines.

To deal with fluctuations resulting from an accident, the power converter 10 carries out high-speed gate blocking to reduce the adverse effect on the power grids. If the available power is excessive or insufficient, a backup operation by the energy storage device or distributed generation may be required. However, this facility investment is easier than an approach to add new transmission lines.

The power interchange route thus obtained form a power network similar to the power interchange routes shown in FIG. 8.

(Method for Power Transmission 3)

The present invention provides a power system enabling five power interchange methods: superimposed power transmission, time sharing power transmission, multiple-route power transmission, power compression interchange, and virtual transaction interchange.

Figure 19:
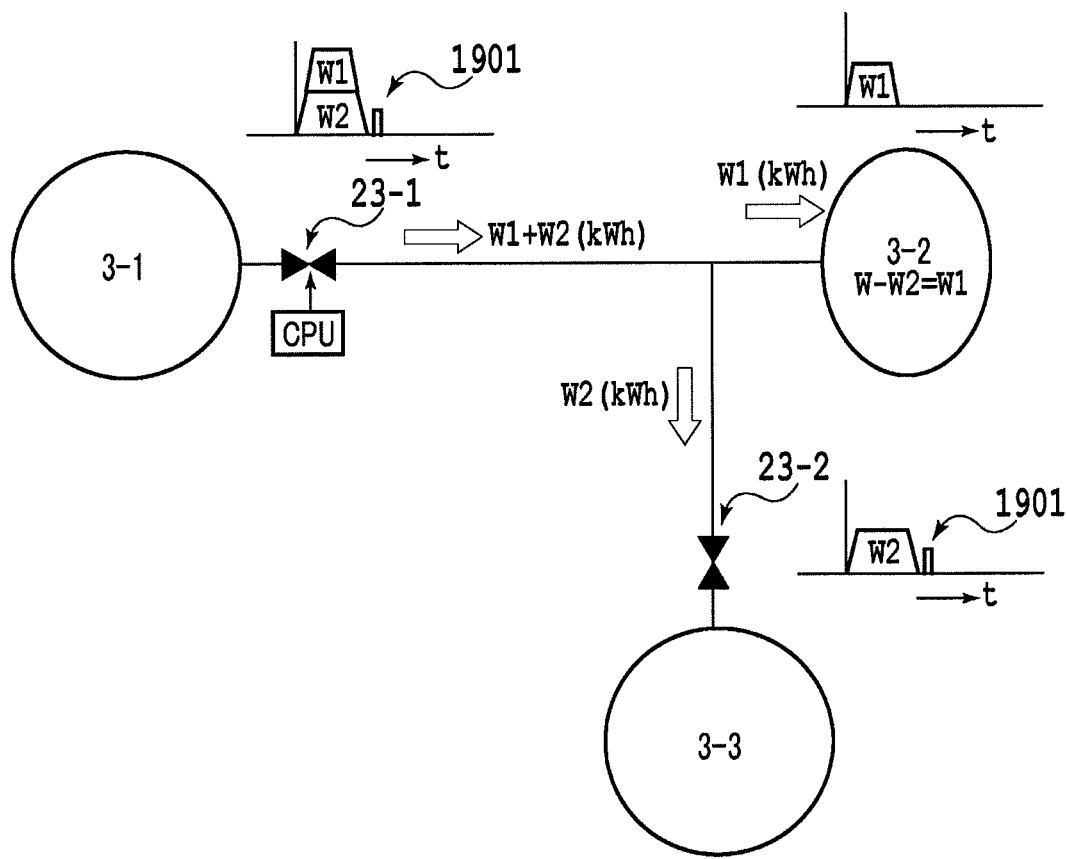
FIG. 19 is a diagram illustrating superimposed power transmission.

FIG. 19 illustrates superimposed power transmission in which the multi-terminal power conversion device 1 is installed at each substation lead-in portion of each transmission line and in which information is communicated among the devices so that different types of power can be transmitted to a plurality of substations using the same transmission line. The power grids 3-1 to 3-3 are provided, the power converter pair 23-1 is located between the power grids 3-1 and 3-2, and the power converter pair 23-2 is located between the power grids 3-2 and 3-3. When the power converter pair 23-1 feeds out power W1 and power W2 to the power grid 3-2 per unit time, and at the same time, the power converter pair 23-2 feeds out power W2 from the power grid 3-2 to the power grid 3-3 per unit time, the power W1, that is, (the power W1+the power W2)−the power W2, is eventually fed into the power grid 3-2. This power interchange is enabled by transmitting, as signals, destination information headers 1901 containing instructions to feed (W1+W2) and W2 to the power converter pair 23-1 and the power converter pair 23-2, respectively.

Figure 20:
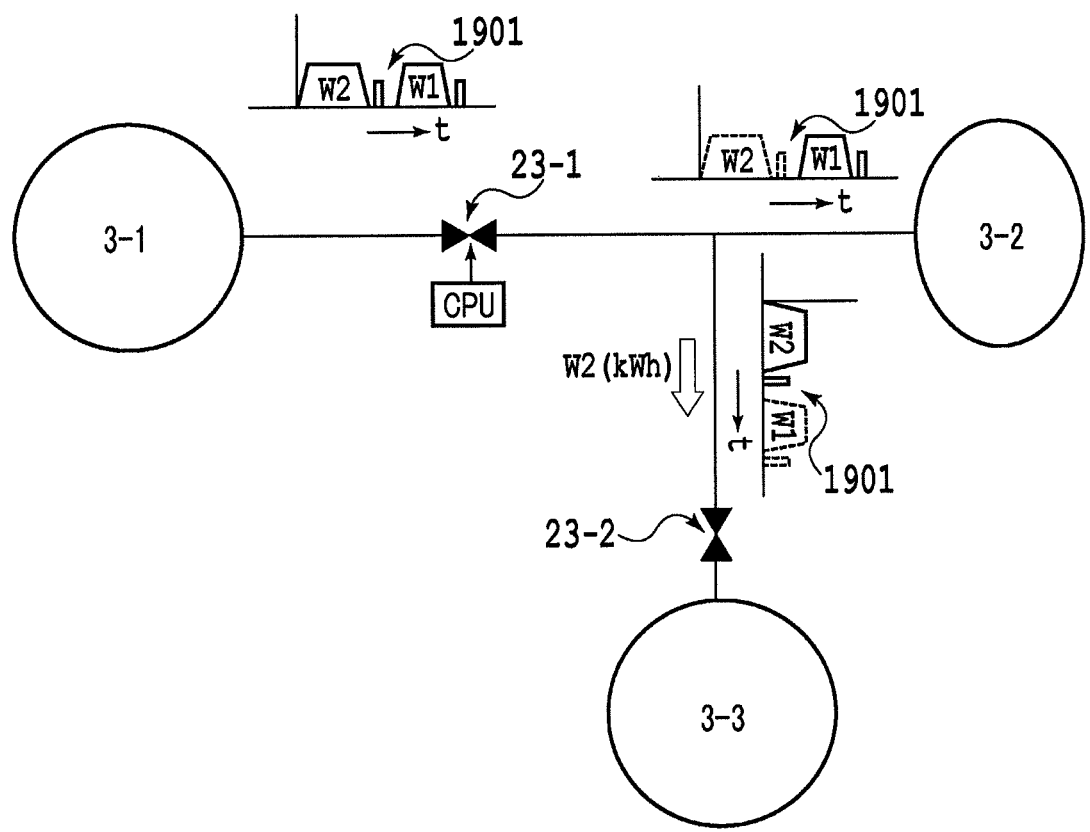
FIG. 20 is a diagram illustrating time sharing power transmission.

FIG. 20 illustrates time sharing power transmission in which different types of power are fed to the respective substations in a time sharing manner. The power grids 3-1 to 3-2 and the power converter pairs 23-1 and 23-2 are installed as is the case with FIG. 10. First, a destination information header 1901 containing instructions to feed the power W1 per unit time arrives at the power converter pair 23-1, which thus feeds the power W1 to the power grid 3-2. At this time, the power converter pair 23-2 is inactive, and no power is interchanged to the power grid 3-3. Then, a destination information header 1901 containing instructions to feed the power W2 to the power grid 3-3 per unit time arrives at both power converter pairs 23-1 and 23-2, which are simultaneously operated at the magnitude W2. Thus, W2 is fed from the power grid 3-1 to the power grid 3-2. At this time, the power only passes through the power grid 3-2. In this manner, different types of power can be interchanged for the respective purposes in a time sharing manner.

This scheme is advantageous in that power can be fed to different destinations at the maximum output of the power converter in a time sharing manner. This is similar to the concept of packets in communications, and thus the power in this case may be referred to as power packets. The quantity of power provided at the maximum output of the power converters during a given time can be treated as one unit. This may be referred to as digital power.

Figure 21:
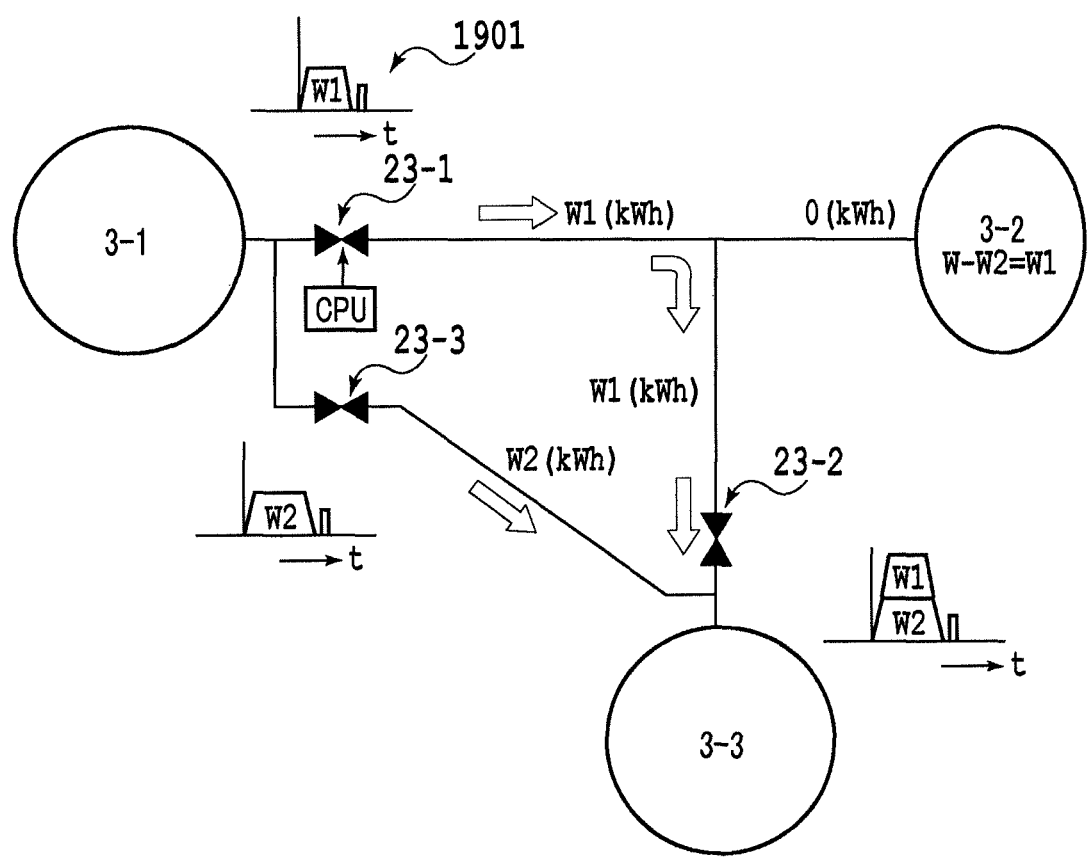
FIG. 21 is a diagram illustrating a multiple-route power transmission.

FIG. 21 illustrates multiple route power transmission in which a plurality of different power generation circuits are used to simultaneously feed different types of power to one substation. As is the case with FIGS. 19 and 20, the power converter pairs 23-1 and 23-2 are provided between the power grids 3-1 and 3-2 and between the power grids 3-2 and 3-3, respectively. A transmission route is additionally provided between the power grids 3-1 and 3-3. In this example, information containing an instruction to feed the power W1 is provided to the power converter pairs 23-1 and 23-2. At the same time, information containing an instruction to feed the power W2 is provided to the power converter pair 23-3. As a result, the power W1 and the power W2 are fed to the power grid 3-3 via different routes. In this configuration example, the power converter pairs 23-1 and 23-2 are connected to the power grid 3-1. This discussion also holds true when the power converter pairs 23-1 and 23-3 are replaced with the multi-terminal power conversion device according to the present invention in which three power converters are connected together in parallel through a common bus.

Figure 22:
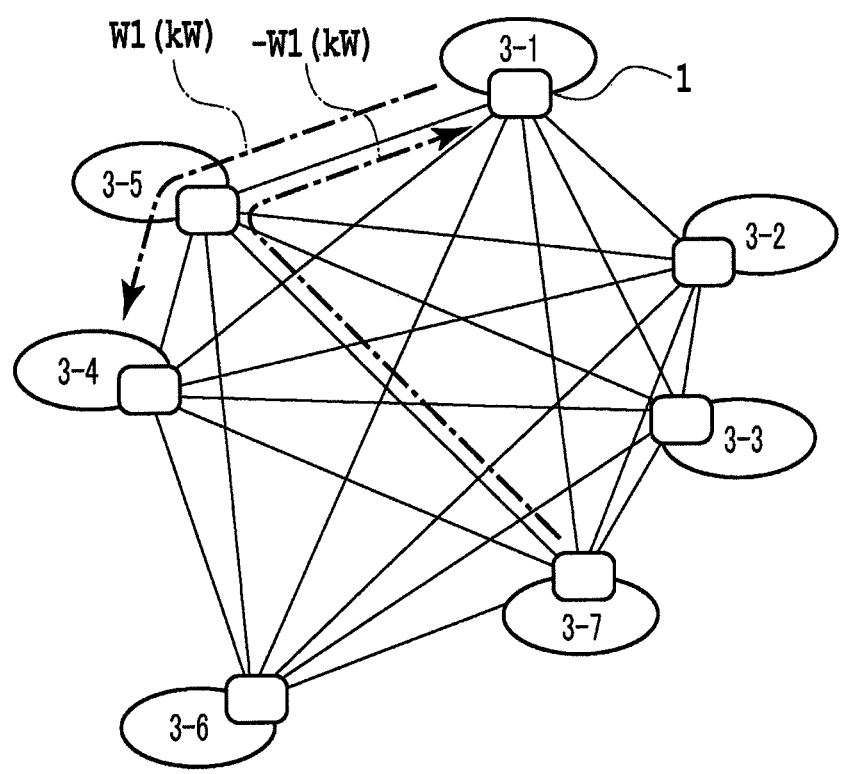
FIG. 22 is a diagram illustrating virtual transaction interchange.

FIG. 22 illustrates power compression interchange in which requests for power transmission in opposite directions are combined together to compress or offset the quantity of power transmission, thus reducing the number of power conversions and power transmission losses. In the illustrated example, the power grid 3-1 feeds W1 (kW) to the power grid 3-4 via the power grid 3-5, and the power grid 3-1 feeds W1 (kW) to the power grid 3-1 via the power grid 3-5. In this case, as is apparent from FIG. 22, power W1 and power −W1 flow between the power grids 3-1 and 3-5 and offset each other. Thus, the multi-terminal power conversion devices 1 installed at the power grids 3-1 and 3-5 need not operate. As a result, power conversion and transmission losses are reduced.

Positive combinations of the above-described power interchange schedules enables losses to be minimized. Energy storage devices provided in the respective power grids allow the time of interchange to be varied among the power grids or enable the magnitude of the output from each power grid to be adjusted. Power transactions in the opposite directions as described above may result from the addition of information to the energy flow about a power generation source and the like. The power transactions in the opposite directions are not limited to this case but may be involved in other cases in which, for example, one power grid requires wind power, whereas a power grid for wind power generation requires inexpensive power derived from fossil fuels.

Figure 23:
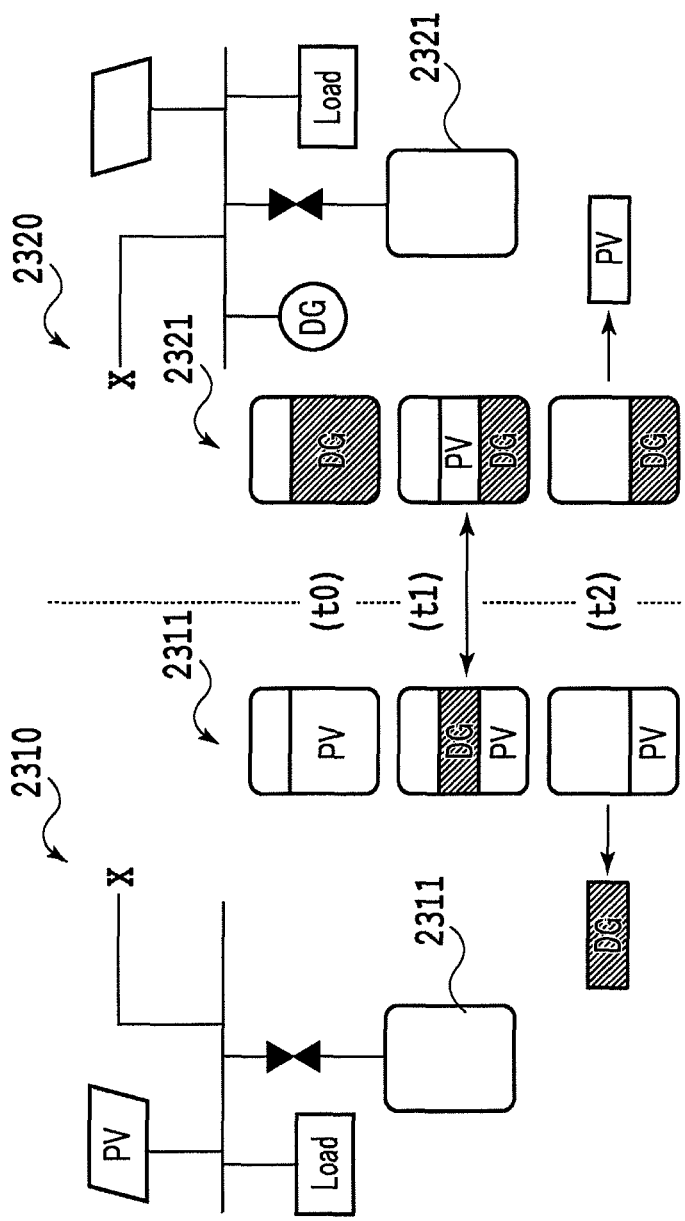
FIG. 23 is a diagram illustrating virtual transaction interchange.

FIG. 23 illustrates virtual transaction interchange of power in which power grids not connected together via transmission lines can interchange power with each other using energy storage devices and transaction information.

In FIG. 23, power grids 2310 and 2320 are provided, with no interconnection lines connected between the power grids 2310 and 2320. The power grid 2310 is involved only in solar power generation PV, and the power grid 2320 is involved only in diesel power generation DG. In this example, in regard to power stored in energy storage device 2311 and 2321 installed in the respective power grids, DG power can be sold to a customer of the power grid 2310 and PV power can be sold to a customer of the power grid 2320 through virtual power transactions executed in order from t0 to t2.

At time t0, the energy storage devices 2311 and 2321 are charged with PV power and DG power, respectively.

At time t1, the DG power and the PV power are virtually interchanged in equal amounts between the energy storage devices. This transaction desirably involves bonds or means such as bills, securities, or cash settlement.

At time t2, sale of the DG power can be carried out within the power grid 2310, and sale of the PV power can be carried out within the power grid 2320 can be sold. Thus, virtual transaction interchange can be executed without actual power transmission.

If the DG and the PV are traded in equal amounts at time t1, the transaction can be based either on equal amounts of energy or on equal amounts of money. Alternatively, the transaction can be executed in another form based on the difference in the amount of energy instead of the equal amounts. Alternatively, bond futures or power derivatives may be sold.

Figure 24:
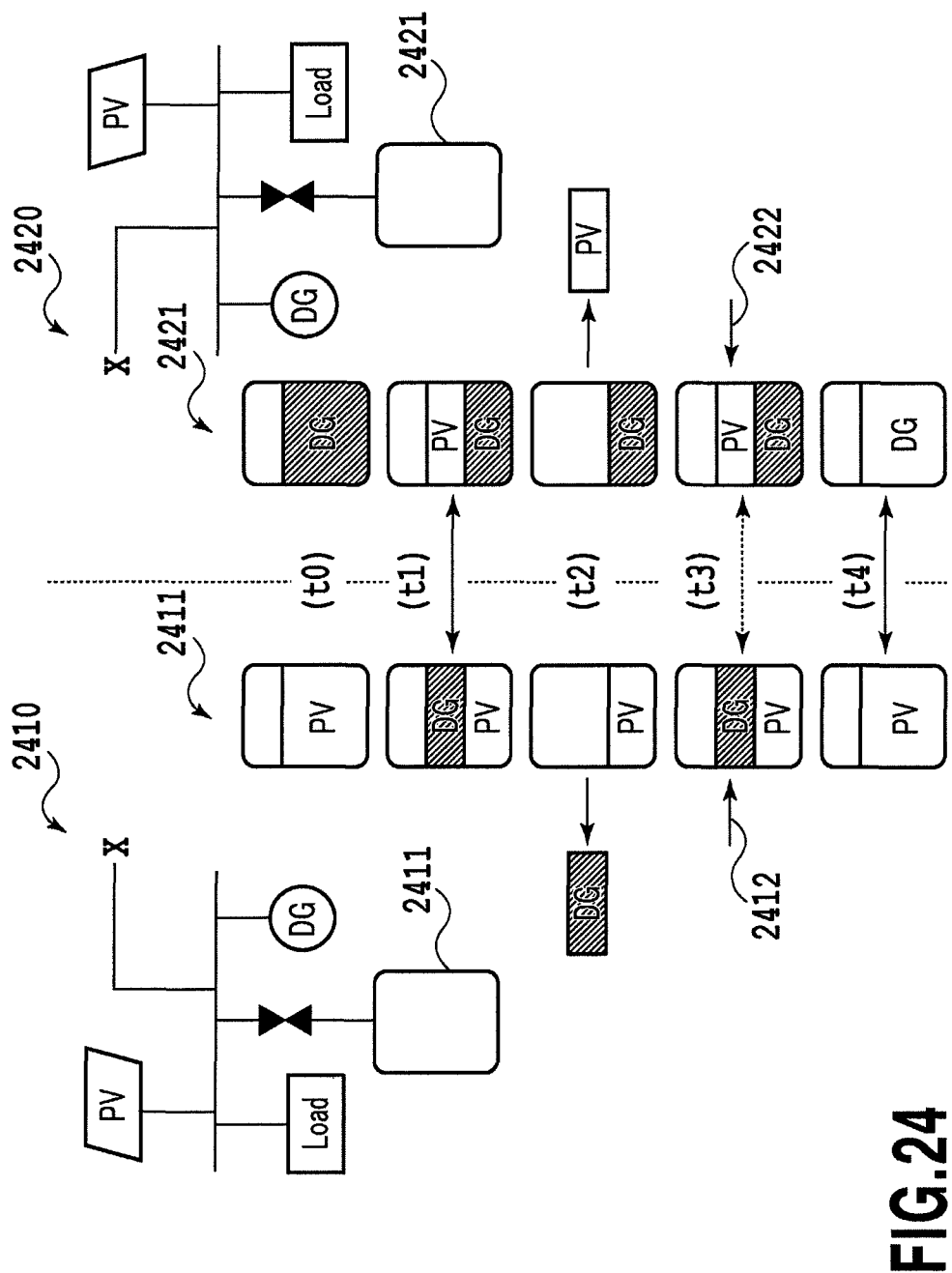
FIG. 24 is a diagram illustrating virtual transaction interchange.

FIG. 24 illustrates virtual transaction interchange for a case in which each of the power grids 2410 and 2420 has both PV and DG energy storage.

The steps carried out at times t1 and t2 are the same as those described above. At time t3, each of the power grids 2410 and 2420 generates both DG power and PV power to charge the energy storage devices 2411 and 2421 with the power, respectively. At time t4, the DG power from the power grid 2410 and the PV power from the power grid 2420 are interchanged with each other again. Then, the state returns to that at time t0, and the different types of electricity can be sold to the customer of each of the power grids.

In the present invention, first, the invention of the superimposed power transmission is effective in that power from a first power grid can be fed to a target substation via a second power grid so that the power is superimposed on power to be fed to the second power grid. Thus, the required power can be fed without any direct power transmission route to the target power grid.

Second, the invention of the time sharing power transmission is effective in that compared to the superimposed power transmission, in which the sum of power transmitted to each power grid is limited to the capacity of the multi-terminal power conversion device 1, the time sharing power transmission allows each type of power to be increased up to the maximum rated capacity of the multi-terminal power conversion device 1.

Third, the invention of the multiple-route power transmission is effective in that although the synchronous grid involves a loop current or a cross current, resulting in passive power distribution that depends on the impedance of the transmission network, the multi-terminal power conversion device 1 according to the present invention enables a large number of power grids to asynchronously feed power to one power grid, allowing the target power grid to receive all of the power without interference among the different types of power and allowing the power to be actively fed into the target power grid.

Fourth, the invention of the power compression interchange enables adjustment of temporal constraints or magnitude constraints in a large number of power interchange requests among a plurality of power grids, enabling the actual number of power conversions to be compressed. This enables a reduction in the number of power conversions required in the whole power system and in power losses involved in power interchange.

Fifth, according to the invention of the virtual power transaction, the multi-terminal power conversion device 1 enables power to be interchanged among power grids to which no transmission lines are connected, or among power grids to which transmission lines are connected, using a method of avoiding actual power transmission. This enables bond trading and futures trading and allows creation of derivative financial products corresponding to a combination of bond trading and futures trading.

(Time Synchronization Method)

This invention is a time synchronization information transmission network system in which a plurality of power converters arranged among a plurality of power grids are subjected to time synchronization by combining electric waves for time synchronization propagating on power lines created by the respective power converters with electronic information for time synchronization carrying the meanings of the electric waves.

This invention enables a relatively small amount of information in the electric waves appearing on the power lines to be combined with a large amount of electronic information describing the meanings of the electric waves so that the plurality of power converters can be simultaneously operated at the same magnitude of power and simultaneously stopped and that the magnitude can be changed during an interchange process.

Figure 25:
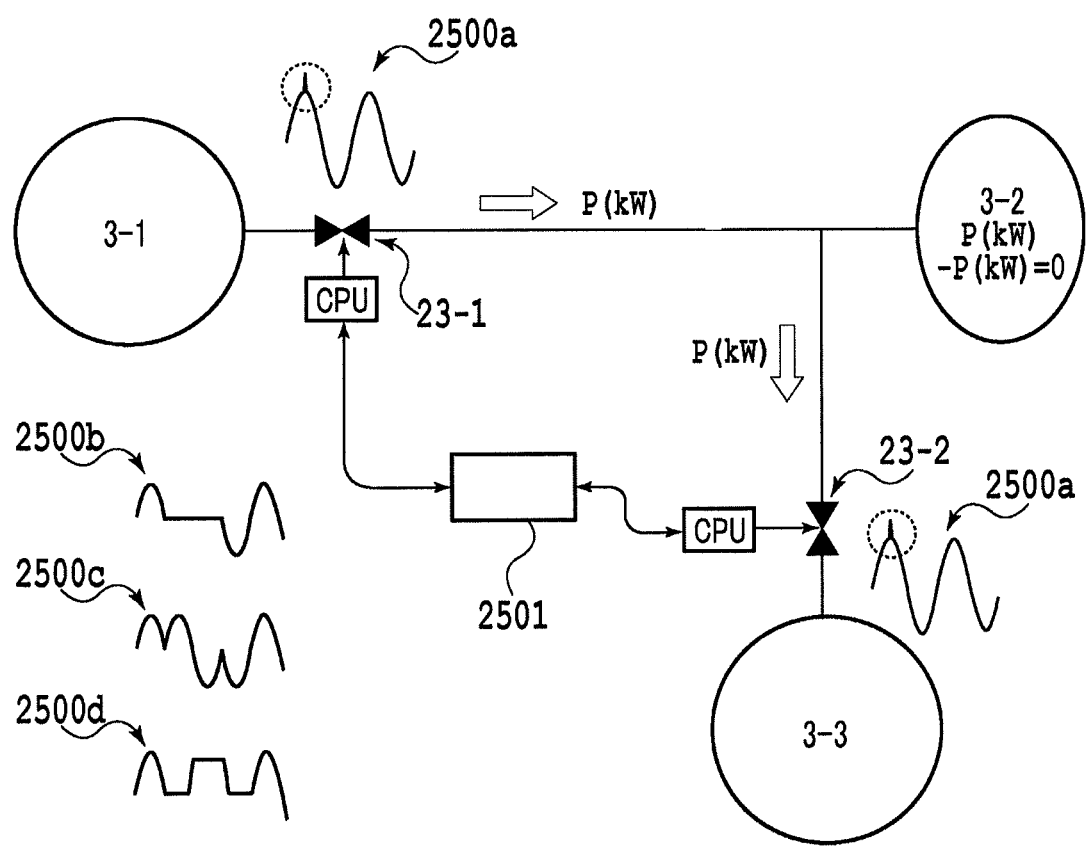
FIG. 25 is a diagram illustrating the principle of a method for time synchronization.

FIG. 25 indicates when the power converter pairs 23-1 and 23-2 are driven at the same timing and at the same magnitude of power, power can be fed from the power grid 3-1 to the power grid 3-3 without feeding of power into the power grid 3-2 or reception of power by the power grid 3-2. This operation is referred to as time synchronization.

Since the amount of information carried on the voltage waveform is limited as described above, the power converters may be made ready for operation by pre-transmitting the meaning of the small amount of information via another external data channel. This is a method for time synchronization according to the present invention which is based on a combination of the electric wave for time synchronization and the electronic information for time synchronization.

A signal is carried on a voltage waveform. However, a peak of a voltage waveform 2500 involves a large amount of noise, and thus the signal may be placed on the voltage waveform 2500 at a zero crossing where the voltage is zero. Alternatively, a power line carrier communication signal may be placed on the voltage waveform. The signal may be placed on a current waveform rather than on the voltage waveform. Alternatively, the signal may be created by the power converter pair 23-1 itself.

The number of electric waves for time synchronization is not limited to one. A combination of electric waves may be provided with a meaning. The use of a combination allows time synchronization to be achieved simply by the electric wave for time synchronization. For example, at least two electric waveforms may be used to generate an alarm signal one cycle prior to the beginning of power transmission in order to make the power converters ready. Furthermore, the timing for starting transmission may be adjusted by providing countdown signals corresponding to changes in the number of cycles for intervals.

Alternatively, the electronic information for time synchronization may be GPS time information or a radio clock signal so that time synchronization can be achieved by synchronizing clocks for the power converter pairs 23-1 and 23-2. This eliminates the need for the electric waveform for time synchronization.

The present invention is characterized by subjecting the plurality of power converters to time synchronization by combining an electric waveform for time synchronization propagating on the power line created by the power converter pair 23-1 with electronic information for time synchronization carrying the meaning of the electric waveform. The time synchronization can be achieved as follows.

For example, the power converter pair 23-2 to be synchronized with the power converter pair 23-1 is pre-notified of the following information through another information route such as an external channel 2501: the power converter pair 23-1 creates and feeds a unique voltage waveform, a unique current waveform, a unique active power waveform, a unique reactive waveform, a fluctuation in the magnitude of each of the voltage, current, active power, and reactive power, a fluctuation in phase, a fluctuation in phase vector, a fluctuation in space vector trajectory, and a start/stop alarm signal or a start/stop signal corresponding to a combination of any of the above-described pieces of information (these pieces of information are collectively referred to as waveform profiles 2500a to 2500d), into the power circuit.

Upon receiving the information, the power converter pair 23-2 configures a detection circuit and software so that the electric waveform profiles can be quickly detected as electric waveforms form time synchronization to allow power conversions to be synchronized.

When the pre-notified electric signal profile for an alarm signal is detected on the power line near the scheduled time, the power converter pair 23-2 starts to make preparations required for power conversions. The plurality of power converter pairs 23-1 and 23-2 can be temporally synchronized by, for example, starting power conversion a predetermined number of voltage zero crossing cycles after the alarm signal.

Furthermore, an algorithm may be created in which power conversion is started immediately after detection of an imminent signal pre-specified in the electronic information for time synchronization for confirmation.

Alternatively, an electric waveform profile pre-specified in the electronic information for time synchronization may be transmitted during power conversion so that the magnitude of the power conversion can be increased or reduced based on a predetermined output change rate.

To stop the electric conversion, the following method may be used. When an electric waveform profile pre-specified in the electronic information for time synchronization is detected during the power conversion, the magnitude of the power conversion starts to be reduced a given number of zero crossing cycles after the detection. Then, when a stop signal is detected, the power conversion is stopped.

Electronic information for time synchronization indicating what procedures and electric waveform profiles to use may be pre-transmitted so as to simplify the electric waveform profiles, allowing the adverse effects of noise to be mitigated.

As described above, a plurality of multi-terminal power conversion devices 1 located away from one another may be temporally synchronized by combining the electric waveform profiles which can be transmitted at the speed of light but which carry only a small amount of information, with the rich electronic information for time synchronization. The power line carrier communication (PLC) allows the electric waveforms and the information to pass through the same route and advantageously also enables the route to be checked for physical continuity.

According to the present invention, when electronic information for cooperative time synchronization is pre-communicated to a plurality of multi-terminal power conversion devices 1, the plurality of multi-terminal power conversion devices 1 can synchronously perform power conversion operations. Consequently, power can be interchanged to a remote power grid via the plurality of multi-terminal power conversion devices 1.

Furthermore, the combination of the electric waveforms and the electronic information allows the electric waveform to be simplified, thus increasing the degrees of freedom for the usable waveforms and a method for implementing the waveforms. The combination of the electric waveforms and the electronic information further reduces temporal restrictions on the electronic information and increases the degrees of freedom for usable data lines and communications means.

Additionally, both for the electric waveforms and for the electronic information, the degrees of freedom for relevant techniques is increased. This increases opportunities that telecommunications carriers and power converter manufacturers to enter the business, leading to healthy competition.

The power system according to another embodiment of the present invention is characterized in that the electric waveform for time synchronization is based on the current waveform.

In a BTB power converter, one power converter rectifies AC into DC, and the other power converter turns on and off the DC voltage several thousand to several ten thousand times per second to vary the time intervals of the voltage to generate a sine voltage on average.

The voltage created and the voltage of a power grid connected to the BTB power converter via a series reactor are synchronized in terms of frequency, with a slight phase difference made between the voltages. Then, the target current can be fed or drawn into the power grid.

In general, an output circuit of the power converter includes a reactor and a smoothing capacitor. Thus, if the above-described electric waveform profiles such as a voltage waveform, a current waveform, an active power waveform, a reactive waveform, a fluctuation in the magnitude of each of the voltage, current, active power, and reactive power, a fluctuation in phase vector, a fluctuation in space vector trajectory, and a start/stop alarm signal or a start/stop signal corresponding to a combination of any of the above-described pieces of information into an electric circuit, the electric circuit itself often needs to be improved. However, in spite of a decrease in the speed of a fluctuation as a result of smoothing action of the reactor, the feeding of the current waveform can be achieved simply by improving signals into a digital signal processor of the power converter, and is thus an economical method.

Electric waveform profiles operating at a higher speed and having a relatively large amount of information can be obtained by a method of measuring the phase of a current based on the waveform of the current to detect a phase shift, a fluctuation in the relative phase of the space vector of a three-phase current, and the like.

If the electric waveform for time synchronization is a current, the power converter itself of the multi-terminal power conversion device can generate a variety of electric waveforms with different combinations of magnitude, phase, and timing.

Furthermore, the operations of the power converters and the control system therefor are checked while the electric waveform signal is being transferred. Thus, any malfunction can be quickly detected to prevent an accident.

Moreover, a power conversion facility for the power converters including the control system is also used as an electric waveform generation facility. This configuration eliminates the need for additional facilities and is thus economical.

The power system according to another embodiment of the present invention is characterized in that the electronic information for time synchronization is a power line carrier communication signal propagating on the power line.

When a power line carrier system is adopted in which the electronic information for time synchronization is transmitted on the same power line as that on which the electric waveform for time synchronization is propagated, if the electronic information cannot be transmitted due to a physical defect such as disconnection or grounding of the power line, no information is returned. Hence, a defect in the power line can be easily detected.

In addition to the electronic information for time synchronization, the electric waveform for time synchronization is characterized as follows. A power line carrier signal may be used as an electric waveform for time synchronization and inserted at the timing of voltage zero crossing so as to replace the electric waveform profile for time synchronization.

If the electric waveform for time synchronization is a voltage, first, addition of a circuit for bypassing a current reactor, an AC filter, or the like allows the power converter itself of the multi-terminal power conversion device to generate the electric waveform.

Second, voltage information created by the power converter may have a frequency of several kHz to more than 10 kHz and a larger amount of information than the electric waveform based on a current.

Third, if the electric waveform for time synchronization is created by a facility other than the power converter, the amount of information in the electric waveform can be increased by adding, to the facility, a device for applying a voltage waveform to the transmission line.

Fourth, if the electric waveform for time synchronization is created by a facility other than the power converter, the same transmission line can also be used for the electronic information for time synchronization, eliminating the need to newly install a channel for the electronic information.

Fifth, the transmission line carries a high voltage, thus improving the security of the electronic information.

If a facility other than the power converter is the power line carrier communication facility and a high frequency voltage waveform is created so as to be carried on the transmission line, the facility and the power converter can advantageously share the transmission line for control. The power line carrier system may make the channel physically the same as the electric line. If a new electric line is created, no new channel needs to be installed. Furthermore, the line can be automatically checked for continuity.

(Method for Power Transaction 1)

Figure 26A:
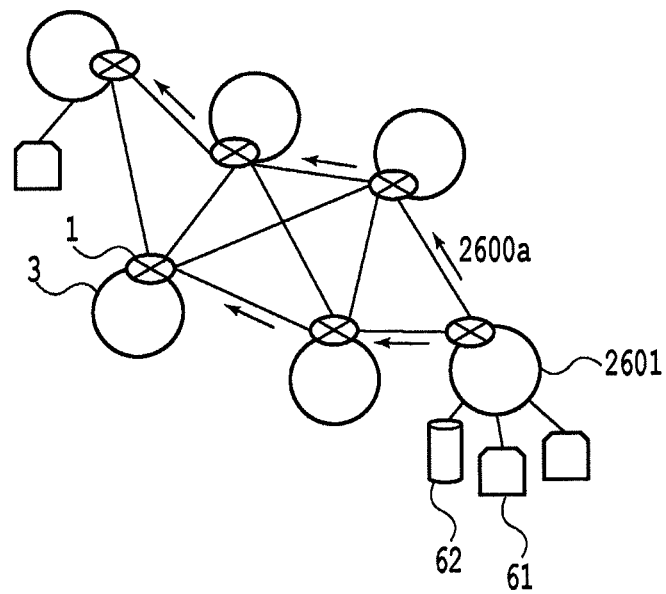
FIG. 26A is a diagram schematically illustrating a first power interchange request stage of power interchange.
Figure 26B:
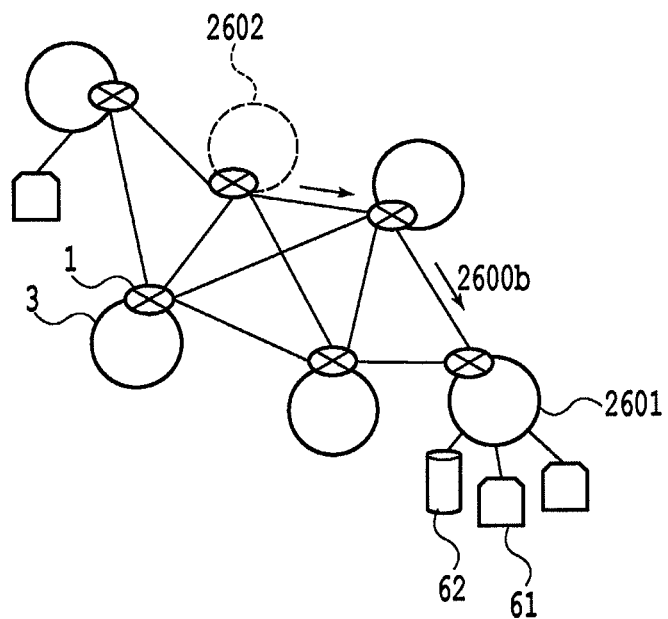
FIG. 26B is a diagram schematically illustrating the response to the request stage of power interchange.

FIGS. 26A and 26B show a first power interchange request step in the power network system. FIG. 26A shows that any one of the multi-terminal power conversion devices 1 or power apparatuses of a power grid 2601 is broadcasting an inquiry with the desired transaction conditions to the devices and apparatuses of the other power grids. FIG. 26B shows that in response to the inquiry, a power grid 2602 that can interchange power to the power grid 2601 returns a reply with acceptable transaction conditions 2600*b* to the power grid 2601.

In the first power interchange request step, an IP packet transmitted by the power interchange requester in the power grid 2601 contains information including at least a transmitter IP address, a multicast IP address, and desired transaction conditions 2600*a*. An IP packet transmitted by the power interchange responder in the power grid 2602 contains information including a responder IP address, a return IP address, and acceptable transaction conditions 2600*b*.

Figure 27A:
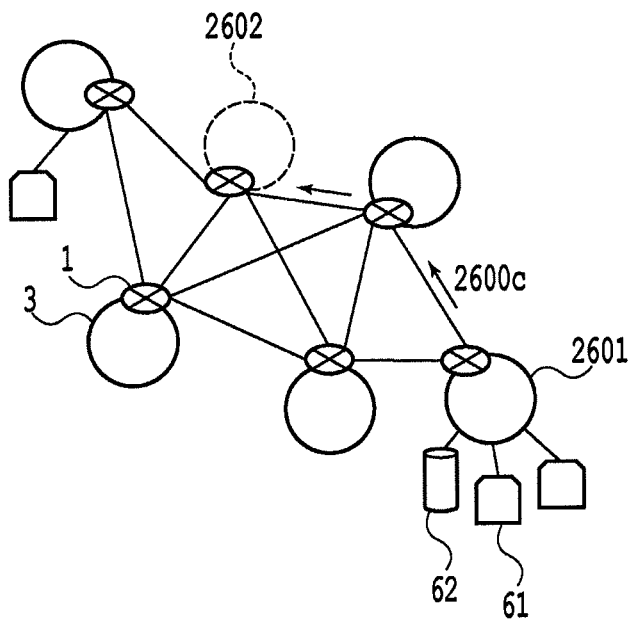
FIG. 27A is a diagram schematically illustrating a second power interchange request stage of power interchange.
Figure 27B:
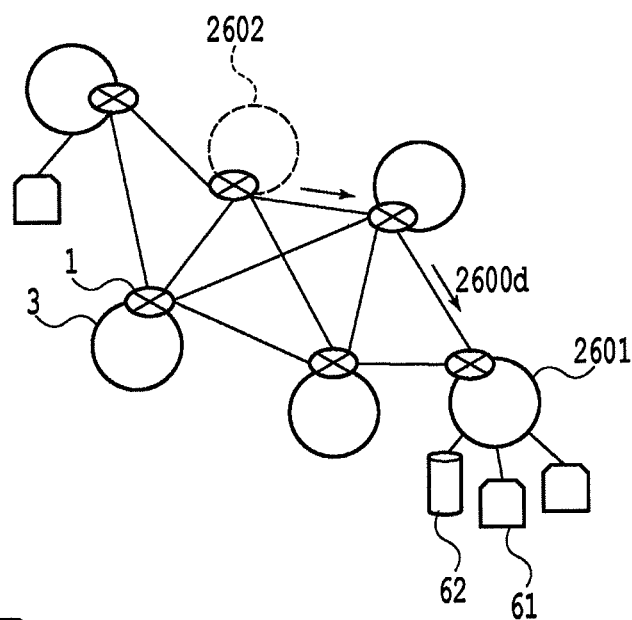
FIG. 27B is a diagram schematically illustrating the response to the request stage of power interchange.

FIGS. 27A and 27B show the second power interchange request stage, in the power network system. FIG. 27A shows reserved transaction conditions 2600*c* are being transmitted to the multi-terminal power conversion device 1 installed in the power grid 2602 having replied that the power grid 2602 can interchange power. FIG. 27B shows that the power grid 2602 is transmitting a reply with reservation confirmed conditions 2600*d*.

In the second power interchange request step, an IP packet transmitted by the power interchange requester in the power grid 2601 contains information including at least the transmitter IP address, a receiver IP address, and reserved transaction conditions. An IP packet transmitted by the power interchange responder in the power grid 2602 contains information including the responder IP address, the return IP address, and reservation confirmed conditions.

After a power interchange profile is determined between the transmitter and receiver for power interchange, routing is determined through a (1) step of selecting a plurality of routing paths, a (2) step of collecting routing profiles, a (3) step of selecting a power interchange route, a (4) step of reserving routing, a (5) step of confirming routing, a (6) step of monitoring implementation of power interchange, and a (7) step of determining a method for emergency routing in case of an abnormal state.

Figure 28A:
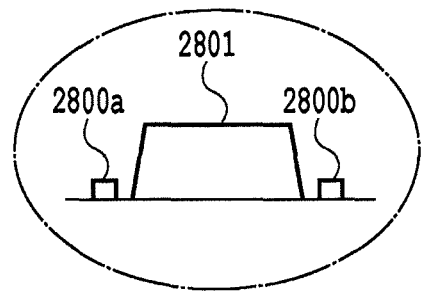
FIG. 28A is a diagram showing the waveform of power on an interconnecting electric line.
Figure 28B:
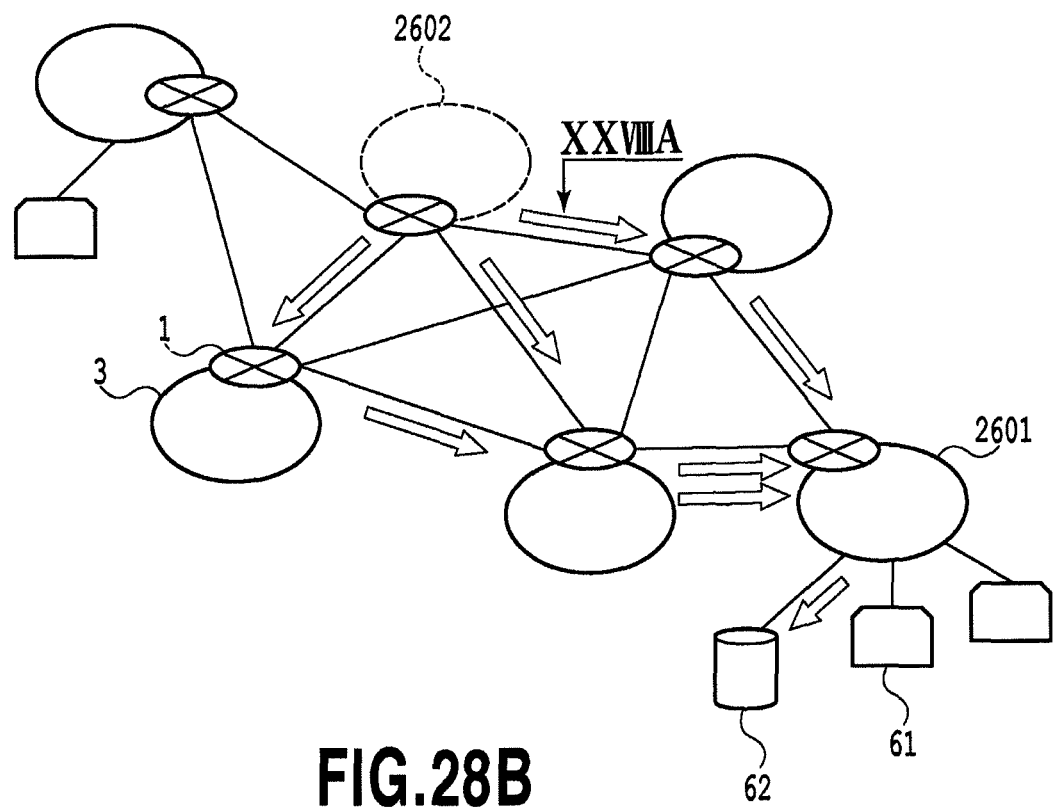
FIG. 28B is a diagram schematically illustrating a power interchange routing stage.

FIGS. 28A and 28B conceptually illustrate how power is eventually interchanged at the reserved time. Passage through a plurality of routes enables the network to be flexibly operated by reducing burdens on each of the routes, minimizing the adverse effects of a possible failure, and allowing an alternative route to be quickly found. FIG. 28A will be described below.

Starting power interchange, it is possible to prevent power interchange mismatch by starting the interchange operation at a small power change rate specified in the transaction conditions when it is the reserved time. Furthermore, an interchange start signal may be transmitted again at the reserved time.

In the present invention, inquiries may be made to an unspecified number of apparatuses to increase the number of power interchange options, and a plurality of power apparatuses or multi-terminal power conversion, devices 1 requesting interchange power in accordance with a given algorithm may be identified to make power interchange reservations. The implementation of the power interchange is confirmed when any of the reserved power apparatuses or multi-terminal power conversion devices 1 returns an acknowledgement signal. The power interchange algorithm set forth in the present claim may specify, for example, how to alter the power interchange immediately before the beginning and to deal with a possible accident during the power interchange. For routing, a route with reduced power losses is desirably selected by combining a plurality of power interchange requests. A series of operations related to a procedure for power interchange requests are desirably alterable at any time, that is, several days, several hours, several minutes, or several seconds before the beginning of the operation.

Furthermore, the power apparatuses or multi-terminal power conversion devices 1 receiving the power request may check whether or not it is able to accommodate the desired transaction conditions. If the apparatus or device can accommodate the conditions, the power apparatuses or multi-terminal power conversion devices 1 receiving the power request may be such a power network system as having a flexible transaction form capable of communicating the acceptable transaction conditions of the apparatus or device.

Moreover, the power apparatuses or multi-terminal power conversion devices 1 receiving the power request includes a step of reconfirming the reserved transaction conditions. And after the reconfirmation, the power apparatuses or multi-terminal power conversion devices 1 receiving the power request may be such a power network system as having a reliable transaction form capable of communicating the confirmed transaction conditions of the apparatus or device.

If a problem occurs during any of the steps, the procedure returns to the previous step.

Furthermore, the present invention enables the construction of a power network system capable of optimized power interchange routing. A plurality of power interchange requests involving an enormous number of options including those about which one of the routes including power interchange from a bulk power grid serves to reduce total power loss and those concerning physical restrictions and transaction price information. However, the routing problem can be solved by respecting economic efficiency based on price information including the power losses, and solving an optimization problem with physical restriction conditions.

(Method for Power Transaction 2)

Now, a specific procedure for power transactions according to the present invention will be described based on the configuration shown in FIGS. 4A and 4B. When there is only a small state of charge SOC remaining in the batteries in an energy storage device B1 in the power grid 3-1, which is thus predicted to be hindered from operating autonomously, the following operations are performed.

(1) The power apparatus control terminal device 12 for the energy storage device B1 first broadcasts an inquiry to the other power apparatuses within the power grid 3-1 through a communication port 192. 168. 1. 3 of the device 12 according to a procedure described below to request power interchange.

(2) If no apparatuses within the power grid transmits a replay indicating the presence of an available power generation device, the power apparatus control terminal device 12 then transmits, together with a power interchange profile, an inquiry about whether any of the other power grids 3-2 to 3-4 and 3-6 and the power apparatus system 4 can interchange power, to a port 192. 168. 1. 1 of the multi-terminal power conversion device 1 installed at the power grid 3-1 which port corresponds to a default gateway.

(3) The multi-terminal power conversion device 1 installed in the power grid 3-1 broadcasts an inquiry with above-described content to the gateways of the multi-terminal power conversion devices 1 installed at the other power grids 3-2 to 3-4 and 3-6 and the power apparatus system 4.

(4) For example, when the multi-terminal power conversion device 1 installed at the power grid 3-4 checks the condition of the grid to determine that the grid can interchange power, the B connection terminal 202 at 192. 168. 0. 11 returns its IP address and an interchange power profile to the communication port 192. 168. 1. 3 of the power apparatus control terminal device for the energy storage device B1 in the power grid 3-1.

(5) Upon determining that a power generation device G4 in the power grid 3-4 can interchange power, the multi-terminal power conversion device 1 transmits a reply with an available power interchange profile from a port 192. 168. 4. 2 of the power apparatus control terminal device 12 for G4 to the communication port 192. 168. 1. 3 of the power apparatus control terminal device for the energy storage device B1 in the power grid 3-1.

As described above, a procedure is carried out for allowing the power generation device G4 in the power grid 3-4 to supply the energy storage device B1 in the power grid 3-1 with power. This enables conventionally impossible power interchange in which an amount of power required to allow one power grid to operate autonomously is selectively supplied by another power grid. Similarly, when a natural energy-derived power source of one power grid generates excess power, the power can be distributed among and absorbed by the energy storage devices in many other power grids. This promotes sharing of the power apparatuses and enables the goal to be achieved with fewer resources than a configuration in which the power apparatuses are provided in each of the power grids.

(Method for Power Transaction 3)

Figure 29:
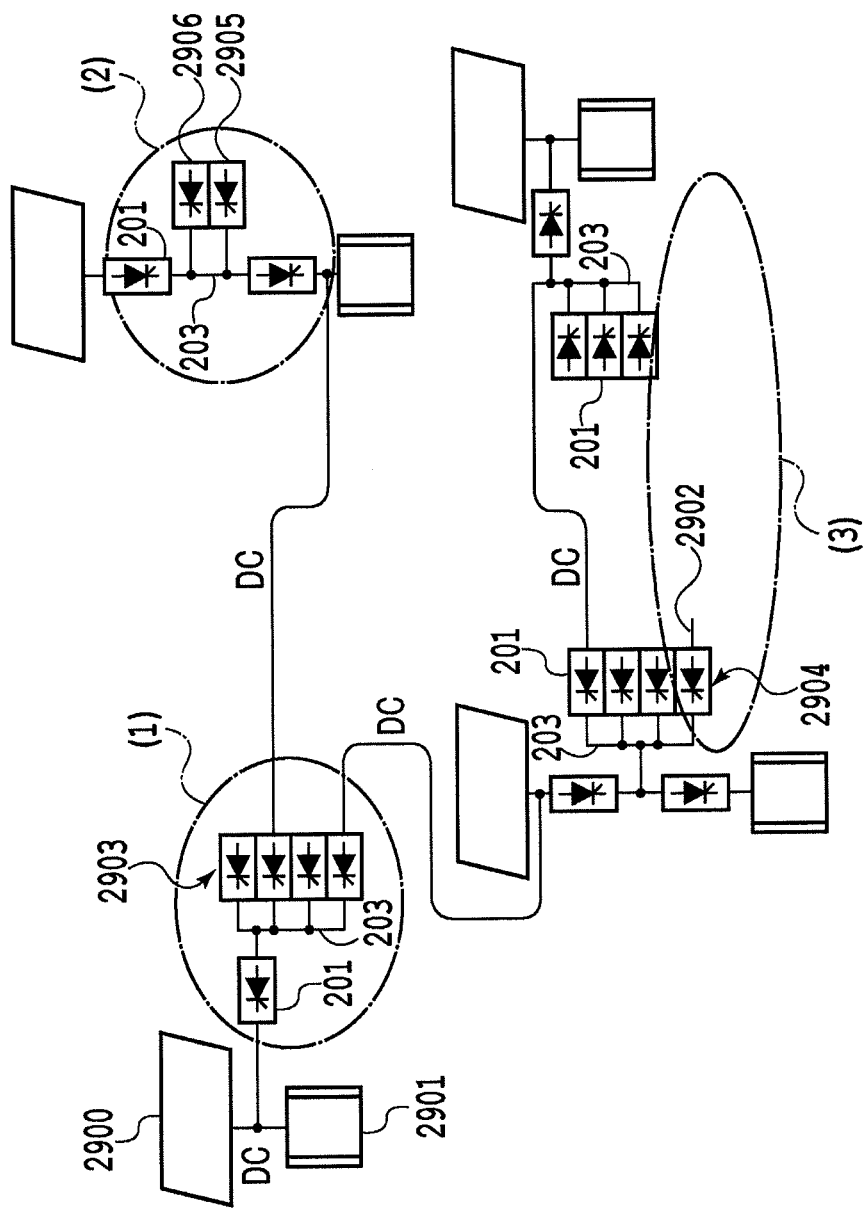
FIG. 29 is a diagram showing a configuration of a power network in which the multi-terminal power conversion devices are connected to DC power grids.

FIG. 29 illustrates an example in which the multi-terminal power conversion device 1 is connected to a DC power grid. A power grid in FIG. 29 is shown to include a solar power generation device 2900 and a energy storage device 2901. This configuration includes minimum components, and power apparatuses not shown in FIG. 29 may be connected to the power grid.

A portion (1) illustrates an example in which the A connection terminal 201 is connected directly to a DC connection between the energy storage device 2901 and the solar power generation device 2900. A DC voltage generated by the portion (1) controls charge and discharge of the energy storage device. This configuration is likely to fail to perform the optimum V-I control of solar power generation but allows a reduction in the number of power converters. Thus, such a connection is possible for small-scale power interchange.

A portion (2) illustrates an example in which the solar power generation device 2900 is connected to one A connection terminal 201, in which the energy storage device 2901 is connected to another A connection terminal 201, and in which the other A connection terminal 201 is connected to a wind power generation device 2905 and another AC or DC power grid 2906. The A connection terminal 201 can alternatively perform the optimum V-I control of the solar power generation device 2900 and the charge and discharge control of the energy storage device 2901. A connection to the AC grid requires an AC reactor or transformer at the output of the A connection terminal 201, through this is not shown in FIG. 29.

A portion (3) illustrates an example in which one of the A connection terminals 201 provides power directly to an AC home electric appliance 2902. Although not shown in the drawings, this configuration requires a reactor or a transformer.

Thus, if there are many such small DC power grids or DC consumers as obtaining power from solar cells and batteries, then the DC power grids and the DC consumers can be directly connected together via the multi-terminal power conversion devices 1 to form a large power network system. Small-scale consumers alone are affected by exhausted batteries or failing solar cells, but a power network allows such consumers to share power apparatuses and reduce the total facility reserve rate. This serves to improve the reliability of the network system. The network system can be used in developing countries where villages and towns individually have DC power grids which are not interconnected together.

DC networking is not normally recommended because of the typical increase in interrupting current at the time of an accident. However, in the present invention, since all the interconnection lines are connected to the connection terminals of the multi-terminal power conversion device 1, gate blocking can be applied at the instant of an accident. The gate blocking is executed at a high speed and enables DC to be interrupted. This enables construction of a DC network, which cannot be conventionally established without a DC circuit breaker.

(Method for Power Transaction 4)

The method for power transaction according to the present invention is characterized in that in the first power interchange request step in the power network system, the IP packet transmitted by the power interchange requester contains information including at least the transmitter IP address, the multicast IP address, and the desired transaction conditions and in that the IP packet transmitted by the power interchange responder contains information including the responder IP address, the return IP address, and the acceptable transaction conditions.

The desired transaction conditions as described herein are characterized by including desired attributes including the desired direction and magnitude of interchanging active power, the desired magnitude and direction of interchanging reactive power, a desired interchange start time, a desired interchange end time, a desired interchange price upper limit, a desired interchange price lower limit, and an interchange power generation source. The acceptable transaction conditions as described herein are characterized by including attributes including the acceptable direction and magnitude of interchanging active power, the acceptable magnitude and direction of interchanging reactive power, an acceptable interchange start time, an acceptable interchange end time, an acceptable interchange price upper limit, an acceptable interchange price lower limit, and an acceptable power generation source. If no power apparatus within the same power grid can meet the conditions or power interchange is initially requested to another power grid, then in the first power interchange request step, a similar procedure is carried out on all the other multi-terminal power conversion devices.

In the second power interchange request step, the IP packet transmitted by the power interchange requester is characterized by containing information including at least the transmitter IP address, the receiver IP address, and the reserved transaction conditions. The IP packet transmitted by the power interchange responder is characterized by containing information including the responder IP address, the return IP address, and the reservation confirmed conditions.

The reserved transaction conditions as described herein are characterized by including attributes including the reservation number, the reserved direction and magnitude of interchanging active power, the reserved magnitude and direction of interchanging reactive power, a reserved interchange start time, a reserved interchange end time, a reserved interchange price, and a reserved interchange power generation source. The reservation confirmed conditions as described herein are characterized by including attributes including a reservation confirmed number, the reservation confirmed direction and magnitude of interchanging active power, the reservation-confirmed magnitude and direction of interchanging reactive power, reservation-confirmed interchange start time, reservation-confirmed interchange end time, a reservation-confirmed interchange price, and a reservation-confirmed power generation source.

The routing algorithm is characterized by carrying out the following: a (1) step of selecting a plurality of routing paths, a (2) step of collecting routing profiles, a (3) step of selecting a power interchange route, a (4) step of reserving routing, a (5) step of confirming routing, a (6) step of monitoring implementation of power interchange, and a (7) method for emergency routing for an abnormal state, after a power interchange profile has been determined between the transmitter and receiver for power interchange.

Thus, a procedure for carrying out a reliable method for power interchange can be designed. Upon receiving the acceptance signal, the power apparatus or multi-terminal power conversion device determines whether to make a reservation taking the transaction conditions and the like into account. If a negotiation is required, the steps are repeated a number of times. One of the power interchange candidates which meets the conditions is selected, and the power interchange is reserved, including the magnitudes, directions, times, and prices of active power and reactive power, and the power generation source. If the power interchange is expected to pose any problem even with a possible change in situation, the receiver of the reservation returns a reservation confirmation signal with the above-described conditions, thus confirming the reservation of the power interchange.

Once the reservation is confirmed, the power apparatus or multi-terminal power conversion device transmits an IP packet containing the reserved transaction conditions. Upon receiving the IP packet, the power interchange target returns an IP packet containing the reservation confirmed conditions. Thus, the procedure of the series of steps for power interchange reservation ends, and the power interchange is carried out at the reserved time.

A typical example of the above-described flow will be described with reference to FIG. 11 or FIG. 12.

Figure 12:
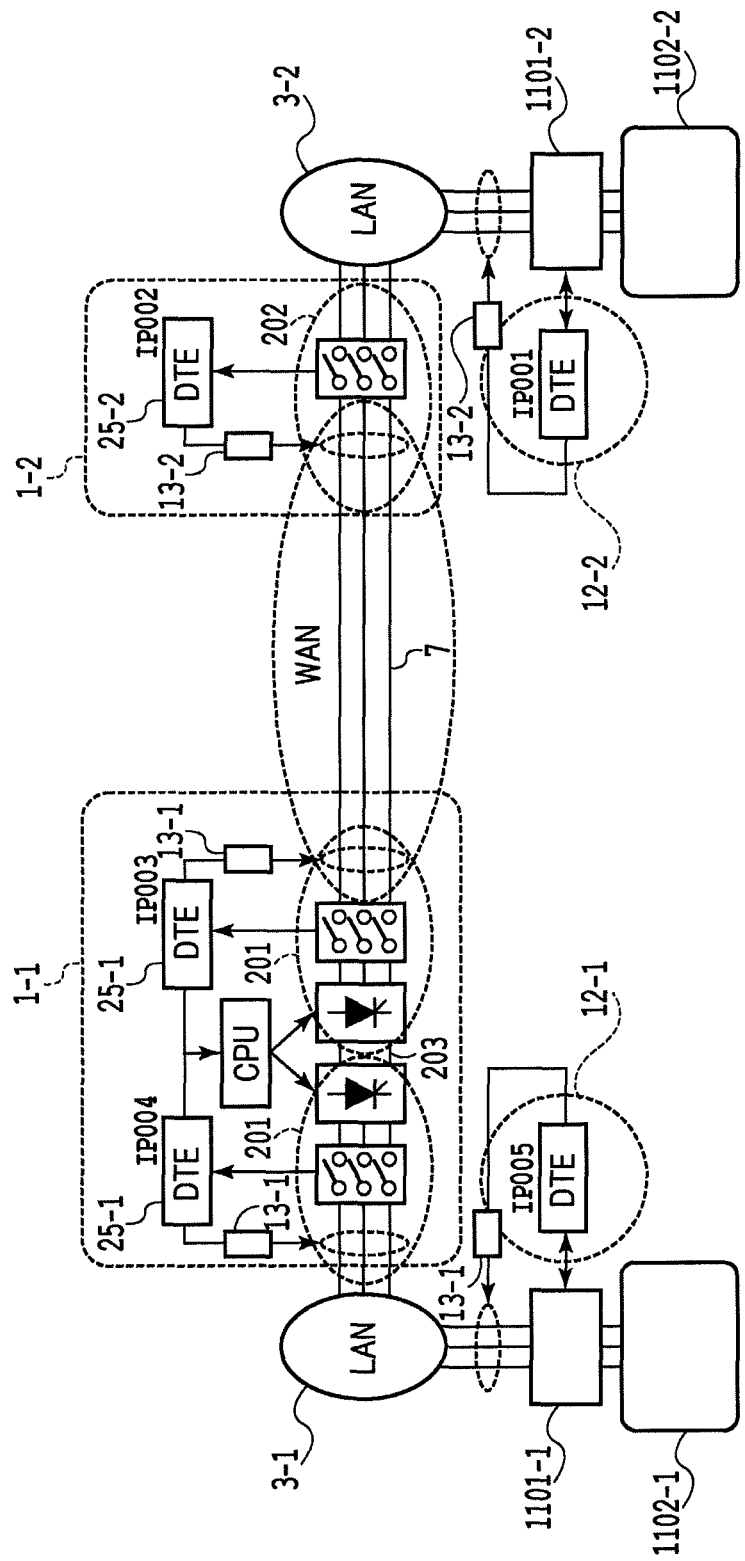
FIG. 12 is a diagram showing a configuration of a power network according to the present invention in which a WAN and LANs for communication circuits are formed using power line carrier communication channels.

In FIG. 11 or FIG. 12, if the power apparatus 1102-2 installed in the power grid 3-2 requests power interchange from the power apparatus 1102-1 installed in the power grid 3-1, the following procedure is carried out.

(1) If the IP address of the control terminal device 1101-2 for the power apparatus. 1102-2 is IP001, the power apparatus 1102-2 inquires at the LAN about whether any of the power apparatuses within the LAN can interchange power to the power grid 3-2.
(2) If none of the power apparatuses within the LAN can interchange power, the inquiry is transferred to the WAN via the B connection terminal 202 (IP002) of the multi-terminal power conversion device 1-2 installed in the power grid 3-2.
(3) The inquiry is broadcasted within the WAN. The connection terminal of the multi-terminal power conversion device 1-1 connected to the WAN inquires at its LAN.
(4) If the power apparatus 1102-1 in the power grid 3-1 is found to be able to interchange power, the IP001 makes a power interchange reservation at the IP005.
(5) Then, a plurality of routes are selected in accordance with the routing protocol. FIG. 1 shows only one route, but a plurality of routes are normally used.
(6) As shown in FIG. 11 or FIG. 12, the power apparatus is reached via a route starting from the IP001 and passing through the IP 002, the IP 003, the IP 004, and the IP 005. This routing is recorded. (7) At the reserved time, the circuit breakers at the IP 002, the IP 003, and the IP 004 are closed, and the corresponding power converters migrates power.
(8) At the same time, the power apparatus control terminal devices 12-2 and 12-1 at the IP 001 and the IP 005 start power control. As a result, the IP 001 interchanges power to the IP 005.

In practice, the power interchange can be achieved smoothly when the relevant information includes a reservation number, the rate of an increase in output at the beginning of power interchange, the rate of a decrease in output at the end of power interchange, and the time.

Even when the power interchange profile requires complex fluctuations in the magnitude of power, power packets can be used to simplify interactions. The information and the reservation process can be simplified by, for example, using power packets each for 1 kwH on the hour every hour and including only the number of power packets and the start time in the information, or pre-specifying the unit price of one power packet for every month.

Thus, the optimum route selection can be achieved. First, a predetermined number of routes are selected in order of increasing number of power converters present on the route, and routing profiles for the selected routes are collected which indicate the amount of power allowed to pass through the connection terminals of the multi-terminal power conversion device during a time slot for which the power interchange has been reserved, the amount of power allowed to pass through the interconnecting electric lines during the time slot, loss in power passing through the multi-terminal power conversion device, loss in power passing through the interconnecting electric lines, and the like.

Then, one of the routes is selected in accordance with an algorithm giving top priority to a combination that minimizes the total power loss attributed to the routing path. Based on the selected route, implementation of the required power conversion profile for the connection terminals of the multi-terminal power conversion devices is reserved. Thereafter, the reservation is confirmed when acceptance signals are received from the connection terminals of the multi-terminal power conversion devices.

Then whether the confirmed power interchange has been actually carried out is determined based on monitoring, the monitoring is performed through the IP communication between the multi-terminal power conversion device and the power apparatus control terminal device. In an abnormal state, those of the initially selected routes which have low priorities are sequentially used. The total power loss can be reduced by carrying out routing for power interchange in accordance with the above-described procedure.

(Method for Power Transaction 5)

Figure 30:
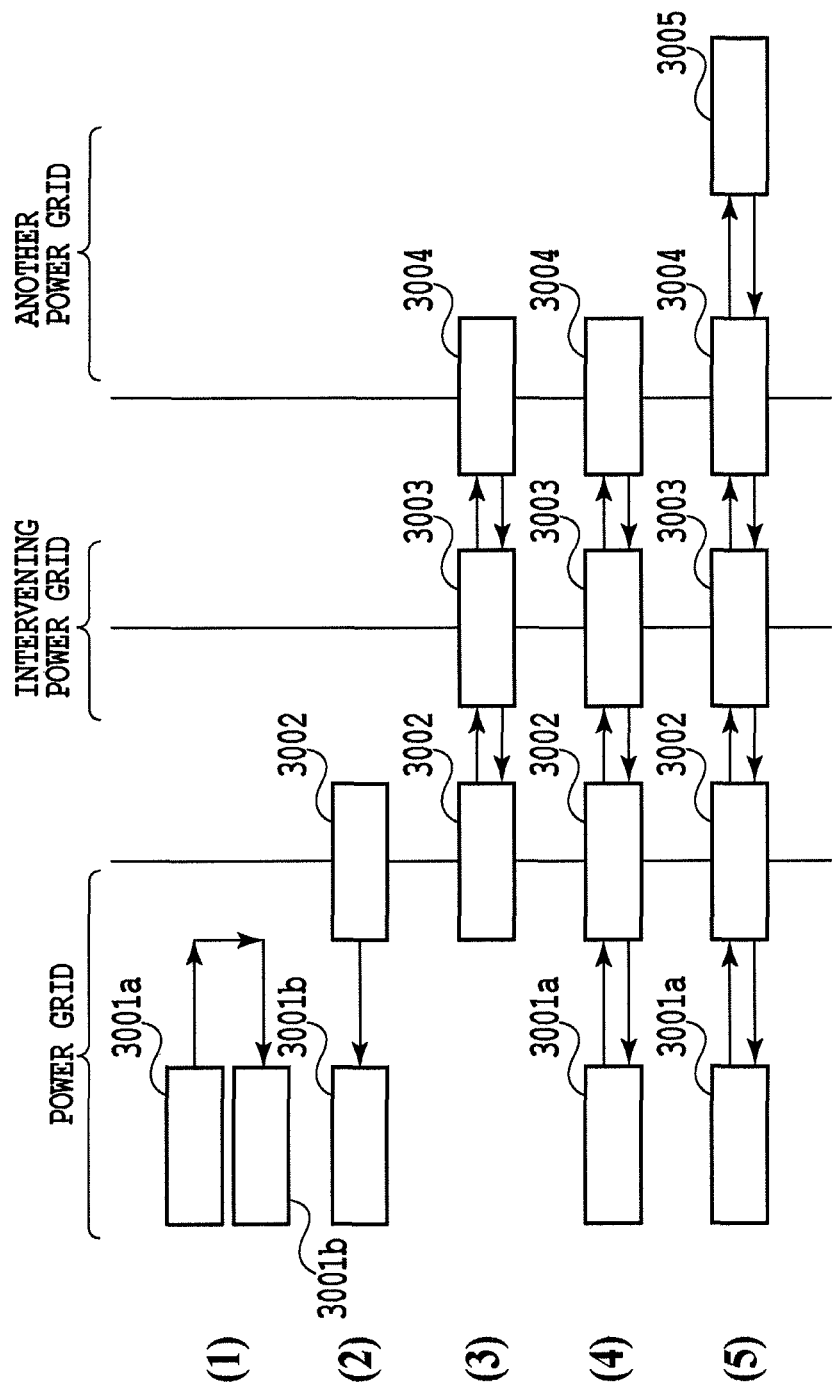
FIG. 30 is a diagram showing various forms of power interchange.

FIG. 30 is a diagram illustrating various forms of power interchange.

In an example illustrated in (1), power is interchanged between a power interchange request transmitting power apparatus 3001*a* and a power interchange request receiving power apparatus 3001*b* within the same power grid. In this case, the purpose can be achieved by communication within the LAN. Many cases of power interchange occur within the power grid: power generated by a wind power generator is used to charge the energy storage device, and the shortage of power is compensated for by the energy storage device. These cases can also be dealt with by the reservation procedure. Although depending on a communication speed, the time required for the procedure is at most several tens of milliseconds. This is close to a real-time response.

An example illustrated in (2) corresponds to a case that a power interchange request transmitting multi-terminal power conversion device 3002 inquires of the power interchange request receiving power apparatus 3001*b* in the power grid for power interchange. In this case, the demand is treated as from the multi-terminal power conversion devices without identification of the requesting apparatuses regardless of whether the request is from the WAN side or from the LAN side.

In an example illustrated in (3), the power interchange request transmitting multi-terminal power conversion device 3002 and a power interchange request receiving multi-terminal power conversion device 3004 interchange power together with a multi-terminal power conversion device 3003 through which the power passes. In this case, the multi-terminal power conversion device predicts the demand and supply for its power grid and chooses to make a supply and demand reservation.

In an example illustrated in (4), the power interchange request transmitting power apparatus 3001*a* is identified, but the receiver is a power grid and not a particular power apparatus. In this case, a plurality of power grids with a more than sufficient balance between supply and demand interchange power to the transmitting power apparatus. For example, this corresponds to a case where rapidly increased wind power is absorbed by surrounding power grids or where an energy storage device with a reduced state of charge is recharged by cooperating with surrounding power grids.

An example illustrated in (5) corresponds to a case where the power interchange request transmitting power apparatus 3001*a* identifies a power interchange request receiving power apparatus 3005 to interchange power to the power apparatus 3005. This embodies, for example, a concept where a consumer purchases power from any power generation source.

(Method for Power Transfer 6)

FIG. 28A is a diagram showing a power waveform on an interconnecting electric line denoted by XXVIIIA in FIG. 28B. An IP packet containing information including the transmitter IP address, the receiver IP address, and the transaction conditions is located both before and after or either before or after interchange power 2801. In FIG. 28A, the IP packets are expressed as header information 2800*a* and footer information 2800*b*. In power line carrier communication, a digital signal is located either before or after or both before and after digital transmission power so that the digital transmission power and the digital signal can be transmitted as tagged digital power with information about the power transmitter, the power destination, and power transmission conditions.

A signal source for the header information 2800*a* and the footer information 2800*b* may be a PWM signal from the self-commutated power converter of the multi-terminal power conversion device 1. In this case, the self-commutated power converter itself can create the communication signal by using an appropriate AC filter bypass. Alternatively, a signal from a digital signal processor (DSP) or a central processing unit (CPU) may be directly used as an input to a power line carrier signal generation device.

This information enables power to be manageably identified, thus facilitating power interchange. The energy storage device allows power interchange operations to be concurrently performed easily, and thus interchange power may be divided into packets that are transmitted on different routes. When the capacity of the interconnecting electric line 7 is insufficient, the interchange power 2801 may be divided into several pieces that are bypassed through different interconnecting electric line routes.

The present invention enables a variety of power operations such as the operation of interconnecting electric line routes in a time sharing manner. The power line carrier communication allows the IP information located both before and after or either before or after the transmission power to be used for checks against the preservation information, recording of power transfers, recording of changes in route, and recording of power transactions such as emergency interchange.

In regard to a signal transmission timing for transmitting the header information 2800*a* and the footer information 2800*b* in the power line carrier communication, the header information 2800*a* and the footer information 2800*b* may be transmitted during several cycles when the self-commutated power converter is stopped. This reduces noise from the power converter, allowing the reliability of the information to be improved.

Thus, IP tags may be added to the interchange power. In a power network system, a DSP or a CPU can create not only power but also information using PWM or IP signals. The IP tag is transmitted immediately before power to be generated, to allow the power control of the receiving multi-terminal power conversion device 1 or power apparatus control terminal device 12 to be started. The IP tag is similarly transmitted at the end of the power generated, to allow the power control of the receiving multi-terminal power conversion device 1 or power apparatus control terminal device 12 to be ended.

Furthermore, the IP tags serve to avoid mismatch between the transmitter and the receiver which may result from control based only on the reserved interchange start and end times included in the reserved transaction conditions. Thus, problems such as an increase in voltage or frequency can be prevented. This can also be achieved by an external data communication network, but when information and power are transmitted based on the power line carrier communication, advantageously eliminating time differences since the same route is used. As a result, power can be identified.

(Power Transaction Database)

FIG. 31 shows an example of a power transaction database describing power transactions. The power transaction database is characterized by including a section in which power losses resulting from power conversions and transmissions during actual transactions are recorded. Furthermore, the power transaction database can describe virtual transactions. The power transaction database is further characterized in that for virtual transactions, paired descriptions of the input side and the output side are given and in that bonds, bills, and securities are recorded instead of cash income and cash outlay.

This recording method allows any user and company to record power transactions and distinguish each power transaction from any other power transaction, through power transition book such as a passbook and accounting such as double-entry bookkeeping.

This method includes a transaction date, the amount of power traded, the power generation energy source, the power producer, the energy storage company, price, power loss, $CO_2$ value, RPS value, green power value, and the like should be recorded in the transaction database. Thus, power with various pieces of information is managed. Thus, the information is combined with power, enabling the power flow to be identified.

This record is approved, traded, and settled by a third-party public organization. The role of the third-party organization is similar to that of a bank in the financial field. Then, any users and companies can record power transactions so as to distinguish each power transaction from the other power transactions, through a power transaction record such as a passbook and accounting such as double-entry bookkeeping.

Furthermore, this recordability allows power to be identified, providing not only the value of the power itself but also additional values based on differences among power generation sources such as wind power generation, solar power generation, oil-fired thermal power, and nuclear power, differences among power producers, and differences among energy storage companies.

Moreover, politically created values such as the $CO_2$ value, the RPS value, and the green power value can be provided.

Besides the power value, the additional values, and the political values, products derived from theses values and insurance products combined with weather and wind condition predictions may be spawned, leading to creation of relevant transaction markets.

Figure 32:
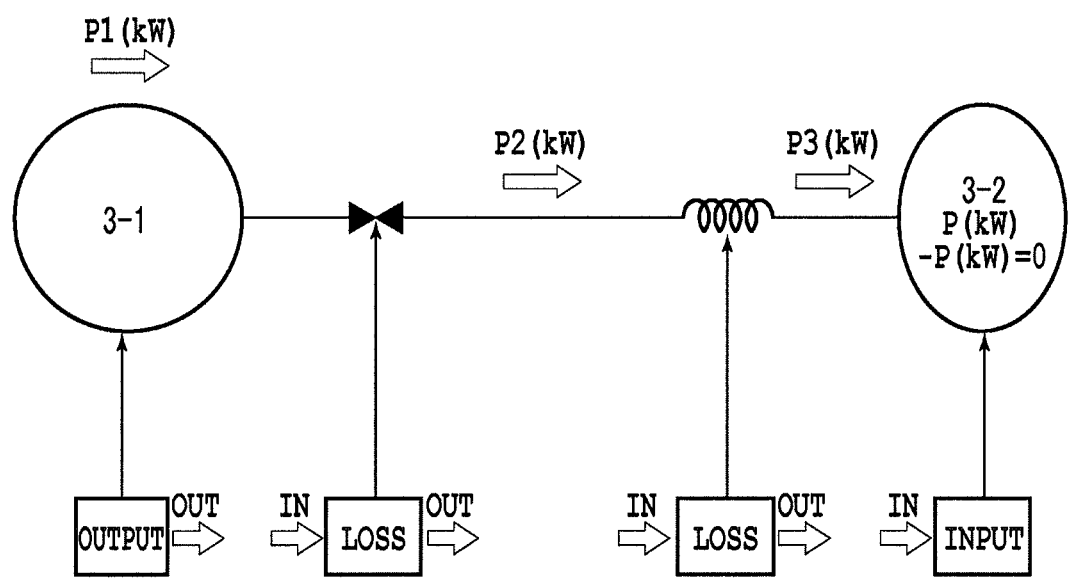
FIG. 32 is a diagram showing an example of interchange parts into which a power interchange implementation is divided.

FIG. 32 shows an example of a fluctuation in power quantity divided into power interchange parts corresponding to minimum units.

The parts are classified into at least three types: output only parts, input only parts, and input/output parts suffering losses (hereinafter referred to as interchange parts).

In FIG. 32, an output from the power grid 3-1 is expressed by an output part, and a loss at the converter is expressed by an interchange part. A loss at the transmission line is expressed by an interchange part, and an input to the power grid 3-2 is expressed by an input part.

The part expressions allow power interchange on a certain power interchange route to be expressed as the sum of simple parts. Thus, sharing of losses in a case where a plurality of power interchanges are superimposed on one another can be easily expressed by separating the power interchanges into these parts.

Consequently, a market for hardware for accurately measuring the power quantity is created, and a market is created for software for collecting values of the power quantity and unifying management of the power quantity taking power losses into account.

An organization and its business for settling a variety of power transactions and minimizing power losses to make profits are formed. This corresponds to a bank function in the financial field.

Moreover, in addition to the power transaction market, a market for separating the additional values from the power transaction market and trading these values is created. This market takes the form of the securities function in the financial field.

(Control Program)

First, a program for controlling the entire system for the whole multi-terminal power conversion devices recognizes input/output terminals, a power conversion circuit, a control circuit, a communication circuit, a measuring circuit, a protection circuit, a recording circuit, and driver software for a further detailed circuit and allowing even a different piece of hardware to function as a circuit of the multi-terminal power conversion device 1.

Furthermore, a plurality of multi-terminal power conversion devices also needs to be controllably cooperatively interconnected together. Thus, the program according to the present invention includes a basic operating system dealing with a variety of contents ranging from the hardware aspect such as prevention of a chain reaction blackout accident to the software aspect such as managing power transactions.

Moreover, a common basic operating system allows the entire system to be controlled based on the same concept and also performs remote operations for upgrading software and fixing bugs for all the devices through an external communication line in a distributed manner.

These functions form the basis for the unified management of the minimum operation protocol.

The basic operating system for the multi-terminal power conversion device 1 is developed so as to be mounted in all the devices. The basic operating system is software for a "power system" in which a large number of multi-terminal power conversion devices 1 are interconnected together and operate cooperatively".

Furthermore, the present invention provides a program that achieves the object for economy and convenience by appropriate remote upgrading.

Moreover, calibration of the voltage, current, and power measuring instrument and a procedure for malfunction detection, which are a basis for power transactions, form a fundamental algorithm for the basic operating system.

First, the program for controlling the entire system for the multi-terminal power conversion devices replaces the conventional principle of individual production, is standardized, and develops to a more excellent product through learning effects. This exerts significant economic effects.

Furthermore, when driver software is developed for the connection terminals, power conversion circuit, control circuit, communication circuit, measuring circuit, and protection circuit of the multi-terminal power conversion device 1, even a different product can be incorporated into the multi-terminal power conversion device 1. This provides increased market opportunities to a large number of companies.

Moreover, the program for interconnecting a plurality of multi-terminal power conversion devices for cooperation deals with a variety of contents ranging from the hardware aspect such as prevention of a chain blackout accident to the software aspect such as management of power transactions. This broadens the industry base.

Additionally, whereas conventional programs for controlling the power system, which are developed by many companies, are likely to be incoherent, the common basic operating system allows the entire system to be controlled based on the same concept.

In addition, a combination of the basic operating system and the driver forms a basis for enabling the unified management of the minimum operation protocol common to various industries ranging from power apparatuses to home electric appliances.

Moreover, the communication system enables the construction of a mechanism for upgrading the basic operating system and the driver and constantly incorporating the latest technologies.

(Protection Circuit 1)

(Accident Protection System)

Figure 33:
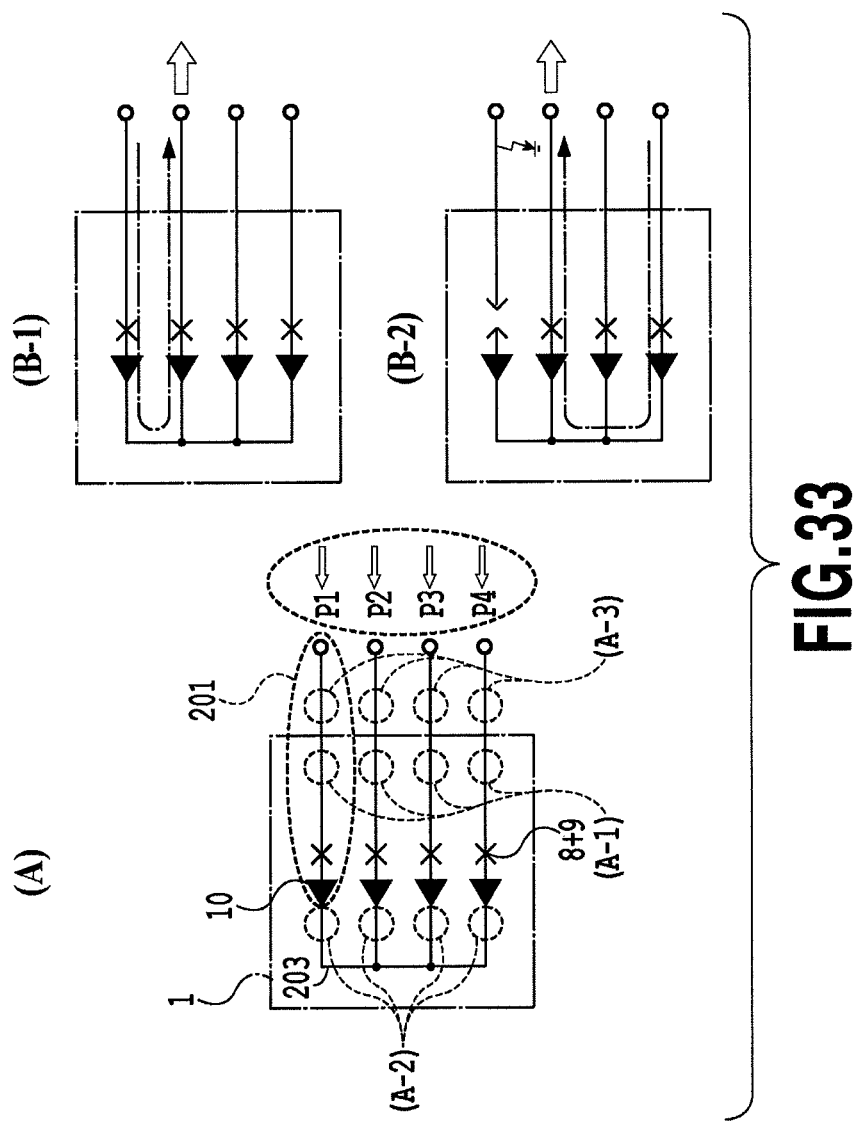
FIG. 33 is a diagram illustrating an accident protection system and a switching procedure.

FIG. 33 illustrates an accident protection system. The system may include a power interchange route protection circuit including components described below to allow a minimum necessary number of circuits to be isolated to ensure the best power interchange route. This serves to avoid unwanted isolation if a malfunction can be corrected simply by gate blocking. Furthermore, the system enables only a connection terminal subjected to an overcurrent to be isolated, with the other connection terminals used to continue power interchange. The system further enables the connection terminal subjected to an overcurrent to resume operating immediately after restoration.

FIG. 33(A-1) shows an input/output terminal overcurrent protection circuit that is operative when a current equal to or larger than a set value flows through any input/output terminal; for the A connection terminal 201, the protection circuit performs a gate blocking operation and an operation of opening the circuit breaker, and for the B connection terminal 202, the protection circuit performs an operation of closing the circuit breaker.

FIG. 33(A-2) shows a DC bus protection circuit. This power converter DC bus protection circuit subjects all the power converters to timed gate blocking when DC ammeters installed at the DC portion of each of the A connection terminals 201 indicate that the sum of all the terminal currents is not zero.

FIG. 33(A-3) shows a multi-terminal power conversion device protection circuit including a power meter installed at a power receiving portion of each input/output terminal to which a power grid is connected, to open circuit breakers for all the input/output terminals in a timed manner when the sum of the power at all the terminals is not zero. The multi-terminal power conversion device protection circuit is designed to deal with a possible accident inside the multi-terminal power conversion device 1, and can minimize the spread of the accident by the gate blocking operation, which is faster than the operation of a circuit breaker.

Specifying the order in which these protection circuits are actuated allows the number of circuits to be isolated at the time of an accident to be minimized. Thus, with the stopped portion of the circuitry minimized, the remaining portion of the multi-terminal power conversion device 1 can continue to function, keeping power interchange routes available.

FIG. 33(B-1) and FIG. 33(B-2) illustrate switching of the input/output terminals at the time of an accident. When power is being interchanged to the second terminal from the top as shown in FIG. 33(B-1), and when the top terminal suffers an accident such as an overcurrent as shown in FIG. 33(B-2), gate blocking may be immediately carried out on the power converter for this circuit to stop the power supply, and the terminals may be switched such that the fourth terminal supplies power to the second terminal. Moreover, the input/output terminal suffering the accident may be exclusively isolated by the circuit breaker 8 or the disconnecting switch 9, with the other input/output terminals used to continue the power interchange. This system also enables the input/output terminal suffering the accident to resume operating immediately after restoration. When the malfunction can be corrected simply by gate blocking, the circuit can be recovered to the initial state thereof without unwanted isolation.

Furthermore, the multi-terminal power conversion device 1 controls the A connection terminals 201 so as to set the sum of power P1 to power P4 shown in FIG. 33 to zero, that is, to set the sum of power flowing in through the input/output terminals and power flowing out through the input/output terminals to zero. In a system most commonly used to achieve the above-described control, all units other than a DC voltage maintaining unit input and output requested power, whereas the DC voltage maintaining unit compensates for the excess or shortage of power.

Additionally, if the energy storage device is connected to the DC common bus 203 as described below, the control system may be such that all the units input and output requested power, whereas the energy storage device compensates for the excess and shortage of power and also maintains a DC voltage.

(Protection Circuit 2)

An apparatus operation system performs an operation of closing the disconnecting switch 9 and circuit breaker 8 for the connection terminals to start power supply when no connections have been established yet between the connection terminals and the connection targets. Similarly, to stop the power supply, the apparatus operation system opens the circuit breaker 8 and then the disconnecting switch 9 as needed, for disconnection.

Figure 34:
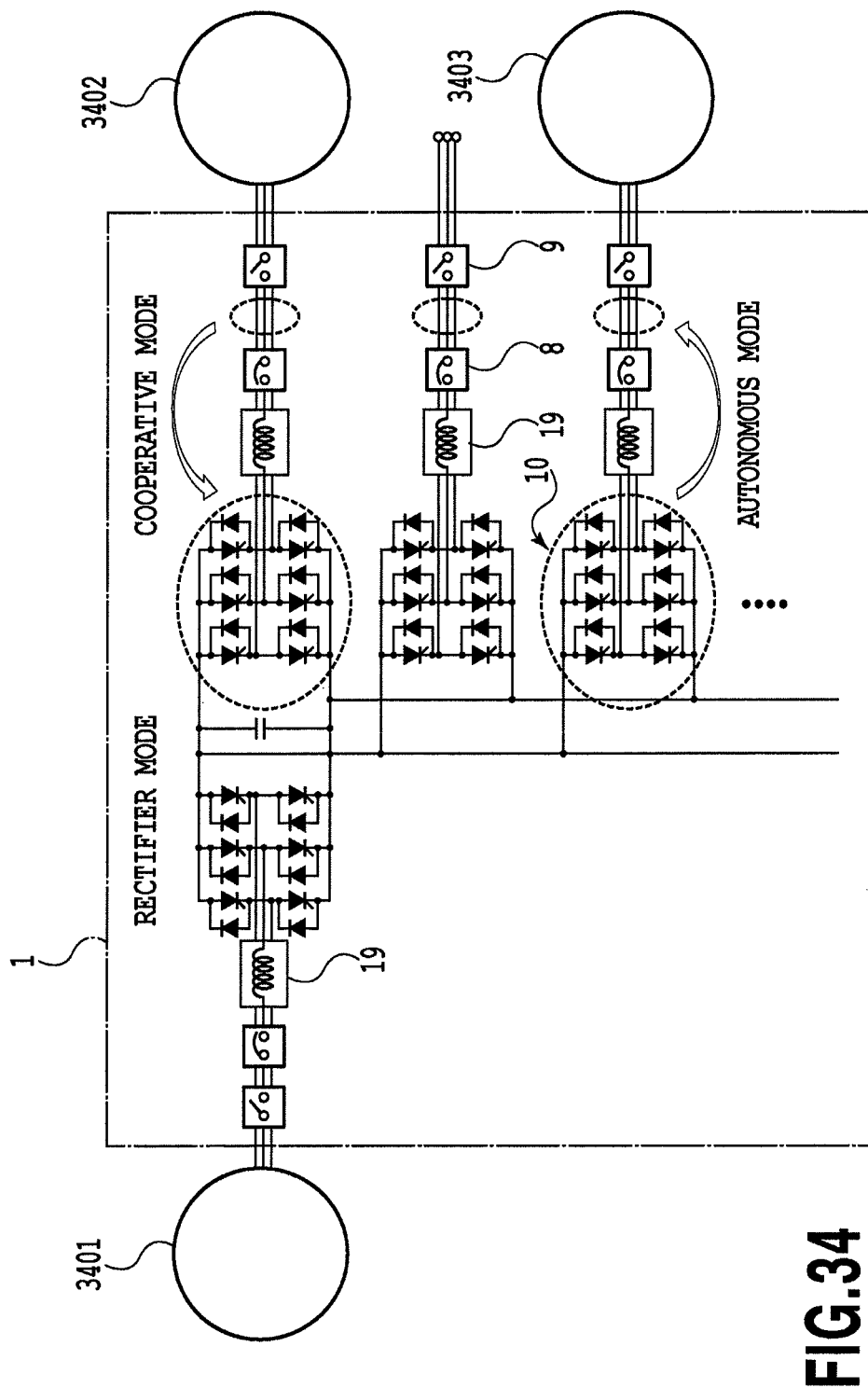
FIG. 34 is a diagram illustrating an operation procedure of an apparatus operation system according to the condition of a connection target power grid.

As shown in FIG. 34, the apparatus operation system performs an operation of closing the disconnecting switch 9 to synchronously turn on the A connection terminals, and measures the voltage, frequency, and phase of each of the connection targets. When a connection target 3402 is a wet grid (energized autonomous grid), the apparatus operation system performs a parallel synchronous turn-on operation (grid interconnection operation mode) of closing the circuit breaker 8 after synchronizing the voltage, frequency, and phase of the power converter 10 with those of the connection target 3402. In the grid interconnection operation mode, not only power with a power factor of 1 but also the voltage can be controlled by shifting the phase to change the power factor so as to supply reactive power.

When the connection target 3403 is a dry grid (de-energized grid), the apparatus operation system may perform an autonomous operation turn-on operation circuit (autonomous operation mode) in which the power converter 10 creates a voltage and a frequency complying with the rating for the connection target and in which the circuit breaker 8 is then closed to supply power to the connection target. Hence, the multi-terminal power conversion device 1 can function as a power source to supply power to an emergency power supply circuit or the like in the connection target power grid, thus contributing to restarting.

The multi-terminal power conversion device 1 according to the present invention is installed in the premise of a substation as an integrated system. The multi-terminal power conversion device 1 can thus easily determine the operating status of a plurality of converters which is indicated by DC voltage, current, and phase control angle and perform centralized control and protection. The multi-terminal power conversion device 1 at one location can manage, in a centralized manner, a cooperative control system for starting and stopping all the converters at a time or individually starting and stopping the converters, and preventing the excess or shortage of power among the converters, a power flow reversal system for performing cooperative control when the power flow is reversed, and a system for protecting the entire circuitry when a failure or an accident occurs.

Furthermore, with the external terminals of the multi-terminal power conversion device 1 connected directly to the existing AC transmission lines without the need to install a new transmission line or DC interconnection line, active power of any magnitude can be transferred to a plurality of adjacent power grids so that the power is actively transferred simultaneously from one grid to a plurality of grids or from a plurality of grids to a plurality of grids regardless of a difference in voltage, frequency or phase.

Moreover, the circuit breaker with power semiconductor elements drastically increases power interruption speed compared to conventional circuit breakers. Thus, even when most of the power demand is met by solar power generation or wind power generation, the possibility of a major chain blackout can be reduced by dividing each power grid into a number of portions and using the multi-terminal power conversion device 1 according to the present invention for the connection between the resultant portions.

(Network Stability)

With reference to FIG. 8, an example will be described in which the existing power grid is divided into the power grid 3-1 to the power grid 3-5. In this example, the multi-terminal power conversion devices 1-1 to 1-5 in the interconnection portion are connected together as shown in FIG. 8.

If an accident occurs in the power grid 3-2 to cause a power failure, the multi-terminal power conversion devices 1-1 and 1-3 to 1-5 installed at the power grids 3-1 and 3-3 to 3-5 quickly detect the power failure via the multi-terminal power conversion device 1-2 installed in the power grid 3-2 to shut down the A connection terminals 201 and B connection terminals 202 of the multi-terminal power conversion devices 1-1 and 1-3 to 1-5 for the power grid 3-2. This also allows the continued use of the A connection terminal 201 of the multi-terminal power conversion device 1-1 for the power grid 3-1 and the A connection terminals 201 of the multi-terminal power conversion device 1-1 connected to the power grids 3-3 to 3-5, thus enabling the continued power interchange among the power grids 3-1 and 3-3 to 3-5.

Furthermore, instead of shutting down the A connection terminals 201 and B connection terminals 202 of the multi-terminal power conversion devices 1-1 and 1-3 to 1-5 for the power grid 3-2, the system may quickly shut down the multi-terminal power conversion device 1-2 installed at the power grid 3-2 or the A connection terminal 201 of the multi-terminal power conversion device 1-2 for the power grid 3-2. This also substantially prevents the power grids 3-1 and 3-3 to 3-5 from being affected by the accident. Power having been interchanged via the power grid 3-2 to the different power grids is quickly switched to interchange on other routes. If only the A connection terminal 201 of the multi-terminal power conversion device 1-2 for the power, grid 3-2 is shut down, the other A connection terminals 201 of the multi-terminal power conversion device 1-2 can be continuously used without change. This enables the continuous use of the A connection terminals 201 of the multi-terminal power conversion device 1-2 connected to the power grids 3-3 to 3-5 and thus the power interchange between the power grids 3-3 to 3-5 via the multi-terminal power conversion device 1-2.

For the safety of operations, desirably, the following are both carried out: the shutdown of the A connection terminals 201 and B connection terminals 202 of the multi-terminal power conversion devices 1-1 and 1-3 to 1-5 for the power grid 3-2 and the shutdown of the entire multi-terminal power conversion device 1-2 and the A connection terminal 201 of the multi-terminal power conversion device 1-2 for the power grid 3-2.

The present invention allows the multi-terminal power conversion devices 1 to asynchronously separate a massive synchronous grid into a number of portions, enabling inhibition of a major chain blackout originating in a small power transmission accident.

The present invention can inhibit a major chain reaction blackout originating in a partial grid shutdown caused by the fluctuation in the voltage or frequency of renewable energy power, which fluctuates significantly.

Moreover, the ability to inhibit a major chain reaction blackout enables the local grid to reliably utilize an increase in renewable energy. This allows a reduction in dependence on fossil fuels, contributing to a reduction in greenhouse gas emissions.

(Inter-Connection-Terminal Bypass)

Figure 35:
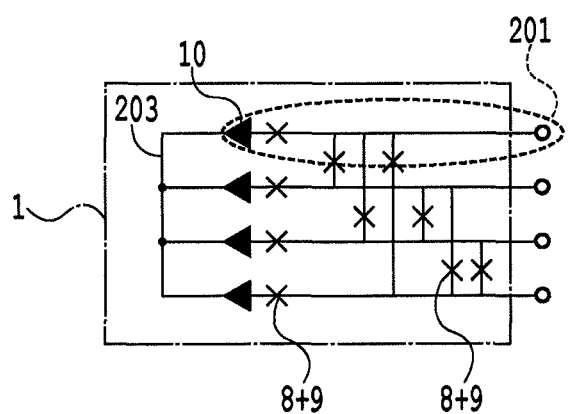
FIG. 35 is a diagram showing a bypass circuit in the multi-terminal power conversion device.

FIG. 35 shows a multi-terminal power conversion device 1 with four terminals. However, the present invention is not limited to this number. FIG. 35 illustrates an example in which a bypass circuit of the circuit breaker 8 and the disconnecting switch 9 is installed at all the positions to which any two of the four terminals are connected together. However, the present invention is not limited to this form of the bypass circuit.

In this configuration, if the two power grids to which the respective A connection terminals 201 of the multi-terminal power conversion device are connected synchronize with each other, power conversion losses can be reduced by bypassing the self-commutated power converter 10 of each of the A connection terminals.

Furthermore, the inactivated self-commutated power converter 10 can be made dry (de-energized) and thus easily repaired and updated.

Moreover, a synchronous grid can be easily switched to an asynchronous grid and vice versa. A power routing network configuration with a plurality of power grids can be flexibly changed so as to be more appropriate.

(Maintainability of the Connection Terminals)

Figure 36:
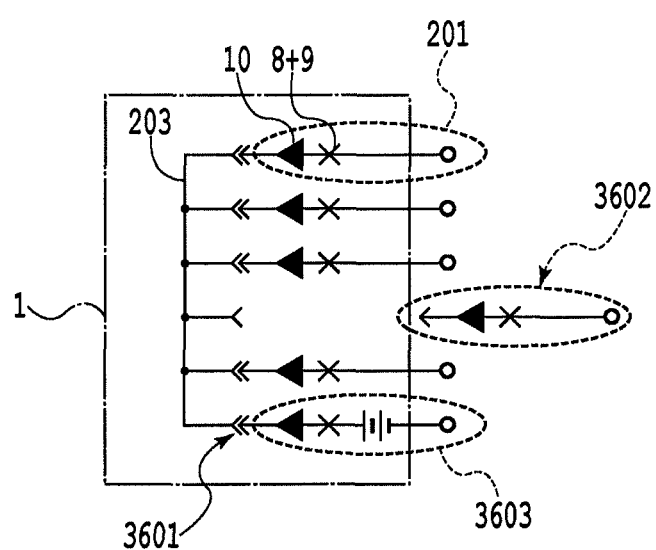
FIG. 36 is a diagram showing a withdrawal configuration for the multi-terminal power conversion device.

FIG. 36 illustrates an example of the multi-terminal power conversion device 1 in which the A connection terminals 201 is built in respective plural removable cabinets that are built in one module so that removing the cabinet allows the A connection terminal 201 and the common bus terminal to be disconnected from an A connection terminal 201—side connection and a common bus connection in the module. Ad hoc expansion of a power apparatus can be achieved by standardizing the above-described structure and allowing recognition of removal and installation as in the case of a plug and play function. As a result, a power grid can be provided which enables easy maintenance activities. FIG. 36 shows a state 3602 in which the fourth A connection terminal 201 is being removed from the multi-terminal power conversion device 1.

Each of the connection terminals 201 and an energy storage device unit 3603 are connected to the common bus 203 via a bayonet terminal 3601. This structure is the same as that which is normally used for a metal clad switch gear of a power grid.

The multi-terminal power conversion device 1 incorporates an interlock structure that inhibits the connection terminal from being removed before the power conversion elements are subjected to gate blocking and an operation of opening the circuit breaker 8 is performed to open the disconnecting switch 9 so as to prevent a possible electric shock. The disconnecting switch 9 may also be configured to achieve disconnection when removed. The function of the circuit breaker 8 can also be fulfilled by the gate blocking. In this case, the illustrated disconnecting switch 9 and circuit breaker 8 are not needed.

The circuit of the energy storage device unit 3603 may be similarly configured to be removable. In this case, an accessory such as a capacitor may be charged, and thus the multi-terminal power conversion device 1 incorporates an interlock mechanism that inhibits the circuit from being withdrawn until the circuit is made dry.

If the entire multi-terminal power conversion device 1 is configured as an integrated cubicle including a large number of removable cabinets as described above, first the connection terminals are deactivated, and then any of the cabinets is removed, thus enabling the removed circuit to be made dry. This allows the safety of operations to be ensured.

Furthermore, removing the cabinet provides a work space required for inspection, locking, replacement, and the like, ensuring the physical safety of operations.

Moreover, if the multi-terminal power conversion device 1 is configured such that the withdrawal allows the information network to be disconnected, the other multi-terminal power conversion devices 1 can be automatically notified that the circuit has been disabled.

(Unit of Network)

In Japan, power grids of at most 2,000 kW are classified into the high voltage type. Thus, power grids with a maximum capacity of at most 2,000 kW each of which corresponds to any of groups of a plurality of consumers including homes, condominiums, apartments, buildings, stores, supermarkets, and factories are classified into the high voltage class. A network of high voltage incoming panels and pole mounted transformers installed on utility poles, which are often seen in cities, have a high voltage of 6.6 kV, which is reduced to a low voltage of 220 V/110 V before the power is supplied to industrial facilities and homes.

Practical self-commutated power converters are insulated gate bipolar transistors (IGBTs). Insulated gate bipolar transistors with a high capacity and a high withstand voltage can be used for high voltage grids.

In the high voltage class, very many distribution lines run through cities and can be utilized as interconnecting electric lines according to the present invention. Thus, the transmission networks in each district are grouped into a power grid specified to provide a power of at most about 2,000 kW. Then, an asynchronous interconnection network can be constructed using IGBTs, eliminating the need to install new interconnecting electric lines. Since the existing power cables can be utilized, costs for shifting to the power network system according to the present invention can be reduced. Moreover, the multi-terminal power conversion device 1 can be used for an extra high voltage power grid by using high-capacity IGBTs and increasing the voltage of the IGBTs by a transformer.

INDUSTRIAL APPLICABILITY

An autonomous power grid is constructed when renewable energy power is introduced into the power grid. This reduces fluctuations in the power grid and enhances an incentive for promoting the introduction of renewable energy. This configuration is also an effective option when in developing countries or the like, small-scale power grids are connected together to form a large-scale network.

The invention claimed is:

1. A multi-terminal power conversion device characterized by comprising:
    at least three self-commutated converters that convert power in a bidirectional manner;
    a common bus that connects first terminals of the self-commutated converters together in parallel;
    voltage and current measuring instruments that measure voltage and current of second terminals of the self-commutated converter;
    a voltage measuring instrument that measures voltage of the common bus; and
    a power control system that calculates voltage, current, power, frequency and phase based on measured values by the voltage and current measuring instruments and the voltage measuring instrument, and controls a plurality of the self-commutated converters so that one of the self-commutated converters maintains the voltage of the common bus and other self-commutated converters perform power control for flowing given power into or from destinations to which second terminals of the self-commutated converters are connected and a sum of power flowing from the self-commutated converters into the common bus and power fed out from the common bus to the self-commutated converters is cooperatively set to zero, thereby asynchronously interchanging power among destinations to which second terminals of the self-commutated converters are connected.

2. A multi-terminal power conversion device according to claim 1, characterized by comprising:
    an energy storage device connected to the common bus.

3. The multi-terminal power conversion device according to claim 2, characterized in that the energy storage device further comprises a DC/DC converter, the energy storage device connects to the common bus via the DC/DC converter.

4. The multi-terminal power conversion device according to claim 1, characterized in that the power control system controls each self-commutated converter to synchronize the phase with each destination.

5. The multi-terminal power conversion device according to claim 1, characterized in that the power control system controls each self-commutated converter to flow the given power into or from each destination based on a power control target value with respect to each self-commutated converter entered in the power control system.

6. The multi-terminal power conversion device according to claim 1, characterized in that the power control system controls each self-commutated converter to maintain voltage or current of each destination.

7. A power conversion device characterized by comprising:
    a plurality of self-commutated converters that respectively convert power in a bidirectional manner;
    a voltage and current measuring instrument that measures voltage and current passing through each self-commutated converter;
    a common bus that connects first terminals of the self-commutated converters together in parallel;
    a communication unit for transmitting and receiving power conversion information including an identifier of each self-commutated converter, a header indicating a beginning time of transmitting and receiving power and a footer indicating an ending time of transmitting and receiving power and a power interchange profile; and
    a control unit for controlling each self-commutated converter corresponding to each identifier based on the power conversion information received by the communication unit, the control unit having a memory to store the power conversion information,
    wherein the control unit calculates voltage, current, power, frequency and phase based on measured values by the voltage and current measuring instruments, and controls a plurality of the self-commutated converters so that a sum of power flowing from the self-commutated converters into the common bus and power fed out from the common bus to the self-commutated converters is cooperatively set to zero, thereby asynchronously interchanging power among destinations to which second terminals of the self-commutated converters are connected.

8. The power conversion device according to claim 7, characterized in that the power interchange profile includes a power converting direction, and an amount of power conversion at each self-commutated converter, and
    the control unit controls the plurality of self-commutated converters so that each plurality of self-commutated converters corresponding to each identifier converts power of the amount of power conversion in the power converting direction between beginning time and ending time.

9. The power conversion device according to claim 7, characterized in that the control unit transmits and receives the power conversion information via electric lines and data communication network connecting among the power conversion devices.

10. The power conversion device according to claim 7, characterized by further comprising a power storage device connected to the common bus.

11. The power conversion device according to claim 7, characterized in that each self-commutated converter is measured voltage of a second terminal of the self-commutated converter connected to a destination, the control unit controls the self-commutated converters, wherein when each of the second terminals connected to the destinations has detected AC voltage, each of the self-commutated converters synchronizes the power having a given difference with each of the destinations regarding to at least one of current, voltage, frequency and phase to transfer given active power and reactive power to and from each of the destinations,
    wherein when each of the second terminals connected to the destinations has detected DC voltage, each of the self-commutated converters synchronizes the power having a given voltage difference with each of the destinations to transfer given active power to and from each of the destinations.

12. The power conversion device according to claim 7, characterized in that the control unit controls the self-commutated converters so that each of the self-commutated converters, when the destination is a load, provides a power supply with a given voltage to the destination.

13. The power conversion device according to claim 7, characterized in that the control unit, when received power conversion information includes different power conversions and implementation periods of different power conversions are at least partially overlapping, adds to the amounts of power conversion of same power converting direction and subtracts the amounts of power conversion of different power converting direction to calculate integrated amount of power conversion, the control unit controls the self-commutated converters based on the integrated amount of power conversion.

14. The power conversion device according to claim 7, characterized in that the memory stores transaction establishing condition for determining whether a power conversion is performed,
the control unit transmits information indicating for establishing a power transaction to a source of power conversion information meeting the transaction establishing condition and controls the self-commutated converters based on only power conversion information meeting the transaction establishing condition.

15. The power conversion device according to claim 7, characterized in that the power conversion information includes at least one of price of power and a power generating source.

16. A stored power control device characterized by comprising:
a plurality of self-commutated converters that respectively convert power in a bidirectional manner;
a voltage and current measuring instrument that measures voltage and current passing through each self-commutated converter;
a power storage device connected to the self-commutated converters;
a power transaction memory device for recording the power amount information of power stored in the power storage device through the self-commutated converters and a power interchange profile of the stored power in relation to an identifier for identifying the self-commutated converters;
a communication unit for transmitting and receiving signals indicative of power amount information and the power interchange profile to and from other stored power control devices; and
a control unit for controlling the self-commutated converters and the power transaction memory device so that when the identifier included in the signal received by the communication unit indicates the self-commutated converter, the self-commutated converter corresponding to the identifier included in the signal transmits and receives power based on the signal and the power interchange profile is rewritten by a power interchange profile of other stored power control device;
wherein the control unit calculates voltage, current, power, frequency and phase based on measured values by the voltage and current measuring instruments, and controls a plurality of the self-commutated converters so that a sum of power flowing from the self-commutated converters into a common bus and power fed out from the common bus to the self-commutated converters is cooperatively set to zero, thereby asynchronously interchanging power among destinations to which second terminals of the self-commutated converters are connected.

17. The stored power control device according to claim 16, characterized in that the power interchange profile includes at least one of transaction date and time, the amount of power in a transaction, a type of source of power generation, a power generation operator, a power storage operator, price, power loss, $CO_2$ value, RPS value and green power value.

18. The stored power control device according to claim 16, characterized in that the communication unit transmits a signal to a communication unit of other stored power control device, the signal indicates the power amount information of power stored in the power storage device and the power interchange profile of the stored power and makes other stored power control device to rewrite other power interchange profile recorded in other power transaction memory of the other stored power control device to the power interchange profile.

19. The stored power control device according to claim 16, characterized in that if an amount of second power stored in other power storage device of other stored power control device is equal to that of first power stored in the power storage device of the stored power control device, the first and second power can be exchanged between their stored power control devices by that a power interchange profile of the first power stored in the power transaction memory of the stored power control device is rewritten to other power interchange profile of the second power and a power interchange profile of the second power stored in other power transaction memory of the other stored power control device is rewritten to the power interchange profile of the first power.

* * * * *